(12) United States Patent
Stetson et al.

(10) Patent No.: US 11,507,099 B2
(45) Date of Patent: Nov. 22, 2022

(54) SYSTEMS AND METHODS FOR GRAPH-BASED AI TRAINING

(71) Applicant: dRISK, Inc., Pasadena, CA (US)

(72) Inventors: Robert Chess Stetson, Altadena, CA (US); Kris Chaisanguanthum, Kansas City, MO (US); Robert Ferguson, Tujunga, CA (US); Boris Revechkis, Pasadena, CA (US)

(73) Assignee: dRISK, Inc., Pasadena, CA (US)

( * ) Notice: Subject to any disclaimer, the term of this patent is extended or adjusted under 35 U.S.C. 154(b) by 559 days.

(21) Appl. No.: 16/566,776

(22) Filed: Sep. 10, 2019

(65) Prior Publication Data

US 2020/0081445 A1  Mar. 12, 2020

Related U.S. Application Data

(60) Provisional application No. 62/789,955, filed on Jan. 8, 2019, provisional application No. 62/729,368, filed on Sep. 10, 2018.

(51) Int. Cl.
  *G05D 1/02* (2020.01)
  *G06N 5/02* (2006.01)
  (Continued)

(52) U.S. Cl.
  CPC ......... *G05D 1/0221* (2013.01); *G05D 1/0246* (2013.01); *G06K 9/6215* (2013.01);
  (Continued)

(58) Field of Classification Search
  CPC ............... G05D 1/0221; G05D 1/0246; G05D 2201/0213; G06K 9/6215–6218; G06N 5/02–04
  See application file for complete search history.

(56) References Cited

U.S. PATENT DOCUMENTS

| 5,844,572 A | 12/1998 | Schott |
| 7,539,697 B1 | 5/2009 | Akella |

(Continued)

FOREIGN PATENT DOCUMENTS

| EP | 3850546 A1 | 7/2021 |
| WO | 2018010434 A1 | 1/2018 |

(Continued)

OTHER PUBLICATIONS

Magnus Olsson, "Behavior Trees for decision-making in Autonomous Driving", all pages, 2016, retrieved from http://www.diva-portal.org/smash/get/diva2:907048/FULLTEXT01.pdf (Year: 2016).*

(Continued)

*Primary Examiner* — Calvin Cheung
(74) *Attorney, Agent, or Firm* — KPPB LLP

(57) ABSTRACT

Graphs are powerful structures made of nodes and edges. Information can be encoded in the nodes and edges themselves, as well as the connections between them. Graphs can be used to create manifolds which in turn can be used to efficiently train more robust AI systems. Systems and methods for graph-based AI training in accordance with embodiments of the invention are illustrated. In one embodiment, a graph interface system including a processor, and a memory configured to store a graph interface application, where the graph interface application directs the processor to obtain a set of training data, where the set of training data describes a plurality of scenarios, encode the set of training data into a first knowledge graph, generate a manifold based on the first knowledge graph, and train an AI model by traversing the manifold.

27 Claims, 36 Drawing Sheets
(16 of 36 Drawing Sheet(s) Filed in Color)

(51) Int. Cl.
  *G06N 5/04* (2006.01)
  *G06K 9/62* (2022.01)
(52) U.S. Cl.
  CPC ............ *G06K 9/6218* (2013.01); *G06N 5/02* (2013.01); *G06N 5/04* (2013.01); *G05D 2201/0213* (2013.01)

(56) References Cited

U.S. PATENT DOCUMENTS

| | | |
|---|---|---|
| 7,644,052 B1 | 1/2010 | Chang et al. |
| 7,865,534 B2 | 1/2011 | Chandra et al. |
| 8,185,558 B1 | 5/2012 | Narayanan et al. |
| 8,352,465 B1 | 1/2013 | Jing et al. |
| 8,572,129 B1 | 10/2013 | Lee |
| 8,736,612 B1 | 5/2014 | Goldman et al. |
| 8,739,016 B1 | 5/2014 | Goldman |
| 9,129,158 B1 | 9/2015 | Medasani et al. |
| 9,187,088 B1 * | 11/2015 | Ferguson ............ G05D 1/0088 |
| 9,348,947 B2 | 5/2016 | Stetson et al. |
| 9,411,890 B2 | 8/2016 | Komarov |
| 9,740,744 B2 | 8/2017 | Stetson et al. |
| 9,792,530 B1 | 10/2017 | Wu et al. |
| 10,019,011 B1 * | 7/2018 | Green ............ G05D 1/0223 |
| 10,713,258 B2 | 7/2020 | Stetson et al. |
| 10,776,965 B2 | 9/2020 | Stetson et al. |
| 2002/0087275 A1 | 7/2002 | Kim et al. |
| 2007/0124291 A1 | 5/2007 | Hassan et al. |
| 2007/0208693 A1 | 9/2007 | Chang et al. |
| 2007/0239694 A1 | 10/2007 | Singh et al. |
| 2008/0059512 A1 | 3/2008 | Roitblat et al. |
| 2008/0097941 A1 | 4/2008 | Agarwal |
| 2009/0013314 A1 | 1/2009 | Opaterny |
| 2009/0303239 A1 | 12/2009 | Ang et al. |
| 2010/0094864 A1 | 4/2010 | Foody |
| 2010/0274815 A1 | 10/2010 | Vanasco |
| 2011/0173189 A1 | 7/2011 | Singh et al. |
| 2011/0249002 A1 | 10/2011 | Duplessis et al. |
| 2012/0221555 A1 | 8/2012 | Byrne et al. |
| 2012/0317149 A1 | 12/2012 | Jagota |
| 2013/0117261 A1 | 5/2013 | Sambrani |
| 2013/0191416 A1 | 7/2013 | Lee |
| 2013/0246342 A1 | 9/2013 | Faith |
| 2013/0290234 A1 | 10/2013 | Harris |
| 2014/0149376 A1 | 5/2014 | Kutaragi et al. |
| 2015/0033106 A1 | 1/2015 | Stetson et al. |
| 2015/0254331 A1 | 9/2015 | Long et al. |
| 2016/0239545 A1 | 8/2016 | Stetson et al. |
| 2017/0131719 A1 | 5/2017 | Micks et al. |
| 2017/0221240 A1 | 8/2017 | Stetson et al. |
| 2017/0316059 A1 | 11/2017 | Stetson et al. |
| 2018/0014217 A1 | 1/2018 | Kleinbeck et al. |
| 2018/0189634 A1 | 7/2018 | Abdelaziz et al. |
| 2019/0025841 A1 * | 1/2019 | Haynes ............ B60W 30/00 |
| 2019/0310650 A1 * | 10/2019 | Halder ............ G05D 1/0088 |
| 2021/0065415 A1 | 3/2021 | Stetson et al. |

FOREIGN PATENT DOCUMENTS

| | | |
|---|---|---|
| WO | 2019165451 A1 | 8/2019 |
| WO | 2020055910 A1 | 3/2020 |
| WO | 2020056331 A1 | 3/2020 |
| WO | 2020205629 A1 | 10/2020 |

OTHER PUBLICATIONS

International Search Report and Written Opinion for International Application No. PCT/US2019/050469, Search completed Nov. 20, 2019, dated Dec. 11, 2019, 9 Pgs.

Madrigal, "Inside Waymo's Secret World of Training Self-Driving Cars", The Atlantic, Aug. 23, 2017, Retrieved from: https://www.theatlantic.com/technology/archive/2017/08/inside-waymos-secret-testing-and-simulation-facilities/537648/, 26 pgs.

Meyerovich et al., "Superconductor: A Language for Big Data Visualization", ACM, LASH-C, Shenzen, China, Feb. 24, 2013.

Monti et al., "Geometric Deep Learning on Graphs and Manifolds Using Mixture Model CNNs", In: Cornell University Library/Computer Science/Computer Vision and Pattern Recognition, Nov. 25, 2016, (online) (retrieved on Nov. 19, 2019 (Nov. 19, 2019).

Torok, Matthew E., "Superconductor 1 Million Nodes at 30 FPS", Retrieved from: http://parlab.eecs.berkeley.edu/sites/all/parlab/files/superconductor%20overview%20external.pdf, Aug. 2012, 29 pgs.

Extended European Search Report for European Application No. 19860523.0, Search completed May 5, 2022, dated May 13, 2022, 16 Pgs.

International Preliminary Report on Patentability for International Application PCT/US2019/050469, Report dated Mar. 9, 2021, dated Mar. 25, 2021, 7 Pgs.

International Search Report and Written Opinion for International Application No. PCT/US2022/070425, Search completed Mar. 23, 2022, dated Apr. 4, 2022, 15 Pgs.

Bagschik et al., "Ontology Based Scene Creation for the Development of Automated Vehicles", IEEE Intelligent Vehicles Symposium (IV), IEEE, Jun. 26, 2018, pp. 1813-1820, XP033423512.

Chauvin, "Hierarchical Decision-Making for Autonomous Driving", Aug. 2018, pp. 1-8, XP055916113, DOI: 10.13140/rg.2.2.24352.43526.

Chen et al., "Manifold Learning-Based Data Sampling for Model Training", Informatik Aktuell, Feb. 21 2018, Springer Verlag, London., GB, pp. 269-274, XP055916157.

Dopfer et al., "What can we learn from accident videos?", 2013 CACS International Automatic Control Conference (CACS), IEEE, Dec. 2, 2013, pp. 68-73, XP032563875, DOI: 10.1109/CACS.2013.6734109.

Guo et al., "Semantically Smooth Knowledge Graph Embedding", Proceedings of the 53rd Annual Meeting of the Association for Computational Linguistics and the 7th International Joint Conference on Natural Language Processing Jul. 26, 2015, vol. 1, pp. 84-94, XP055757075.

Wilcke et al., "The knowledge graph as the default data model for learning on heterogeneous knowledge", Data Science, Dec. 8, 2017, vol. 1, No. 1-2, pp. 39-57, XP055915793.

* cited by examiner

FIG. 6B

SYSTEMS AND METHODS FOR GRAPH-BASED AI TRAINING

CROSS-REFERENCE TO RELATED APPLICATIONS

The current application claims the benefit of and priority under 35 U.S.C. § 119(e) to U.S. Provisional Patent Application No. 62/729,368 entitled "Systems and Methods for Human-AI Interaction" filed Sep. 10, 2018, and U.S. Provisional Patent Application No. 62/789,955 entitled "Knowledge Graphs for Autonomous Vehicles" filed Jan. 8, 2019. The disclosures of U.S. Provisional Patent Application Nos. 62/729,368 and 62/789,955 are hereby incorporated by reference in its entirety for all purposes.

FIELD OF THE INVENTION

The present invention generally relates to the processing of big data sets using graphs, and more specifically, generating more effective training and testing paradigms for AIs by encoding data in a structure easily navigated by both human and AI.

BACKGROUND

Graphs are a collection of nodes and the edges that connect them. Graphs can be used to represent data by encoding information within nodes and edges. A graph data structure is an implementation of the mathematical concept of a graph, which is a representation of a set of objects where some pairs of the objects are connected by links. Graphs can be undirected, where an edge indicates a relationship between two nodes within the graph. Graphs can also be directed, where an edge indicates a relationship between a first node and a second node within the graph, but not the corresponding relationship between the second node and the first node.

Neural networks are a class of machine learning technique which is often utilized for "artificial intelligence" tasks. Neural networks utilize a set of artificial neurons (or "nodes") which are linked, often in different sets of layers. Neural networks can be trained by providing a set of training data that provides a matched set of inputs and desired outputs. Neural networks can change the weights of connections between its nodes. A successfully trained neural network is capable of outputting a desired output based on an input sufficiently similar to the training data.

SUMMARY OF THE INVENTION

Big data sets are becoming increasingly common, and many methods have been developed to attempt to help humans understand and process these data sets which are too highly dimensional to be fully understood in their raw form. The predominant method for collating, storing, and processing big data sets has traditionally been through spreadsheets and other table-based database systems. Artificial intelligence (AI) systems have been developed to assist humans with handling the huge amount of data. A particular class of AI systems that have found widespread use is the machine learning (ML) class of systems that rely on training to "learn" a particular task. However AI and ML systems have been held back by constraints that have persisted from conventional data processing methods. Table-based databases have traditionally been used to process data, but now the constraints imposed by rigid schema which assisted human users in understanding a database are hampering the progress of ML and AI systems.

In numerous embodiments, by encoding a data set within the structure of a graph, the entire space of information can be interacted with through graph manipulation, rather than via a limited set of query commands available in conventional database methodologies, and/or the limited taxonomy of a particular data formalism. Further, while AI systems such as neural networks are inspired by the human brain, artificial systems need not be hindered by human limitations. By requiring AI systems to conform their inputs and outputs to conventional database structures, they are often prevented from leveraging and navigating the data in less restricted ways. In contrast, graphs can provide a richer and more flexible structure on which AIs can learn more complex behaviors. Further, graphs provide a structure that is more able to encode complex data compared to table structures. Ways to encode data into graphs and manipulate the resulting graphs are explained in U.S. Pat. No. 9,348,947 entitled "Systems and methods for visualizing and manipulating graph databases," granted on May 24, 2016, and U.S. Patent Publication No. 2017/0221240 entitled "Systems and Methods for Visualizing and Manipulating Graph Databases," filed Apr. 21, 2017, the disclosures of which are hereby incorporated by reference in their entirety.

An additional problem for AI and ML systems is handling the nature of the training data itself. The performance of an AI or ML system is dictated in large part by the quality and size of the training data set provided. However, some behaviors required of AI systems including, but not limited to neural networks, have become so complex that even a large quantity of high fidelity data is not sufficient to train the AI if that data itself is not sufficiently rich. Not all of the data may be particularly relevant to the critical operations of the neural network, and worse, training on data that is not relevant to critical operations can reduce performance in critical situations. For example, training an AI to control an autonomous vehicle (colloquially a, "AV," or "self-driving car") to follow another vehicle or maintain straight navigation in a lane is a common situation and one that is not particularly complex relative to the complete operation of a totally autonomous vehicle. Further, situations like these are often the bulk of the training data set available as they are the common mode of operation, and if such a training data set is provided to a neural network, may negatively impact the quality of the network's response to higher risk scenarios.

In contrast, high risk scenarios are often uncommon and training data may be sparse in these regions. In continuing with the AV example, an oncoming vehicle speeding up to beat a light, a pedestrian suddenly deciding to jaywalk, or a plastic bag blown by the wind into a sensor's view could all be considered "edge cases" that are uncommon and can pose high risk to the system. However, given that the parameter space for even common traffic situations is extremely large, it can be extremely difficult to identify, let alone generate training data for, every flavor of edge case. By encoding the corpus of training data and the associated parameters into a graph, systems and methods described herein can leverage the graph structure both exhaustively encode the set of possible risk scenarios to traverse, and also to identify areas of interest such as edge cases.

Indeed, in order to enhance AI training, systems and methods described herein can use data stored inside of a graph to generate a new data structure capturing the entire complexity of the required behavior, referred to as a "manifold". Traditionally, AIs, as well as engineered systems, are often described as being trained and tested in a "space." Similarly, optimization problems are described in classic engineering language as occurring in a "space." The dimensions of this space are those with which the engineered system is expected to contend, such as, but not limited to, x, y and z, velocity, momentum, vibrational axes, and/or any other relevant dimension to the engineered system. A space is a particularly convenient formalism when there are small numbers of dimensions, and when the optimization problem is "convex", i.e. so that edge cases are those on the edge of a convex hull in the optimization space, and any point inside that hull is considered simpler than any point on the edge. However, the set of things with which a contemporary AI is expected to contend may be so large that a space with a single dimension for every feature becomes inconvenient representation, since a single table column for every feature would cause the table to explode in size and traversal time.

For example, an autonomous vehicle has to contend with everything from rocks on the road and snowflakes on the sensors, to GPS failures, to brute force attacks on its communication channels. In many situations, it would be difficult or impossible to store all such possible sources of risk in a separate column in a table. Moreover, there may not be a convex hull that one can define such that points inside are easier for the AI to handle than points outside. Instead, every single traffic case can be mapped onto a manifold. Here, a manifold represents the entire set of situations an AI is expected to handle. As in a space, nearby points in the manifold encode similar situations. After operating at a particular point, the AI can move or be moved to another point in the manifold either close to or far away, in many embodiments influenced by the output of the last operation. In a variety of embodiments, a similarity graph can act as a manifold. In numerous embodiments, the manifold itself does not contain all the underlying data for each individual situation, but the underlying data can be encoded in an outside data structure (e.g. a knowledge graph) and linked to the manifold, which itself can also be stored in the knowledge graph.

Systems and methods for graph-based AI training in accordance with embodiments of the invention are illustrated. In one embodiment, a graph interface system including a processor, and a memory configured to store a graph interface application, where the graph interface application directs the processor to obtain a set of training data, where the set of training data describes a plurality of scenarios, encode the set of training data into a first knowledge graph, generate a manifold based on the first knowledge graph, and train an AI model by traversing the manifold.

In another embodiment, to encode the set of training data into the knowledge graph, the graph interface application directs the processor to identify objects within each scenario in the plurality of scenarios, store the identified objects within the first knowledge graph, determine spatiotemporal features for each object, store the spatiotemporal features within the first knowledge graph, and generate spatiotemporal scenarios by clustering the first knowledge graph based on the spatiotemporal features.

In a further embodiment, the graph interface application further directs the processor to add semantic meaning to spatiotemporal features.

In still another embodiment, to add semantic meaning to spatiotemporal features, the graph interface application further directs the processor to obtain a second knowledge graph from a kernel set of annotated spatiotemporal scenarios, merge the first knowledge graph and the second knowledge graph, assign annotations from scenarios in the second knowledge subgraph to identical scenarios in the first knowledge subgraph, obtain a third knowledge subgraph encoding only descriptions of spatiotemporal scenarios, merge the third knowledge subgraph into the first knowledge subgraph, assign spatiotemporal scenarios in the first knowledge graph to descriptions from the third knowledge subgraph using annotations from the second knowledge subgraph, and assign still-unconnected descriptions from the third graph to still-unannotated scenarios in the first knowledge graph via an inference method.

In a still further embodiment, the inference method is a Bayesian inference method.

In yet another embodiment, to generate a manifold based on the first knowledge graph, the graph interface application further directs the processor to derive new spatiotemporal scenarios within the first knowledge graph, calculate a similarity measure between each spatiotemporal scenario in the first knowledge graph, and embed the spatiotemporal scenarios into a manifold by connecting spatiotemporal scenarios via edges with an edge weight equal to the similarity measure between a first spatiotemporal scenario and a second spatiotemporal scenario connected by their respective edge.

In a yet further embodiment, to generate a manifold based on the first knowledge graph, the graph interface application further directs the processor to prune illegal spatiotemporal scenarios.

In another additional embodiment, to traverse the manifold, the graph interface application directs the processor to begin at a centermost node in the manifold, and successively navigate to a new node that is the greatest total distance from all previously visited nodes.

In a further additional embodiment, the AI model is used in an autonomous vehicle control system.

In another embodiment again, the training data comprises forward-mounted monocular camera footage and textual accident reports.

In another additional embodiment, the first knowledge graph is constructed using dimensional data structures.

In an additional embodiment, the method includes auditing at least one scenario in the manifold.

In yet another additional embodiment, the method includes a projection of the first knowledge graph using a hybrid interface.

In a further embodiment again, a method for training an AI using a graph interface system includes obtaining a set of training data, where the set of training data describes a plurality of scenarios, encoding the set of training data into a first knowledge graph, generating a manifold based on the first knowledge graph, and training an AI model by traversing the manifold.

In still yet another embodiment, encoding the set of training data into the knowledge graph includes identifying objects within each scenario in the plurality of scenarios, storing the identified objects within the first knowledge graph, determining spatiotemporal features for each object, storing the spatiotemporal features within the first knowledge graph, and generating spatiotemporal scenarios by clustering the first knowledge graph based on the spatiotemporal features.

In a still yet further embodiment, the method further includes adding semantic meaning to spatiotemporal features.

In still another additional embodiment, adding semantic meaning to spatiotemporal features includes obtaining a second knowledge graph from a kernel set of annotated spatiotemporal scenarios, merging the first knowledge graph and the second knowledge graph, assigning annotations from scenarios in the second knowledge subgraph to identical scenarios in the first knowledge subgraph, obtaining a third knowledge subgraph encoding only descriptions of spatiotemporal scenarios, merging the third knowledge subgraph into the first knowledge subgraph, assign spatiotemporal scenarios in the first knowledge graph to descriptions from the third knowledge subgraph using annotations from the second knowledge subgraph, and assigning still-unconnected descriptions from the third graph to still-unannotated scenarios in the first knowledge graph via an inference method.

In a still further additional embodiment, the inference method is a Bayesian inference method.

In still another embodiment again, generating a manifold based on the first knowledge graph includes deriving new spatiotemporal scenarios within the first knowledge graph, calculating a similarity measure between each spatiotemporal scenario in the first knowledge graph, and embedding the spatiotemporal scenarios into a manifold by connecting spatiotemporal scenarios via edges with an edge weight equal to the similarity measure between a first spatiotemporal scenario and a second spatiotemporal scenario connected by their respective edge.

In a still further embodiment again, generating a manifold based on the first knowledge graph includes pruning illegal spatiotemporal scenarios.

In yet another additional embodiment, traversing the manifold includes beginning at a centermost node in the manifold, and successively navigating to a new node that is the greatest total distance from all previously visited nodes.

In a yet further additional embodiment, the AI model is used in an autonomous vehicle control system.

In yet another embodiment again, a graph interface system includes a processor, and a memory configured to store a graph interface application, where the graph interface application directs the processor to obtain a set of training data, where the set of training data describes a plurality of scenarios, encode the set of training data into a first knowledge graph, by identifying objects within each scenario in the plurality of scenarios, storing the identified objects within the first knowledge graph, determining spatiotemporal features for each object, storing the spatiotemporal features within the first knowledge graph, and generating spatiotemporal scenarios by clustering the first knowledge graph based on the spatiotemporal features; generate a manifold based on the first knowledge graph, by deriving new spatiotemporal scenarios within the first knowledge graph, calculating a similarity measure between each spatiotemporal scenario in the first knowledge graph, and embedding the spatiotemporal scenarios into a manifold by connecting spatiotemporal scenarios via edges with an edge weight equal to the similarity measure between a first spatiotemporal scenario and a second spatiotemporal scenario connected by their respective edge, and train an AI model by traversing the manifold.

In a yet further embodiment again, the training data includes forward-mounted monocular camera footage and textual accident reports.

In another additional embodiment again, the first knowledge graph is constructed using dimensional data structures.

In a further additional embodiment again, the method includes auditing at least one scenario in the manifold.

In still yet another additional embodiment, the method includes a projection of the first knowledge graph using a hybrid interface.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 6B illustrates a table representation of a data set in accordance with an embodiment of the invention.

DETAILED DESCRIPTION

Figure 1:
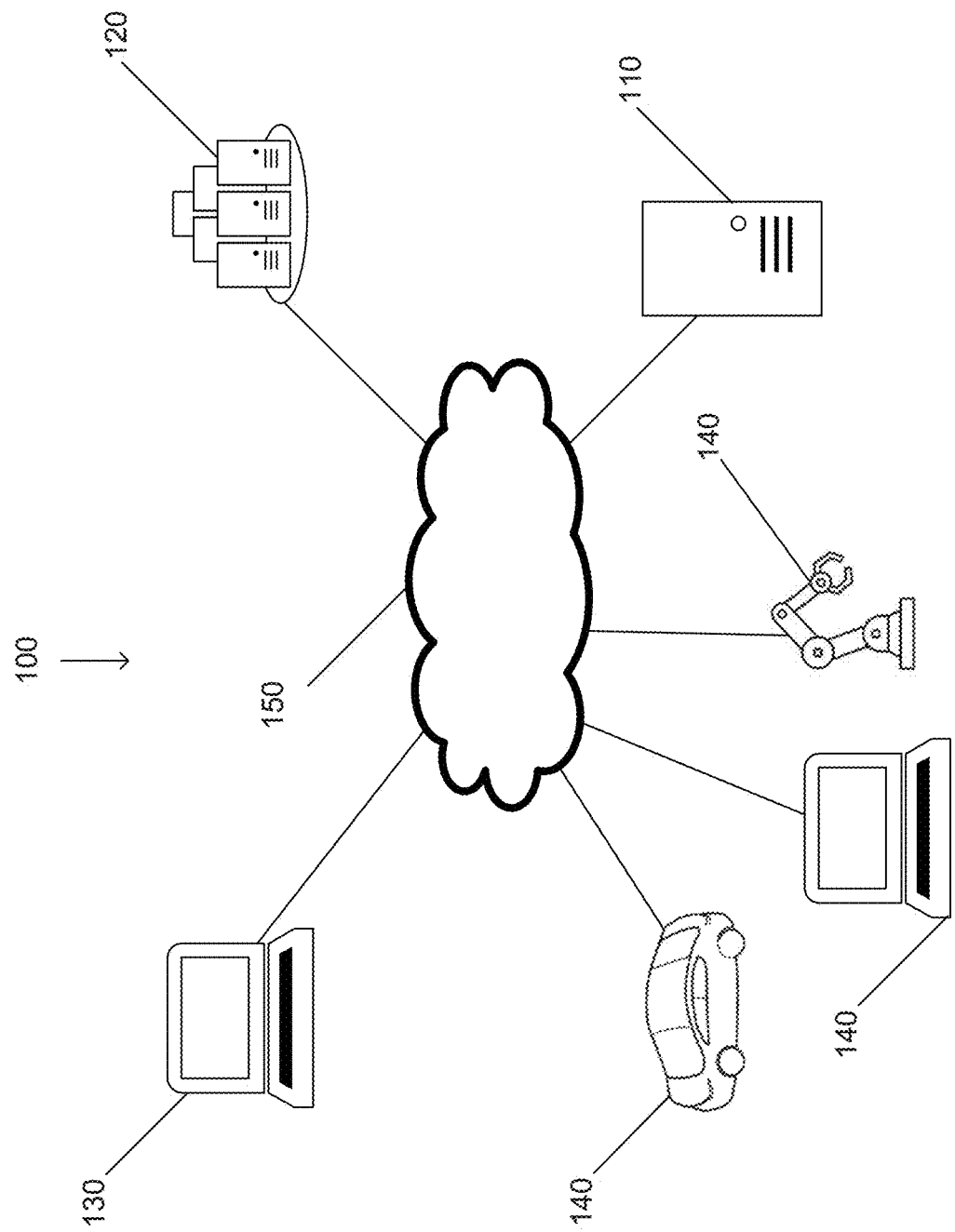
FIG. 1 is a system diagram for a graph interface system in accordance with an embodiment of the invention.

Turning now to the drawings, systems and methods for graph-based risk analysis are described. Graphs, in the sense of sets of connected nodes and edges, are powerful tools that can be used to encode any arbitrary data. In numerous embodiments, the data underlying a graph is stored in a data structure called a "graph database." Graph database manipulation systems can be used to create and interface with graph databases through any of a variety of different means, including, but not limited to, text based methods or visual interfacing methods. However, the capabilities of graph database manipulation systems and/or any other graph-based systems can be augmented beyond conventional graph operations. Systems and methods described herein provide augmentations to graph databases which provide functionality for using graphs in concert with AI and ML systems that increase usability of big data sets from both a human perspective and a machine perspective.

Broadly, ML systems are systems that improve through experience. To that end, ML systems are often provided with training data which aims to cover as many situations that the ML system will encounter as possible in order to provide the requisite experience. Graphs can be used to enhance the quality of the "experience" gained during training by enabling the ML system to more fully understand the training data. Further, graphs can be used to encode new types of training data by merits of the graph structure itself. For example, human interactions with an application are often highly complex, and in many cases, it is the human interactions themselves that an AI application seeks to emulate. Using graphs, despite the complexities, human interactions with machines can be encoded in a schema-free way through the use of graphs. For example, graphs can be used to create an interaction medium that allows for 1-to-1 mapping from a user workspace (e.g. an application UI) and/or work product. In many embodiments, the data are encoded in a way that natively abstracts work operations away from domain-specific details. These data can be used for training an AI to perform and/or assist with the tasks the human was performing.

On the other side of AI training, once trained, it is very difficult to understand how exactly an ML model is operating. While neural networks are discussed in examples below, one of ordinary skill in the art can appreciate that techniques described can be modified to work on other ML models. With a neural network as an example, weights at each node are modified during training. Because neural networks can contain many nodes and many edges, it is difficult to understand what each node is doing, or how the network as a whole is operating. Graphs can be utilized to enable a user to dive into the network in a human-comprehensible way to understand what each node and/or set of nodes is doing within the network.

Graphs are not restricted to only encoding data. In numerous embodiments, nodes and/or edges can encode computational processes. For example, computational actions taken by a user can be encoded as a computational flow graph, where each node encodes a particular computational step. In many embodiments, nodes can further send messages along edges to other nodes, or to a computing environment outside of the graph structure itself. In this way, graphs can act similar to a visual programming language. In a variety of embodiments, by mixing data and computational processes in the same graph, a more flexible system that can encode data and metadata within the graph structure via embedded computations which can simulate the data when needed.

Graphs can further be used to represent data in ways more easily comprehensible to human users. Described herein is a "flat interface," as opposed to a mixed-hierarchy interface, which is capable of maintaining all operations and representing a graph while limiting display elements to no more than one level of recursion. Furthermore, graph database manipulation systems can be augmented with tools described herein such as adaptive cursors, natural graph querying tools, graph transformation tools, motor-based interaction tools, and many more discussed below.

One of the many applications of the graph-based systems and methods described herein is the ability to understand risk at a more fundamental level. In any complex system, of the most useful things to understand is risk. For example, in commercial domains such as insurance, it may no longer be sufficient to understand risk via the statistics of historical events. Rather, it is now desirable that many sources of risk be understood before they ever occur. Risk can be assigned to nodes in a knowledge graph, where each node represents a scenario and/or class of scenarios. In some embodiments, risk assumptions can be automatically propagated through the graph. Knowledge graphs that encode risk can be converted into manifolds for easier comprehension, and can be used to identify and/or create training data sets that more accurately capture risk profiles for use in AI training. In a variety of embodiments, manifolds can also be projected onto 2-D representations for easier user comprehension. Systems for interfacing with graphs and performing processes similar to those described above are discussed below.

Graph Interface Systems

Graph interface systems are systems which enable the visualization and manipulation of graph databases. In many embodiments, graph interface systems provided expanded toolsets such as, but not limited to, those for facilitating human-AI interaction, ML training using graphs, risk assessment, and/or any other graph manipulation tool as appropriate to the requirements of specific applications of embodiments of the invention. In many embodiments, graph interface systems are implemented on any of a variety of distributed and/or remote (cloud) computing platforms. However, graph interface systems can be implemented on local architectures as well. Graph interface systems can further include connections to third party systems, and in numerous embodiments, retrieve data that can be incorporated into a graph.

Turning now to FIG. 1, a graph interface system in accordance with an embodiment of the invention is illustrated. System 100 includes a graph interface device 110. Graph interface devices can generate graphs from graph databases and include a set of tools for manipulating, rendering, and utilizing graphs. System 100 further includes data severs 120. Data servers can provide data desired by a user, which in turn can be encoded into a graph by a graph interface device. In numerous embodiments, data servers are third party servers.

System 100 further includes at least one display device 130. Display devices are devices which enable humans to interact with the system, such as, but not limited to, personal computers, tablets, smartphones, smart televisions, and/or any other computing device capable of enabling a human to interface with a computer system as appropriate to the requirements of specific applications of embodiments of the invention. In numerous embodiments, the display device and graph interface device are implemented using the same hardware.

System 100 includes deployment devices 140. Deployment devices can be any number of different machines that incorporate AI and/or ML systems that utilize and/or are trained using graphs managed by graph interface devices. Example deployment devices include, but are not limited to, autonomous vehicles, robotic systems, virtual assistants, and/or any other program or device that can incorporate an AI or ML system as appropriate to the requirements of specific applications of embodiments of the invention.

Components of system 100 are connected via a network 150. In numerous embodiments, the network is a composite network made of multiple different types of network. In many embodiments, the network includes wired networks and/or wireless networks. Different network components include, but are not limited to, the Internet, intranets, local area networks, wide area networks, peer-to-peer networks, and/or any other type of network as appropriate to the requirements of specific applications of embodiments of the invention. While a specific graph interface system is described with respect to FIG. 1, any number of different systems can be architected in accordance with embodiments of the invention. For example, many embodiments may be implemented using a single computing platform. In a variety of embodiments, deployment devices are not connected via a network, and instead can be loaded with AIs or ML systems produced using graph interface devices. As one of ordinary skill in the art can appreciate, many different configurations of graph interface systems are possible in accordance with embodiments of the invention.

Graph Interface Devices

Graph interface devices are devices that can generate graphs from graph databases. In numerous embodiments, graph interface devices provide tool suites for manipulating, rendering, and utilizing graphs. In a variety of embodiments, graph interface devices are capable of converting conventional databases into graph databases. In many embodiments, graph interface devices include many or all of the capabilities of graph database manipulation devices. Many tools that can be provided by many embodiments of graph interface devices are discussed in below sections.

Figure 2:
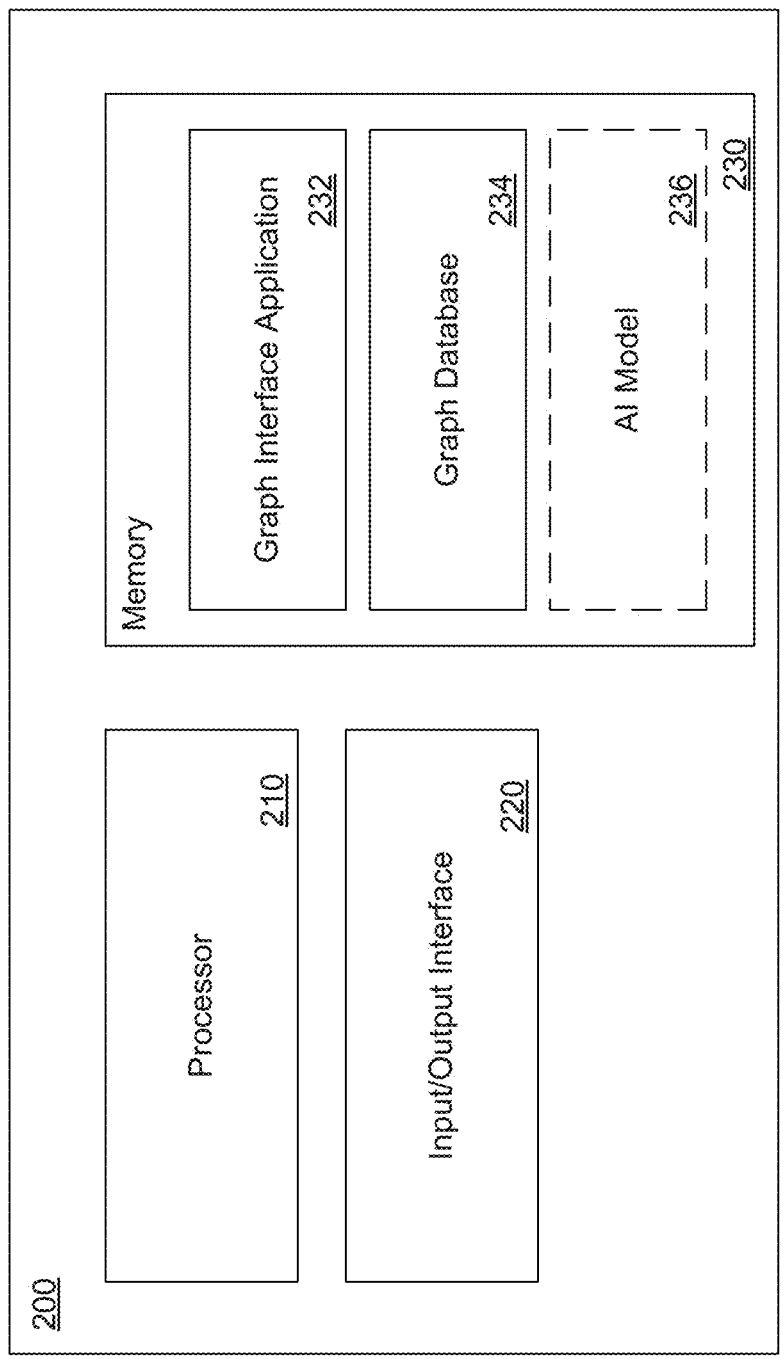
FIG. 2 is a block diagram for a graph interface device in accordance with an embodiment of the invention.

Turning now to FIG. 2, a conceptual block diagram of a graph interface device in accordance with an embodiment of the invention is illustrated. Graph interface device 200 includes a processor 210. Processors can be any processing unit capable of performing logic calculations such as, but not limited to, central processing units (CPUs), graphics processing units (GPUs), application-specific integrated circuits (ASICs), field-programmable gate arrays (FPGAs), or any other processing device as appropriate to the requirements of specific applications of embodiments of the invention.

Graph interface device 200 further includes an I/O interface 220. I/O interfaces can enable communication between the graph interface device, other components of a graph interface system, and/or any other device capable of connection as appropriate to the requirements of specific applications of embodiments of the invention. Graph interface device 200 further includes a memory 230. Memories can be any type of memory, such as volatile memory, non-volatile memory, or any mix thereof. In many embodiments, different memories are utilized within the same device. In a variety of embodiments, portions of the memory may be implemented externally to the device.

Memory 230 includes a graph interface application 230. In numerous embodiments, graph interface applications have many or all of the properties of a graph database manipulation application. In a variety of embodiments, graph interface applications enable various graph tools. Memory 230 further includes a graph database 234. In numerous embodiments, graph databases are graph encodings of data and/or operations. In many embodiments memory 230 further includes at least one AI model 236. In a variety of embodiments, the AI model is trained using a graph-based method.

While a specific implementation of a graph interface device is illustrated with respect to FIG. 2, any number of different architectures can be utilized as appropriate to the requirements of specific applications of embodiments of the invention. For example, different interfaces, numbers of processors, types of components, and/or additional or fewer stored data in memory can be utilized as appropriate to the requirements of specific applications of embodiments of the invention.

Graph interface systems can provide any of a number of various tools and functionalities to a user. Various tools that can be provided by graph interface devices are discussed in more detail below, beginning with those that enable the visualization and encoding of risk. Risk encoding can be used for any number of applications, including, but not limited to, training more robust AI systems.

Visualizing and Encoding Risk

As discussed herein, a valuable application of graph interface systems is the ability to make highly complex systems tractable. For many complex systems that have real-world implications, one of the most useful things to understand within the system is risk. Risk can take any of a number of forms depending on the context. For example, risk in the context of insurance can be modeled as the likelihood of adverse outcomes to particular scenarios. Risk in robotics applications can be situations in which the robotic system will act adversely to human life, its own integrity, the failure of its goal, or any of a number of other scenarios depending on the viewpoint of the user. For many systems which are to be deployed in the real world, either physically or digitally (and in some cases, both), it is desirable to understand all risks prior to deployment.

Figure 3:
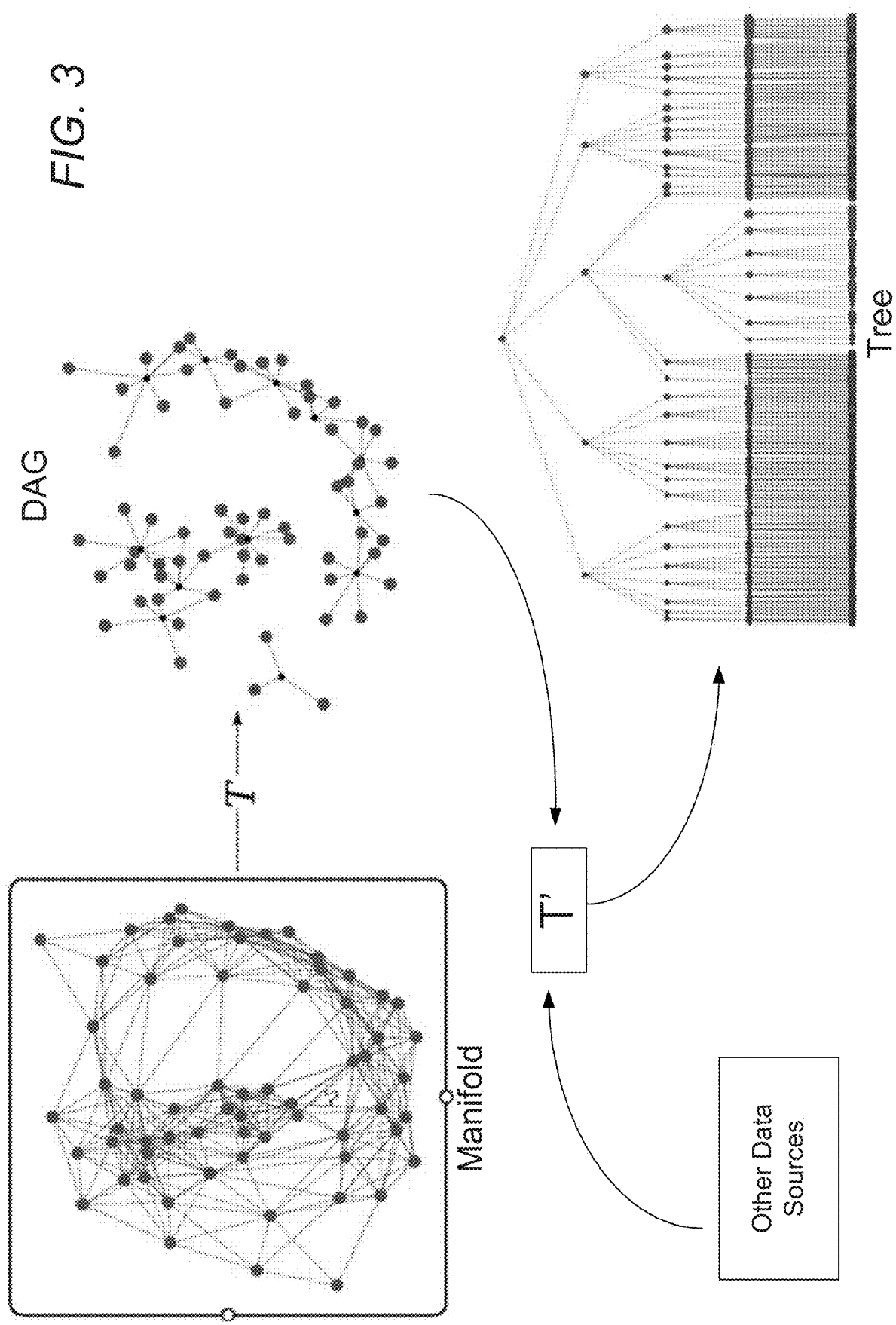
FIG. 3 illustrates a translation between knowledge graph structures in accordance with an embodiment of the invention.

Fortunately, in many cases, the behavior of automated systems can be simulated in a controlled environment and compared against real life in a subset of circumstances. However, in many situations, the whole gamut of scenarios represents an incredibly large problem space. Despite this, in many embodiments, graph interface systems can encode the problem space and determine points of high risk in multiple different forms. In numerous embodiments, different representations of a graph can be used to better show different sources of risk and/or how they relate. In a variety of embodiments, a tree structure can be an intuitive way for a user to interface with the concept of risk, however any number of different representations may be more useful for a given user. Turning now to FIG. 3, translation between knowledge graph structures that encode risk in accordance with an embodiment of the invention is illustrated. As shown, a manifold (left, shown as a 2-D projection) can be transformed via a transformation T into a DAG. The DAG can be combined with other data sources to, for example, increase the interpretability of the knowledge graph (as discussed herein), and further transformed into a tree structure (right). In numerous embodiments, transformations can be performed in reverse. In a variety of embodiments, despite successive transformations on the graph structure and/or incorporations of additional data to the graph, nodes in any arbitrary representation can be mapped directly back onto parameters from the input data. As one of ordinary skill in the art can appreciate, the order of graph transformations from a manifold to DAG to tree is merely illustrative, and is not an enforced set of transformations. Indeed, any number of different transformations can be applied as appropriate to the requirements of specific applications of embodiments of the invention.

As noted above, any arbitrary kind of data can be represented by a graph. For the purposes of assessing risk, candidate classes of data that could inform risk predictions can include, but are not limited to, historical data on similar systems, simulation results, and/or any other data that can speak to the risks associated with a system as appropriate to the requirements of specific applications of embodiments of the invention. In numerous embodiments, historical data can be represented as time-series data, structured event data, unstructured textual event reporting, audio and/or video data, and/or any format of data available and relevant to a system of interest. In a variety of embodiments, simulation results are clustered into event types.

Figure 4:
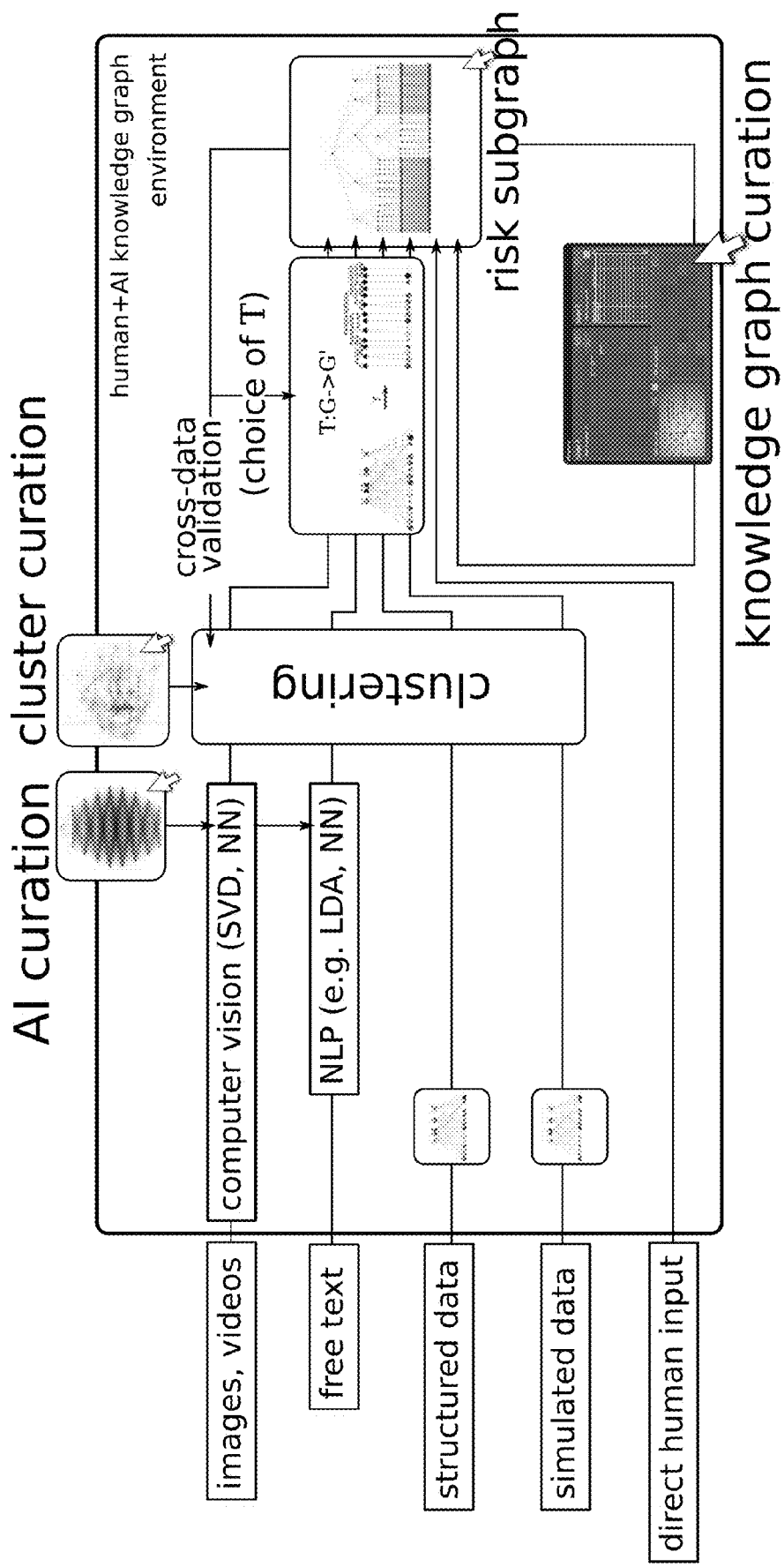
FIG. 4 a block diagram for a data fusion process in accordance with an embodiment of the invention is illustrated.

The encoding of any of the above data types to form a unified representation of knowledge. In numerous embodiments, the leaf nodes in a graph limited to being a tree structure can be made to represent independent risk scenarios which can be summed to get the risk for the entire system. Turning now to FIG. 4, a schematic of an example data fusion process to create a knowledge graph of risk from multiple data sources in accordance with an embodiment of the invention is illustrated. In the illustrated embodiment, multiple data sources, both real and simulated, structured and unstructured, (left) feed into an automatic and/or human-aided process and ultimately into a knowledge graph. Opportunities for human intervention are indicated by mouse cursors, both in the AI curation, the clustering stage, navigation of the final subgraph, and the knowledge graph curation stage. In numerous embodiments, to the extent that final nodes map onto data from multiple sources, then that overlap can be used to validate one data source against the other (cross-data validation), which can help to determine how data sources should be translated, remapped and normalized.

In many embodiments, once a graph has been created that encodes risk scenarios, the work of calculating the risk of any particular scenario can be performed. In many embodiments, a risk metric R representing the risk of an agent operating in an arbitrary scenario can be calculated according to:

$$R = \Sigma(R_{node} * P_{node})$$

In numerous embodiments, as calculated above, the risk metric R is a frequentist formulation where the risk of the whole system is equal to the weighted sum of the risks of the independent parts. In various embodiments, $R_{node}$ is one of two things: the risk expected only from the agent or system being assessed (a "posterior"), or the sense of a risk expected across all possible agents or systems in a given scenario (a "prior"), which is referred to specifically as $R_{0,node}$. $P_{node}$ then represents the probability of the scenario.

As a concrete example, if the risk of robotic system to human life were to be assessed over all possible situations the robotic system might encounter, then $R_{node}$ generally can be the risk to human life of a particular situation, $P_{node}$ can be the probability of that situation. $R_{node}$ specifically could be the risk of a particular robotic system in that situation, or it could be the average expected risk of every kind of robotic system in that situation ($R_{0,node}$), depending on the desired interpretation of R as the risk of all robots or the risk of a particular robot. In numerous embodiments, if there is missing information about a particular robot for any $R_{node}$, the $R_{node}$ corresponding to the average risk could be supplied. I.e., the "prior" may be used in lieu of the "posterior". In a variety of embodiments, a particular posterior $R_{node}$ can be inferred from other available nodes.

In a variety of embodiments, assuming that different nodes corresponding to different modeled or physical scenarios can be said to be similar to other nodes, then a knowledge structure connecting these nodes may be devised, such that unknown risks for one scenario may be modeled or inferred from known risks in others. If a distance metric is established within the network, then unknown risk in a node, $R_i$, could be inferred from known risk in a node, $R_1$, according to:

$$R_n = R_{0,n} * (R_j/R_{0j})^{exp(-(i-j)^2/\sigma)}$$

For many situations, one of many useful formulations is one in which the knowledge structure is a simple hierarchy or tree, where independent scenarios ($R_{node}$, above) are modeled as leaf nodes. Here the risk calculation can be recast as a recursive process:

$$R_n = \begin{cases} R_n & \text{if } succ(n) = \emptyset \\ \sum_{i \in succ(n)} R_i & \text{if } succ(n) \neq \emptyset \end{cases}$$

where succ(n) reflects a query that returns the successor node of n.

This is a convenient formulation if risks are unknown or cannot be determined below a given level. In such a case, the system can default to using expected risks, $R_0$:

$$R_n = \begin{cases} R_n & \text{if } succ(n) = \emptyset, R_n = \text{known} \\ R_{0,n} & \text{if } succ(n) = \emptyset, R_n = \text{unknown} \\ \sum_{i \in succ(n)} R_i & \text{if } succ(n) \neq \emptyset \end{cases}$$

Alternatively, in a variety of embodiments, a conservative approach where the worst-case or highest risk is assumed within every neighbor (i.e. group of sibling nodes):

$$R_n = \begin{cases} R_n & \text{if } succ(n) = \emptyset, R_n = \text{known} \\ \max(R_{0,i}, i \in \text{neighbors}) & \text{if } succ(n) = \emptyset, R_n = \text{unknown} \\ \sum_{i \in succ(n)} R_i & \text{if } succ(n) \neq \emptyset \end{cases}$$

Figure 5:
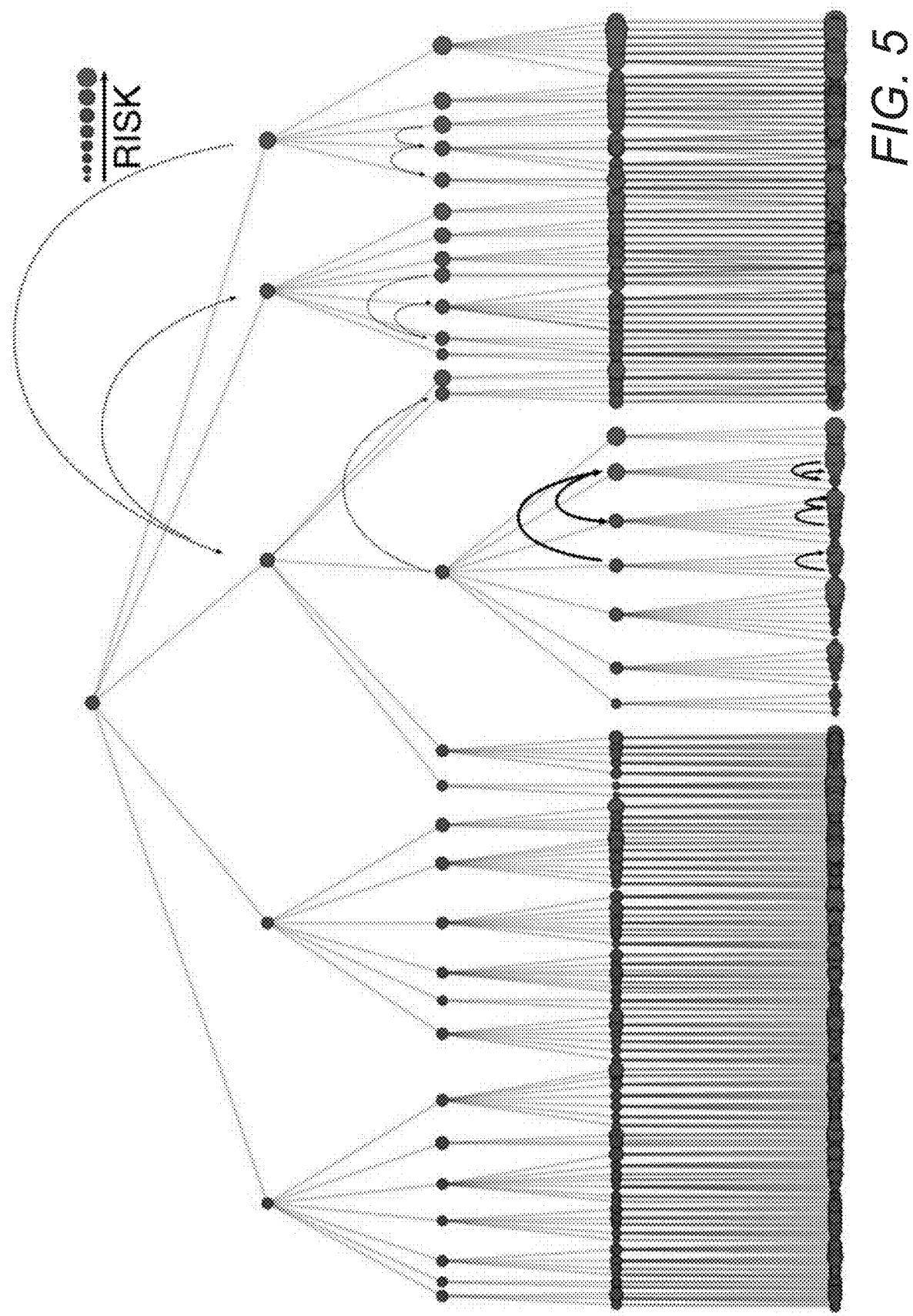
FIG. 5 is a graphical representation of a process for adaptively calculating performance on risk in O(log(N)) time for an arbitrary data set in accordance with an embodiment of the invention.

In many embodiments, the hierarchical formulation can be useful if risk needs to be understood in an all-or-nothing way, i.e. if the goal is to identify the lowest risk level among a group of similar scenarios at which a system's performance fails, but it is prohibitively difficult to test every scenario. In numerous embodiments, graph interface systems can perform adaptive risk testing in O(log(N)) time. Turning now to FIG. 5, a graphical representation for adaptively calculating performance on risk in O(log(N)) time for an arbitrary example data set in accordance with an embodiment of the invention is illustrated. In the illustrated embodiment, the hierarchical knowledge graph is a tree in which independent risk scenarios are stored at the leaves. Risk is graphically shown to the user by dot color and dot size, where small blue nodes reflect low risk, and large red nodes reflect high risk. Further, the knowledge graph has been transformed such that average risk of child nodes are reflected at the node one level above, and similarity between scenarios (where each node encodes a scenario) is indicated by the distance within the graph. I.e. two scenarios which are qualitatively similar but have slightly different risks end up as neighboring nodes in the hierarchy.

As illustrated, in order to calculate overall risk score without visiting each node, a risk assessor need only determine a point of equivocal performance in each part of the hierarchy. That is, by determining a point at which an agent performs at 50% probability, and based on the assumption that nearby nodes are qualitatively similar, the risk score R can be approximated by understanding where performance becomes equivocal. In numerous embodiments, the aforementioned risk calculation relies on an assumption that there is independence between nodes in the graph whose overall risk profile can be calculated by a sum over probabilities because the nodes are independent. However, in many embodiments, this assumption does not hold true, and in such cases, other graph types can be utilized which encode non-independent scenarios or scenario sub-elements at each node such as, but not limited to, probabilistic graphical models, which are also addressable with the techniques described herein.

Figure 6A:
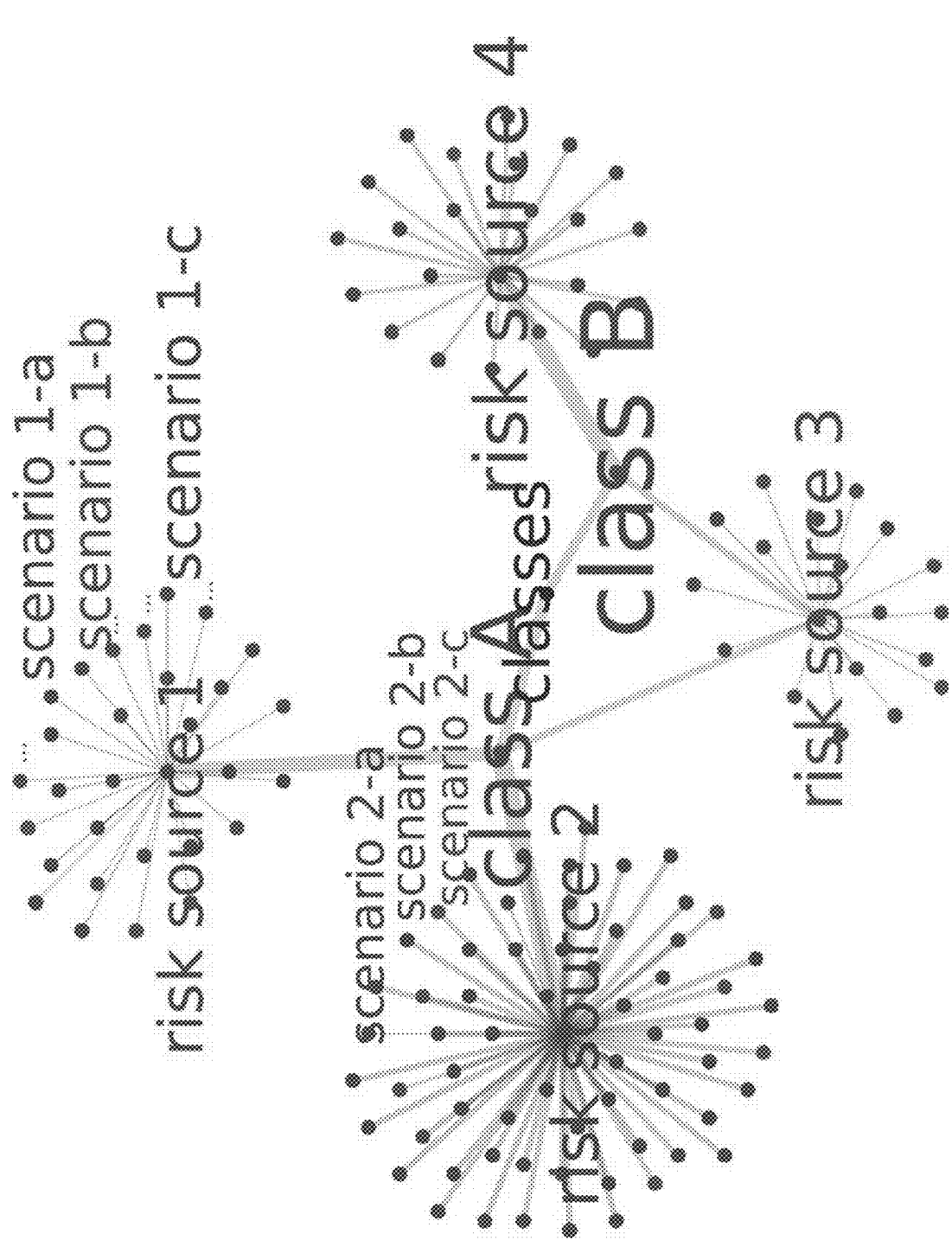
FIG. 6A illustrates a node-link diagram of a data set in accordance with an embodiment of the invention.
Figure 6B:
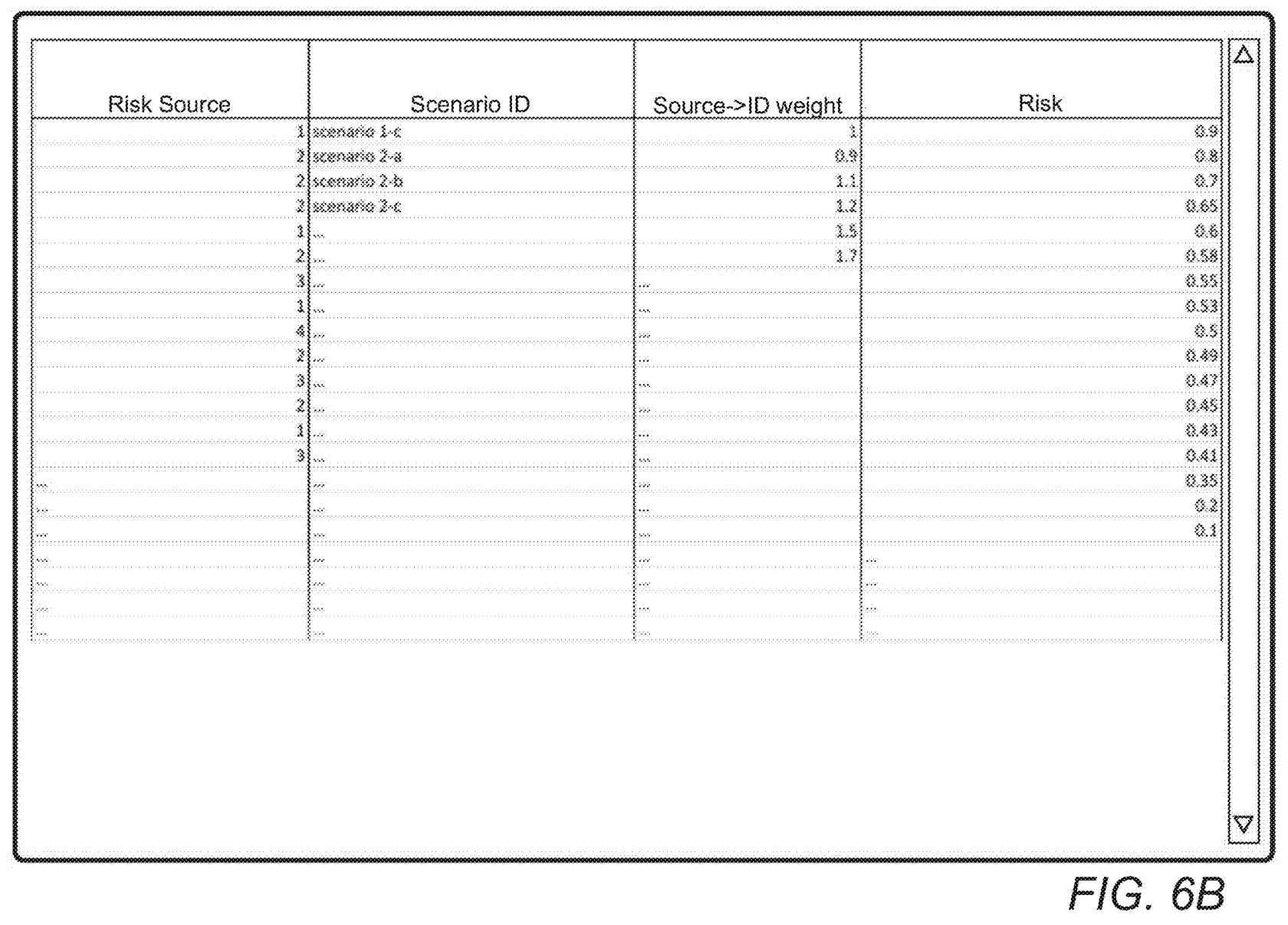
Figure 6C:
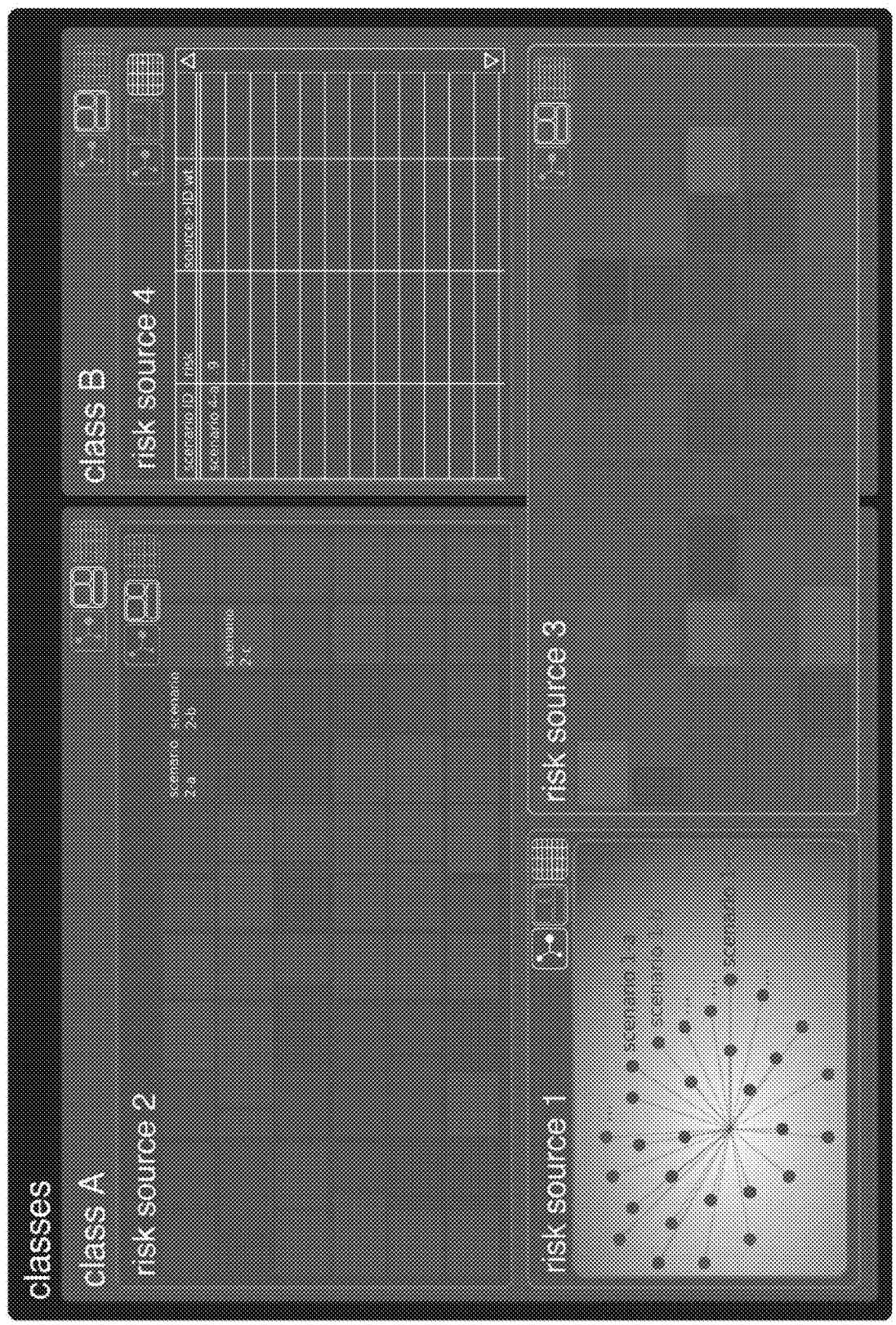
FIG. 6C illustrates a hybrid interface representing a data set in accordance with an embodiment of the invention.

In numerous embodiments, the risk calculations above can be visualized for a human user. In many embodiments, graph interface systems can provide visualizations which attribute user attention according to probability, risk, and/or weight. In a variety of embodiments, the visualizations provided can provide an understanding of nested risks and/or whether risks are independent or mutually dependent. Turning now to FIGS. 6A, 6B, and 6C, different visualizations for visualizing risk as part of a UI in accordance with an embodiment of the invention are illustrated. Each visualization can be offered as native functionality of a graph interface device, and each visualization represents the same information as the others. In numerous embodiments, each visualization or combination of visualizations can be offered to the user simultaneously. In a variety of embodiments, actions in one visualization can be reflected in others. FIG. 6A illustrates a node-link diagram in accordance with an embodiment of the invention which can be manipulated using techniques described above. FIG. 6B illustrates a traditional table-like structure in accordance with an embodiment of the invention, which may have limited functionality but are traditionally well-understood by modern users. FIG. 6C illustrates a hybrid interface in which the graph itself is used to provide useful partitions/subgraphs to the user, and blocks can be used to show scenarios with visualization parameters of the blocks such as, but not limited to, size and color, reflecting the importance of each scenario to the overall risk profile. However, any number of different interfaces can be utilized to represent risk as appropriate to the requirements of specific applications of embodiments of the invention.

Understanding Risk in Autonomous Vehicles

The risk assessment techniques described above can be further understood with reference to a concrete example. Autonomous vehicles (AVs) represent a problem where the operation of a vehicle is both highly complex and is at extreme risk of directly causing human harm. As AV development has progressed, massive datasets collected from testing and simulations have been aggregated. In turn, these datasets have been used to further refine AV systems through AI training. Traditionally, these datasets have been further augmented through a technique known as "fuzzing," where parameters of real, collected scenarios are randomized in order to create many more similar scenarios.

For example, say that an AV deployed in a geofenced pilot intends to take an unprotected left into a lane in which a pedestrian is also crossing, but during the turn the safety driver feels the AV is likely to get too close to the pedestrian and takes over to safely complete the maneuver. Afterward, the situation is run through again offline by the AV vehicle control system (VCS), and its performance is analyzed post-hoc. Then, slight variations can be made based on the information the sensors detected—the timing of the pedestrian crossing can be moved forward or back, and the numerosity of the pedestrians can also potentially be changed—and the VCS can be re-tested on these variations, providing a larger set of scenarios than what were previously available.

Unfortunately, this technique falls short when the all of the ingredients for a high-risk event are not present in any given recorded scenario. If pedestrians cross after the pedestrian signal in one intersection, and oncoming cars speed up to try to beat the signal in a different intersection, in many situations the fuzzing technique will not have the capacity to hypothesize a third intersection with both pedestrians and cars engaging in these risky behaviors simultaneously. Since the latter scenario might necessitate a different decision on the part of an AV trying to make an unprotected left than the AV would have made in either of the first two scenarios, using only a fuzzing-based technique during development, test and validation of an AV is likely to result in inadequate and possibly dangerous behavior by the VCS.

Another problem is that the fuzzing technique only has access to the impoverished model of the environment implied by the parameters assigned to be fuzzed. If pedestrians, cars and bikes are parameterized, but a plastic bag blown by the wind confuses one or more sensors, then it requires a reparameterization of the scenario, which may require a rebuild not only of the object detection components of the system but also the underlying ontology.

While it can be simple to engineer the basic technology to accomplish the most frequent tasks of AVs such as staying in the lane and following a car immediately ahead, the same engineering techniques do not necessarily extend to more complex scenarios, such as navigating unprotected cross-traffic turns ("unprotected lefts"). Indeed, the engineering problem becomes far more difficult when the VCS is required to handle the vast number of edge cases that drivers are expected to face, such as, but not limited to, a car swerving into the lane ahead while surrounded on all sides by other vehicles, or a person unexpectedly jaywalking from behind an occluding truck, or a pedestrian at a crosswalk dressed up as a green traffic light for Halloween. Indeed, as is the case in many situations where humans are involved, there are so many different edge cases that may occur such that to traverse them all in AI training can be intractable. Nor can they be expected to fall within a handful of well-defined classes with known boundaries for which a single test could be constructed which is assumed to cover the whole class. Speaking in the language of optimization, the set of edge cases is not convex.

Figure 7:
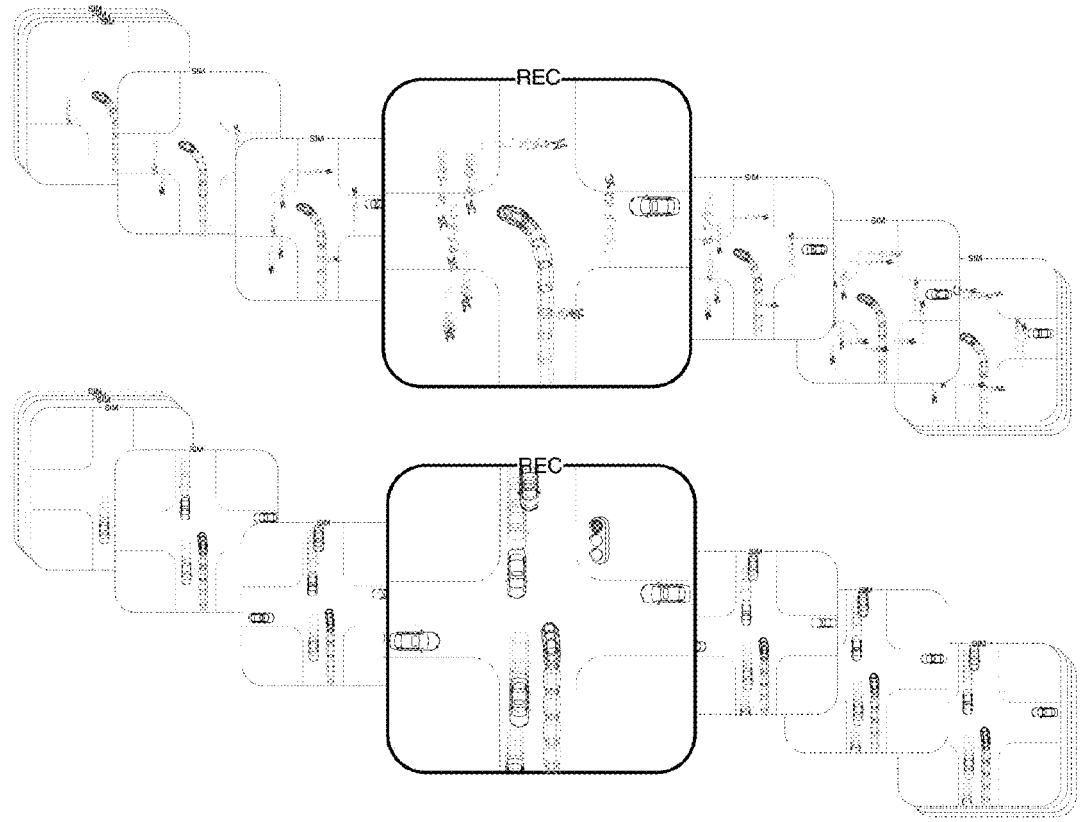
FIG. 7 illustrates an example set of training data for an autonomous vehicle deployment during an unprotected left as a traffic light turns red developed with fuzzing and the corresponding real-life test in accordance with an embodiment of the invention.
Figure 7:
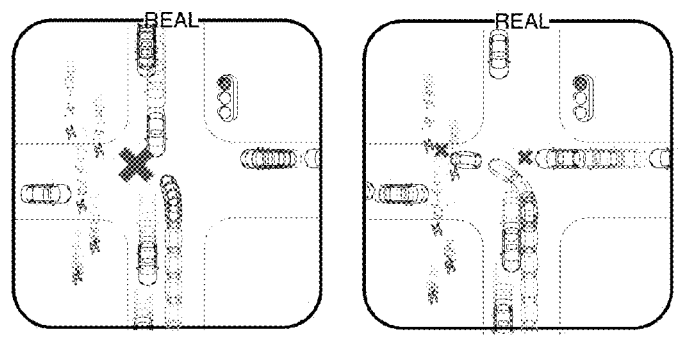

Turning now to FIG. 7, an example set of training data for an autonomous vehicle deployment during an unprotected left as a traffic light turns red developed with fuzzing is illustrated. As shown, the training space include a scenario with pedestrians crossing on the sidewalks (top), and a scenario with oncoming traffic (bottom). These scenarios can be "fuzzed" by manipulating the timing and numerosity of the respective pedestrian and traffic parameters, respectively. If the AV were trained on the top scenario involving pedestrians crossing after the signal, it might learn to pull close to the pedestrians in order to be able to get as much as possible into its desired lane, and then slowly continue just after they finish crossing. If the AV were trained on the car-only scenario, it might not pull into the oncoming lane at all in order to avoid the oncoming car speeding up trying to make it through the yellow light, and then immediately and very quickly speed into the desired lane in order to give maximum clearance from the car soon to come from the east with a green light. The ability to adjust the timing and numerosity of the pedestrians and cars in these two scenarios might help slightly in training the AV, but it falls dramatically short in its inability to hypothesize a third kind of intersection combining the first two. Both kinds of behaviors the AV would have learned would have been dangerous in a third in which the objects from the first two were combined. If actually exposed to a third scenario in which pedestrians and cars might both be illegally running the light (bottom-left figures labeled "REAL"), any combination of the behaviors the AV learned for the first two scenarios would end up being extremely dangerous.

Figure 8:
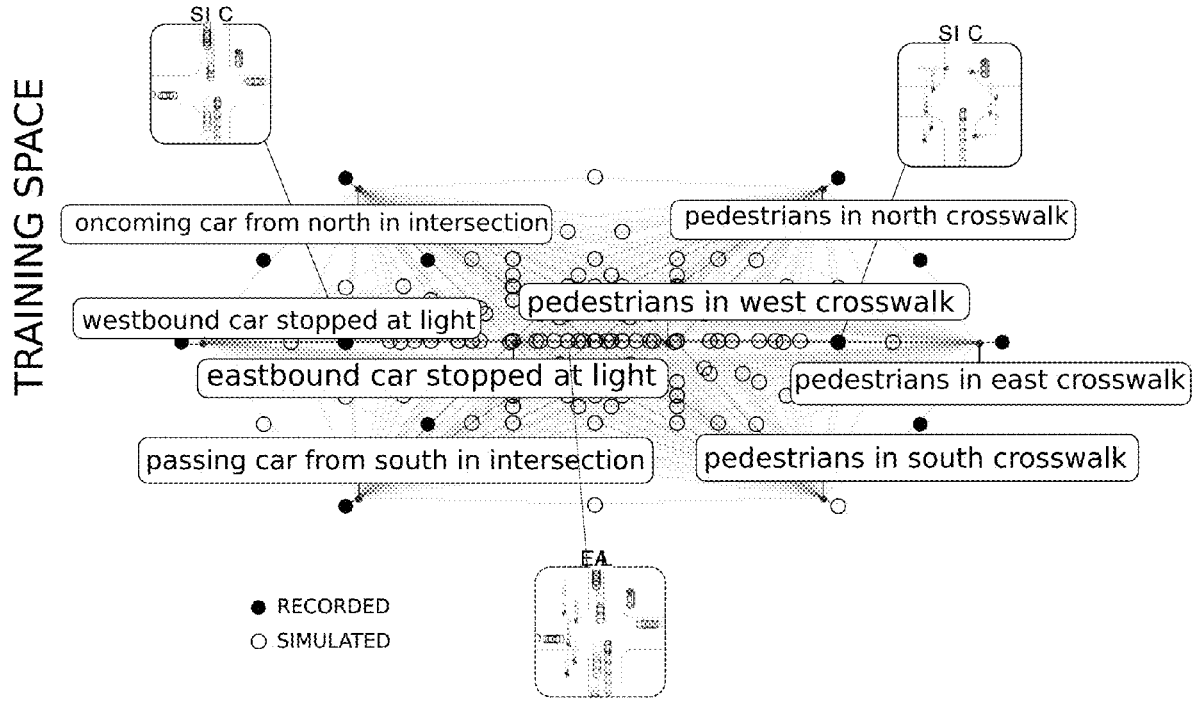
FIG. 8 illustrates an example set of training data for an autonomous vehicle deployment during an unprotected left as a traffic light turns red developed with a graph interface system in accordance with an embodiment of the invention.

In contrast, turning now to FIG. 8 an example set of training data for an autonomous vehicle deployment during an unprotected left as a traffic light turns red developed with a graph interface system in accordance with an embodiment of the invention is illustrated. The scenarios can be incorporated into a graph, with each parameter being represented by nodes. These nodes can then be linked in any of a number of ways (and indeed in all possible ways) to generate hybrid scenarios that are various mixtures of all available scenarios. In the illustrated embodiments, all recorded scenarios are colored black, and it becomes clear that there are large parts of the parameter space in between the recorded data from the two recorded intersections which are not filled in, but can be simulated (hollow dots). One of those in-between scenarios involves both cars and pedestrians running lights, and would be sufficient to train the AV that there were few or no safe ways to complete the unprotected left. Trained on such a system, the AV would learn to take a third, safer action which was different than any combination of actions from the first two—in this case, to continue straight through the intersection.

Of course, the specific edge case illustrated in FIGS. 7 and 8 is only one of many. Systems and methods described herein can encode the entire corpus of situations into an internally consistent graph structure that is traversable by an automated process, such that an optimal test can be constructed for any quantity of interest by presenting an optimally-chosen sequence of edge cases (either as real-life tests of an autonomous vehicle, or tests applied in a simulated environment) that end up being most representative. In numerous embodiments, representative edge cases are determined by their relative risk profiles, which can include, but is not limited to, risk score, scenario type, distance measures, and/or any other data encoded in the graph relative to the node, and/or data aggregated from neighbor nodes as appropriate to the requirements of specific applications of embodiments of the invention.

In numerous embodiments, a scenario is defined as a defined set of starting conditions centered around an object that moves or could interact with moving things. The starting conditions, can be any type of condition, including, but not limited to, positions and velocities of other vehicles phase of pedestrian walk cycle, and physical properties such as reflectances, and/or any number of different scenarios as appropriate to the requirements of specific applications of embodiments of the invention. In numerous embodiments, not all physical properties of the world, e.g. coefficients of friction, may be necessary to represent in every scenario since scenarios are modeled over short timescales in which trajectories are understood to be deterministic. However, depending on the use case, physical properties can be designated as conditions. In the particular example of AVs, entities in the scenario can include, but are not limited to, other vehicles, pedestrians, static objects, and/or any other object in the scenario. However, it is to be understood that entities can be any object as appropriate to the requirements of specific applications of embodiments of the invention. In numerous embodiments, scenarios are both time-bounded and space-bounded. In many embodiment, the space bounding is approximated by the velocities of the other objects multiplied by the time bound. In a variety of embodiments, scenarios are defined by the fact that every time it evolves, either in the real world or in simulation, the ending conditions always end up substantially the same way. That is to say that if the scenario were run a large number of times in simulation or in reality, and the ending states of all of the entities in the scenario were recorded, the total distance between all ending states, or the variance among the final states, is less than a small known bound, $\epsilon$ (epsilon), the set of starting parameters encodes a single scenario.

Figure 9:
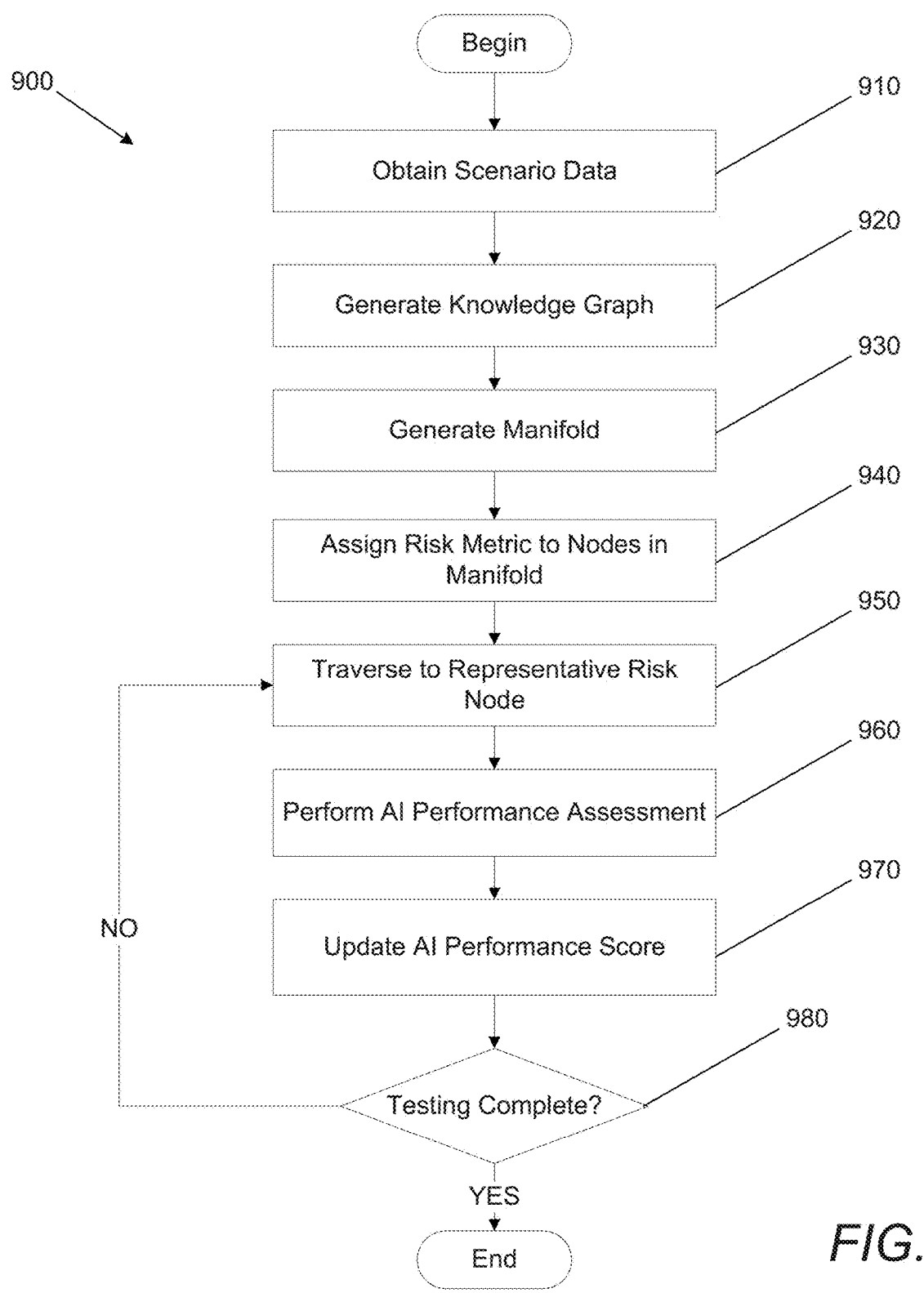
FIG. 9 is a flow chart illustrating a process for assigning risk scores in accordance with an embodiment of the invention.

Turning now to FIG. 9, a flow chart for assigning risk scores in accordance with an embodiment of the invention is illustrated. Process 900 includes obtaining (910) scenario data and generating (920) a knowledge graph. Scenario data can be any data describing different scenarios that an AV can encounter, including, but not limited to, video data, unstructured and/or structured text data, sensor data, and/or any other data that can describe scenarios as appropriate to the requirements of specific applications of embodiments of the invention. Regardless of the types of data obtained, the knowledge graph can be generated using any of a variety of processes including, but not limited to, those described herein. In numerous embodiments, nodes in the knowledge graph represents at least one scenario. In a variety of embodiments, nodes in the knowledge graph reflect parameters of scenarios which can be connected to a scenario node, where the edge weights represent values for the parameters for the scenario. However, different subsets of nodes within a knowledge graph can represent any number of different things as discussed herein. However, there are many different possible graph architectures that can be used to represent scenarios as appropriate to the requirements of specific applications of embodiments of the invention. Due to the structure of the knowledge graph, similar scenarios can be represented by nodes that fall within the same cluster of nodes.

A manifold is generated from the knowledge graph (930). Methods for generating knowledge graphs are discussed below. A risk metric is assigned (940) to each node in the manifold, where the risk metric reflects the relative risk of the particular scenario. Risk metrics can be manually assigned, inferred from the original data, generated via simulation, estimated based on neighbor nodes, and/or estimated via any of a number of risk assessment methods as appropriate to the requirements of specific applications of embodiments of the invention.

Process 900 further includes traversing (950) to a representative risk node. In many embodiments, the representative risk node is the node in the manifold most representative of the greatest risk that could occur when an AV is operating, e.g. the node having the highest risk score. In numerous embodiments, the risk is assessed in accordance with a predetermined risk metric associated with each node and/or each cluster of nodes.

An AI performance assessment is performed (960) on the scenario described by the representative risk node. In a variety of embodiments, the risk assessment involves programmatically testing the scenario using an AV protocol. In numerous embodiments, AV protocols are sets of instructions that can be utilized to run an AV. In numerous embodiments, the scenario is tested using a simulation. However, the scenario can be tested in any number of ways, some of which may not utilize an AV protocol and/or simulation.

An AI performance score is updated (970) based on the result of the test. In numerous embodiments, the AI performance score represents an overall measure of safety of the AI's control over the AV. In many embodiments, more than one AI performance score is utilized. For example, an overall AI performance score can be used, a scenario class based AI performance score can be used (e.g. left turn scenarios), and/or any other type of risk classification as appropriate to the requirements of specific applications of embodiments of the invention.

If testing is complete (980), the process ends. In numerous embodiments, testing is complete once the AI performance score has reached a predetermined threshold. In many embodiments, one or more separate confidence metrics can be used reflecting the confidence in the AI performance score. Confidence thresholds can be based on the number of assessments performed, the number of scenario classes analyzed, or any other metric as appropriate to the requirements of specific applications of embodiments of the invention. As the number of scenarios is often too large to reasonably process using available computing power in a reasonable timeframe, users may optionally select the testing complete condition most appropriate for their usage. However, any number of different termination points can be determined such as, but not limited to, complete traversal exhaustion, real world performance, and/or any other test or combination of tests as appropriate to the requirements of specific applications of embodiments of the invention. If testing is not complete (980), traversal to a new representative risk node occurs and new AI performance assessments are run. In many embodiments, testing is complete once a confidence threshold has been met.

Furthermore, when traversing to a new representative risk node, which node is selected can be optionally tuned by a user. For example, if an overall risk assessment is desired, the next representative risk node can be selected from a node far from the previous representative risk node. In this way, a representative sampling of the most representative nodes across many types of scenarios can be analyzed. If a particular class of scenarios is being assessed, representative risk nodes can be selected from local clusters of nodes with similar scenarios. Selection of representative risk nodes can be assisted via the knowledge graph data structure and other knowledge graph processes.

In many embodiments, the AI performance score and/or a set of similarity measures can be used to adaptively move to successively chosen parts of the knowledge graph to establish a point of equivalence for the purpose of identifying a scenario where a robotic agent is at a given percentage performance success in the neighborhood of an initially chosen scenario. In numerous embodiments, this is achieved using a ladder-based performance testing technique to establish a point of performance equivalence.

Figure 10:
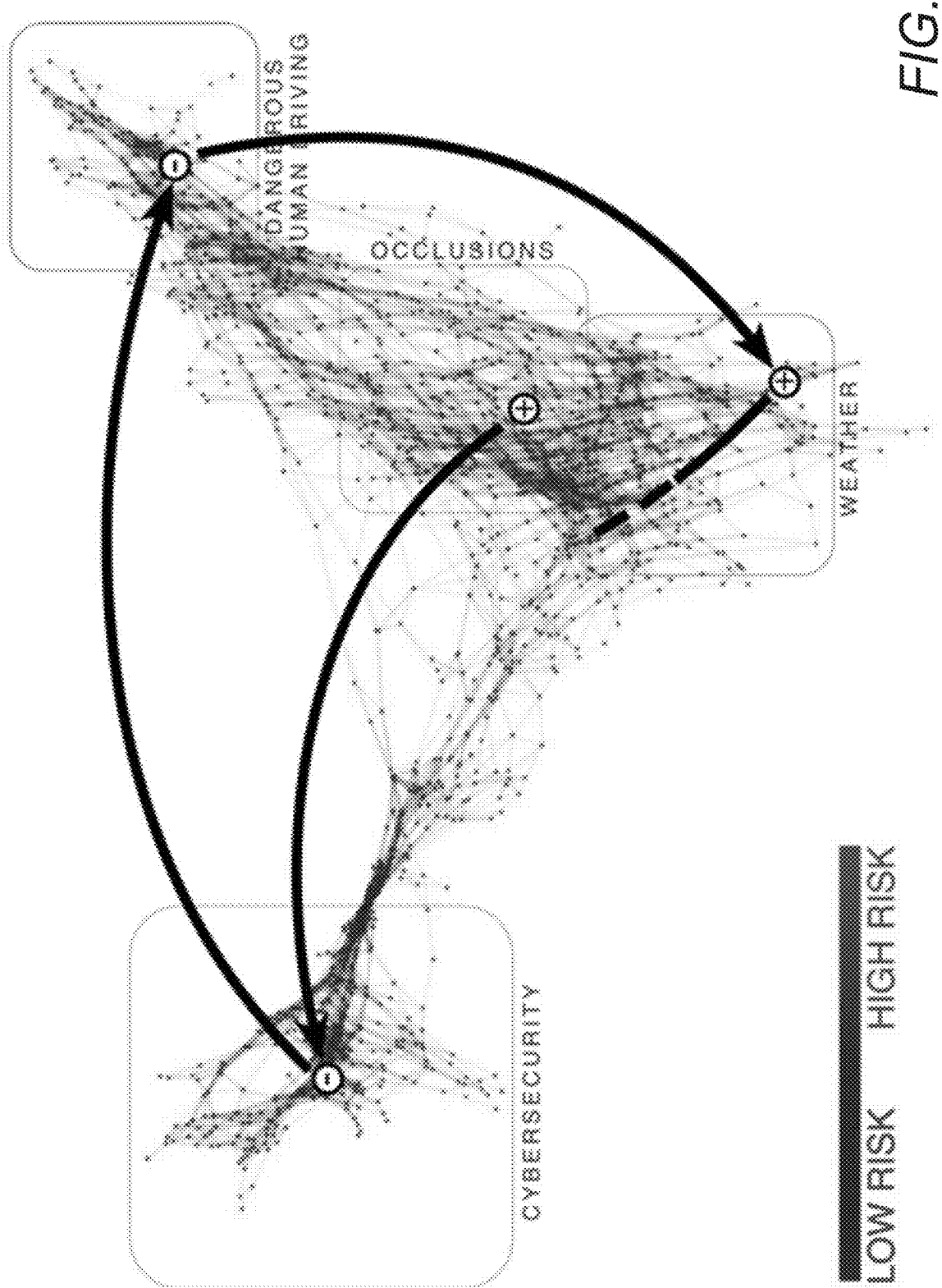
FIG. 10 is a graphical illustration of a process for AI performance score calculation across multiple types of scenarios in a manifold in accordance with an embodiment of the invention.

The above methodology can be performed across an entire graph containing many different classes of scenarios to develop overall scores and/or within specific classes of scenarios in order to determine class specific scores. These concepts are illustrated graphically in accordance with an embodiment of the invention in FIGS. 10 and 11. FIG. 10 illustrates AI performance score calculation process for calculating risk over multiple types of scenario in accordance with an embodiment of the invention. The illustrated AI performance score calculation process invention "hops" around the knowledge graph, starting in the centermost point in the graph, hopping to the most distant node, and then each successive time hopping to the node with the largest summed distance from each of the previously visited nodes. In this way, the most disparate portions of the graph can be examined, and therefore the most representative risk scenarios.

Figure 11:
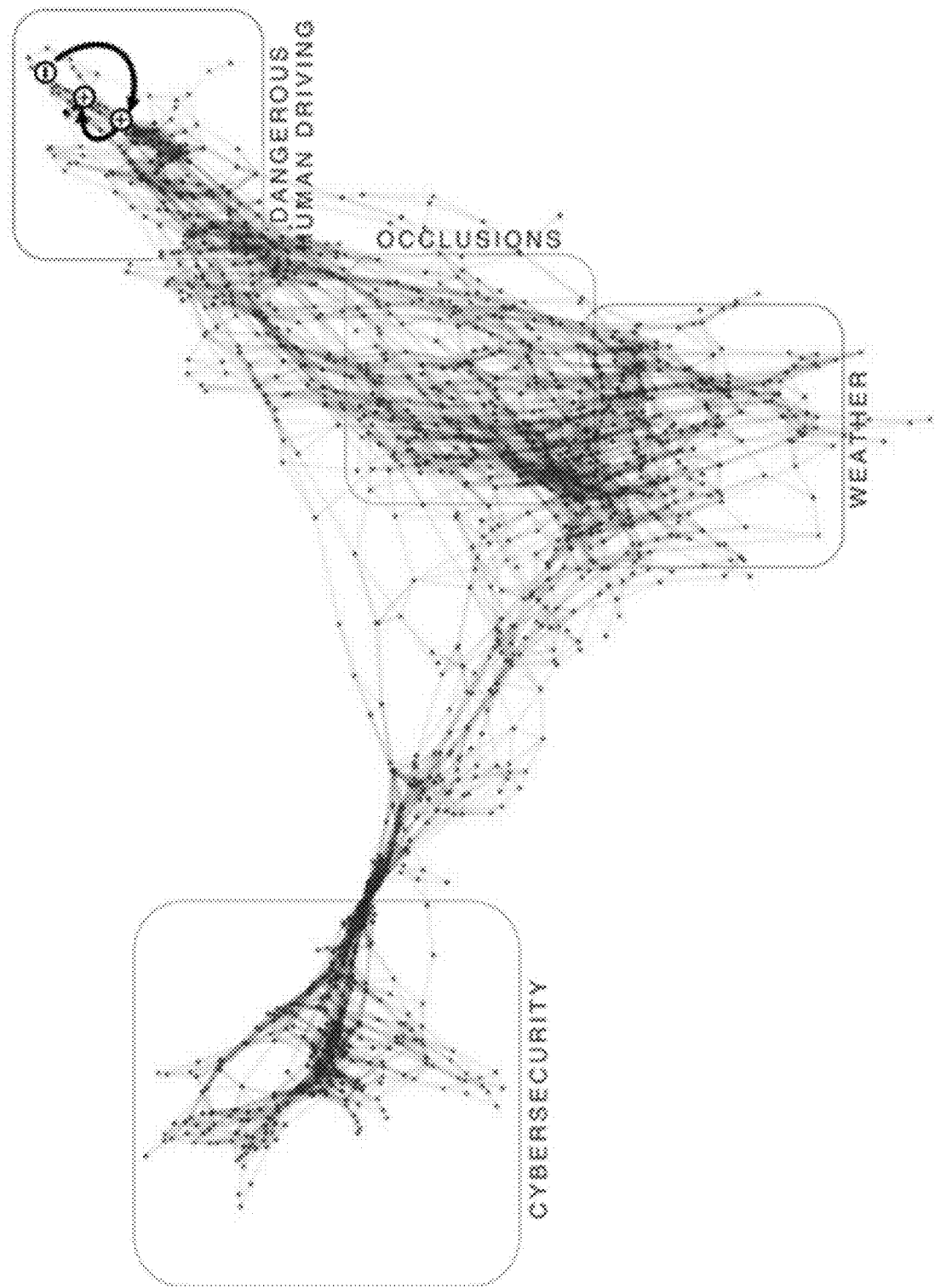
FIG. 11 is a graphical illustration of a process for calculating an AI performance score within a particular class of scenarios in accordance with an embodiment of the invention.

FIG. 11 illustrates a similar process for AI performance score calculation within a single class of scenario in accordance with an embodiment of the invention. The illustrated process narrows in on a performance estimate within a given area (here, dangerous human driving), starting with a representative node, and then incorporating the feedback from the AV each time in order to decide whether to test a more or less challenging subsequent scenario in each successive step. Using these methods, the most representative AI performance score can be calculated in the minimal number of steps. In numerous embodiments, the two techniques can be combined, hopping around the graph in order to find situations where the AV gives warning of substandard performance using the first algorithm, and then narrowing in on the exact performance flaws using the second. These techniques can also be semi-randomized, such that the scenarios which are selected for a test gauntlet become unpredictable, yet the overall test results converge over a smaller number of steps than would be possible without an adaptive solution.

In many embodiments, the AI performance score can be audited using graph interface systems. That is, the underlying values contributing to the calculation of the AI performance score can be provided to a user. In numerous embodiments, individual and/or sets of scenarios can be re-tested by user request in order to better understand the trained AI.

Generating Manifolds

As noted above, manifolds can be used not only to promote user comprehension, but also to facilitate the training of robust AI systems. In many embodiments, manifolds are created from and linked to knowledge graphs. In the above example with respect to AVs, the knowledge graph represents different scenarios that an AV can encounter, including the underlying data governing the initial conditions and evolution of events within those scenarios. A manifold created to connect these scenarios can also be used for training and testing AI, and can provide additional efficiency by providing an easily navigable structure than a massive knowledge graph while still providing access to the underlying data. In the context of AVs, the knowledge graph can directly encode all possible scenarios and every variation of those scenarios, whereas the manifold can represent every variation of a given scenario as a single node. In numerous embodiments, in order to construct a manifold, a base knowledge graph is first generated. In keeping with the example of AVs, construction of a knowledge graph and its manifold are discussed below.

Figure 12:
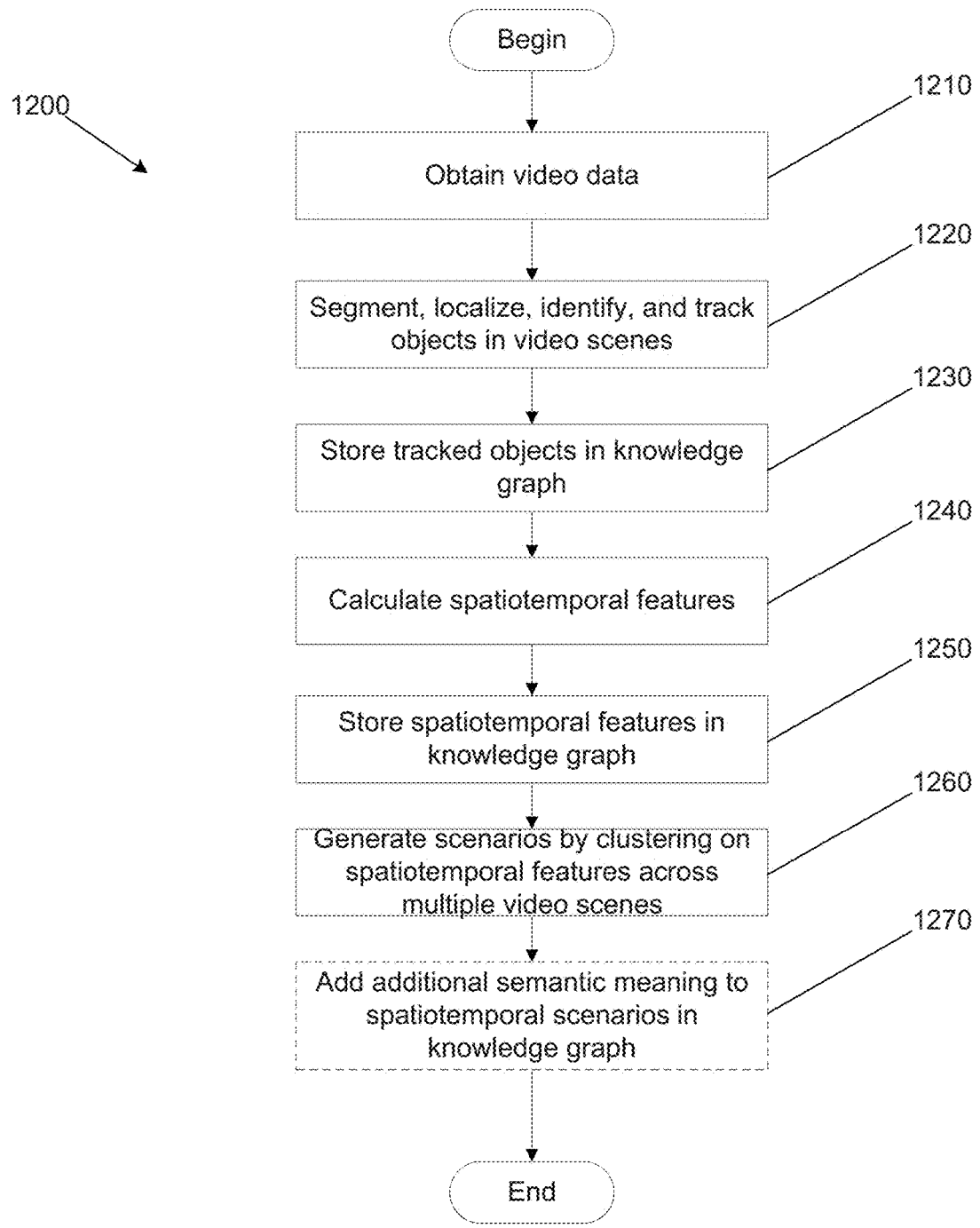
FIG. 12 is a flow chart illustrating a process for encoding video data into a knowledge graph in accordance with an embodiment of the invention.

As noted above, any number of different types of data can be encoded into a knowledge graph. As there are innumerable different types of data, a specific discussion of encoding of video data into a knowledge graph discussed below. However, one of ordinary skill in the art can appreciate that the processes described can be generalized to any other type of data as appropriate to the requirements of specific applications of embodiments of the invention. Turning now to FIG. 12, a process by which video data can be converted into a knowledge graph encoding spatiotemporal events in accordance with an embodiment of the invention is illustrated. In many embodiments, these events can end up as labeled events with explicit semantic meaning, or unlabeled events that represent clusters of well-defined behavior for which the semantic labels are not yet known.

Process 1200 includes obtaining (1210) video data. In many embodiments, the video data is relevant to the task that the AI will be trained to perform. For example, in the context of AVs, video data could include dash cam footage, video footage from embedded sensors, simulated video, and/or any other type of video as appropriate to the requirements of specific applications of embodiments of the invention. Video data can include multiple different "scenes," each of which can depict a scenario. Process 1200 further includes segmenting, localizing, identifying, and tracking (1220) objects in video scenes. The tracked objects are stored (1230) in a knowledge graph structure. Spatiotemporal features of the tracked objects are calculated (1240). Spatiotemporal features can be any feature that describes the object, such as, but not limited to, trajectories, velocities, accelerations, center of mass, transparency, and/or any other descriptive feature as appropriate to the requirements of specific applications of embodiments of the invention. The spatiotemporal features are then stored (1250) in the knowledge graph. The spatiotemporal features are clustered to generate spatiotemporal scenarios (1260) across the multiple video scenes. In numerous embodiments, additional semantic meaning can be added (1270). For example, unidentified or poorly identified objects can be provided additional semantic meaning to make the graph structure more understandable. This process can be applied to any arbitrary type of data such as, but not limited to, structured and unstructured text, LIDAR, ultrasound sensors, microwave sensors, and/or any other data source as appropriate to the requirements of specific applications of embodiments of the invention. For example, with respect to text, natural language processing techniques can be utilized to break text into primitives which can be stored as objects in a knowledge graph.

Figure 13:
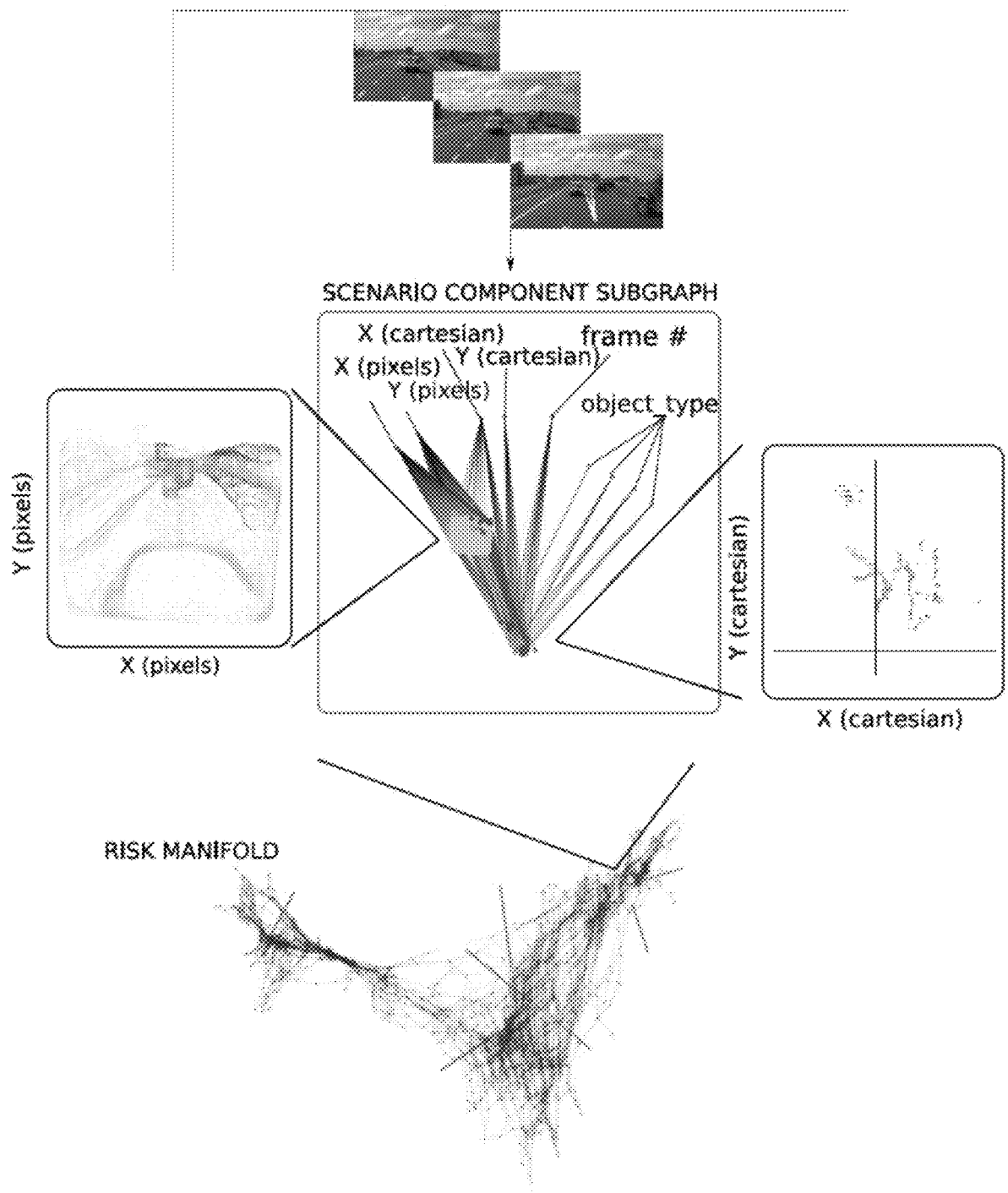
FIG. 13 graphically illustrates a process for encoding video data into a knowledge graph in accordance with an embodiment of the invention.

Turning now to FIG. 13, a process for encoding video data into a knowledge graph in accordance with an embodiment of the invention is graphically illustrated. The video scenes can be encoded into the scenario component subgraphs, as a subgraph of the knowledge graph. In the illustrated embodiment, a cluster of nodes (grey cluster in center graph) directly reflects objects in the video associated with a given scene. When projected, these nodes can be seen to visually reflect a frame of video (left graph). In the illustrated embodiment, the positions over each frame of video are encoded and can be plotted in a separate projection (right) showing the path of different objects over time. In numerous embodiments, the scenario subgraph is reflected as a single node within the manifold (bottom). Of course, as mentioned herein, any arbitrary type of data can be similarly encoded within a knowledge graph in accordance with an embodiment of the invention.

Often, data from multiple sources can be combined synergistically within the knowledge graph to obtain more value than had the data sources been considered separately in order to provide additional semantic meaning. For example, within the domain of risks to autonomous vehicles, spatiotemporal scenarios can describe high-risk traffic behavior of human driven vehicles derived from video data, and textual data can represent accident reports, insurance claims, and/or any other text-based description of a scenario as appropriate to the requirements of specific applications of embodiments of the invention. Having encoded video data into spatiotemporal scenarios within a graph, a small amount of data annotating spatiotemporal scenarios with text descriptions could be fused into the same graph. Within the domain of autonomous vehicles, the unannotated video data could be hundreds of millions of hours of dashcam footage, and the kernel annotated video data could be a dataset of tens of hours of vehicle and pedestrian trajectories. With both of these sources of data combined into the knowledge graph, features from the subgraph arising from the large unlabeled dataset can be compared with features in the smaller subgraph arising from the small, labeled dataset. Spatiotemporal events with the same features can be grouped together, and then labels from one set can be assigned to the other set. Of course, as one of ordinary skill in the art can appreciate, the types of video data and/or text data can take any arbitrary form from any arbitrary source as appropriate to the requirements of specific applications of embodiments of the invention.

However, since human annotated data often contains only a tiny fraction of the total set of behaviors possibly necessary to train an AV, the kernel annotated data may not be sufficient to annotate the full set of spatiotemporal cases. A third dataset can be introduced, representing textual descriptions of spatiotemporal scenarios, albeit without the associated trajectories. E.g., in the case of risks to autonomous vehicles, the third dataset could be semi-structured textual descriptions of automobile accidents describing many of the highest-risk scenarios for autonomous vehicles, without any explicit trajectories of the vehicles encoded in them. These data can then be connected with spatiotemporal trajectories from the existing graph, by matching text descriptions connected to spatiotemporal events within the now existing graph with trajectoriless text descriptions from the new graph when those text descriptions match. Of course, the third dataset can be any kind of text description as appropriate to the requirements of specific applications of embodiments of the invention.

In numerous embodiments, the next stage is to match still-unlabeled spatiotemporal scenarios with text descriptions which are still unconnected to spatiotemporal events. Any number of different inference methods can be performed on the graph to assign still-unconnected spatiotemporal scenarios with text descriptions (e.g. "labels"). For example, in a variety of embodiments, the still-unlabeled nodes can be assigned labels via process of elimination. In many embodiments, when the inference may need to be probabilistic, Bayesian inference methods can be used in order to create a mapping between unlabeled spatiotemporal events and text event descriptions lacking a spatiotemporal trajectories. However, any number of different inference methods can be used as appropriate to the requirements of specific applications of embodiments of the invention.

To give an example of using Bayesian inference on the graph to synergistically combine unlabeled spatiotemporal events with textual event descriptions which contained no associated spatiotemporal trajectories, consider the following example from the domain of autonomous vehicles. Assume that the space of labeled events in a human-annotated kernel dataset of vehicle trajectories only includes very common traffic features such as cars, trucks, pedestrians and traffic signals. In many embodiments, after fusing the kernel data set with both unlabeled video and the trajectoriless text data, there may be scenarios involving multiple spatiotemporal events containing some unlabeled events and some labeled events. There may also be text descriptions containing labels which have been connected to trajectories, and other labels which have not. Within a scenario containing labeled and unlabeled events, the probability that an unlabeled event gets connected to a label not previously connected with an event becomes:

$$P(\text{unconnected\_label} \rightarrow \text{unconnected\_event}|\text{labeled events}) = P(\text{labeled events}|\text{unconnected\_label}) * P(\text{unconnected\_label}) / P(\text{unconnected\_event})$$

To provide a concrete example, one such traffic scenario might be a truck backing up into an object on a city street in summer. The truck backing up represents an event which can be recognized from the annotated kernel data (a "labeled_event"), as do the environmental conditions, road conditions, which can also be labeled events within this traffic scenario. However, the object it backs into may not be labeled—it could be a loading bay, a snowbank, an electric pole or any number of other objects which may not have been annotated in the kernel data. However, in the case of accident reporting and claims data, many of these objects will be described within descriptions of scenarios containing the labeled events of a truck backing up in a residential area in the summer. Therefore, the connection of the unknown object can be probabilistically promoted to the textual label of an electric pole based on the other contextual knowledge. While the above is a specific example with respect to a specific scenario, any number of arbitrary different scenarios and features may be utilized as appropriate to the requirements of specific applications of embodiments of the invention.

In many embodiments, as more knowledge accumulates in the graph from more data sources, more refined connections can be made between unlabeled spatiotemporal events and event descriptions lacking explicit spatiotemporal data. In many embodiments, if the set of possible events is bounded, than the more refined connections become made inside the knowledge graph, the easier it will become connect still-unconnected events via deductive processes such as process of elimination. In numerous embodiments, for large knowledge graphs already benefiting from multiple cycles of inference using simpler methods, AIs can be trained using the existing connections as training data to create new connections based on other contextual data obtained by searching outward in the graph.

Figure 14:
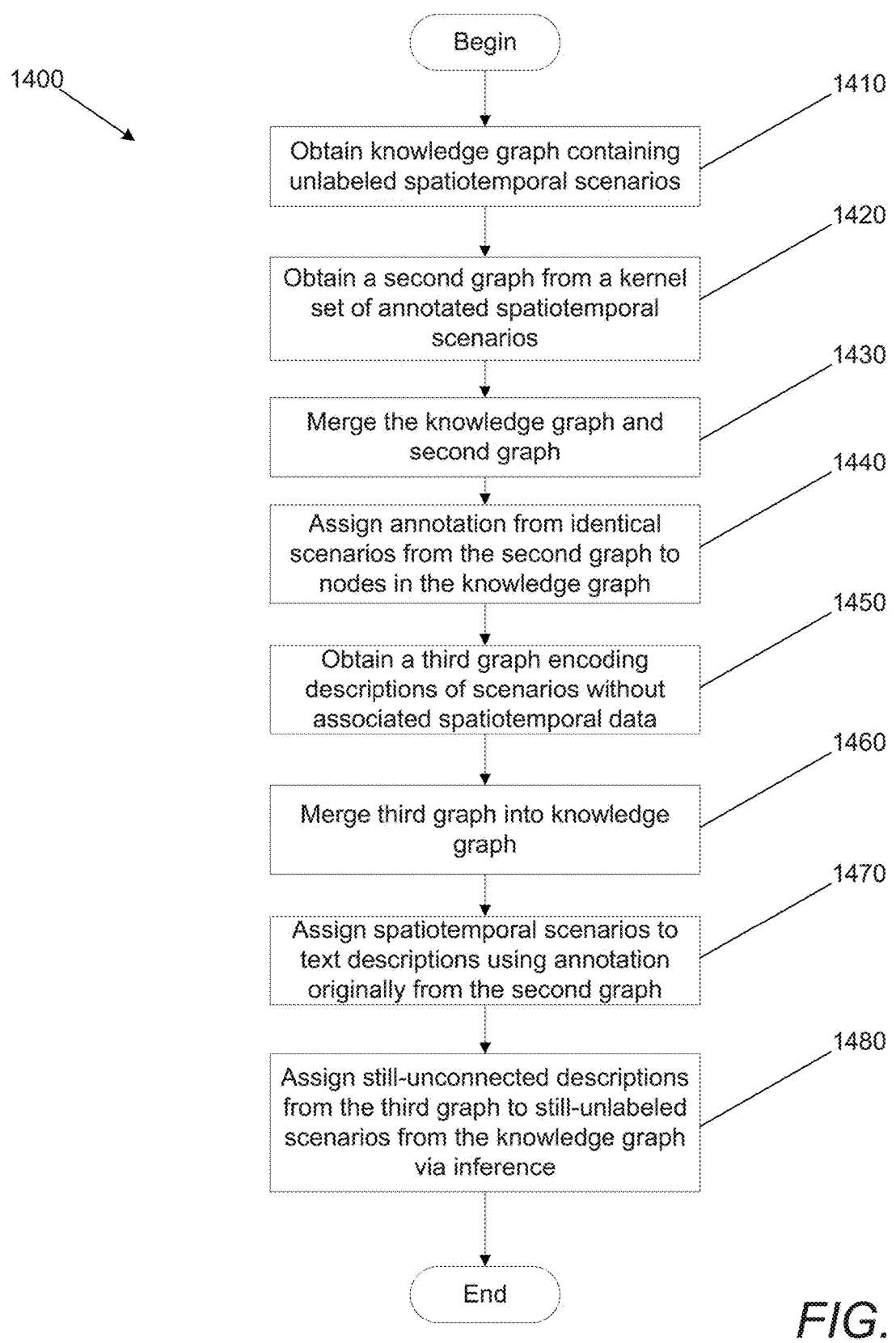
FIG. 14 is a flow chart illustrating a process for combining unannotated and annotated spatiotemporal scenarios to add semantic meaning in accordance with an embodiment of the invention.

Turning now to FIG. 14, a process for combining unannotated and annotated spatiotemporal scenarios to add semantic meaning in accordance with an embodiment of the invention is illustrated. Process 1400 includes obtaining (1410) a knowledge graph containing unlabeled spatiotemporal scenarios. A second graph from a kernel set of annotated spatiotemporal scenarios is obtained (1420) and merged (1430) with the knowledge graph. Annotations for spatiotemporal scenarios from the second graph are assigned to respective identical spatiotemporal scenarios from the knowledge graph. In numerous embodiments, identical spatiotemporal scenarios can be identified by matching the values of features, however any number of different similarity measures can be used as appropriate to the requirements of specific applications of embodiments of the invention.

A third graph encoding descriptions of scenarios without spatiotemporal data is obtained (1450) and merged (1460) into the knowledge graph. Spatiotemporal scenarios within the knowledge graph can be assigned (1470) descriptions from the third graph using the annotations from the second graph. Labels that are still-unconnected from the merged third graph are assigned (1480) to still-unlabeled spatiotemporal scenarios in the knowledge graph via any of a number of inference methods.

By providing an AI system with the knowledge graph that encodes risk, training can be made more robust. In numerous embodiments, the entire knowledge graph is provided to the AI. However, in many embodiments, a subgraph, sets of individual scenarios extracted via traversal of the graph in conformation with any of the above processes, and/or any other portion and/or manipulation of the graph such as, but not limited to, a manifold, can be provided for training. The knowledge graph "curated" by risk score can help find areas that lack sufficient training data, increase the amount of synthetic training data available, promote edge case training, and/or any of a number of different enhancements to AI training in order to make AVs more robust. Indeed, as mentioned, the above is merely a concrete example to assist with understanding, and one of ordinary skill in the art can appreciated that the systems and methods described herein can be extended to any arbitrary scenario.

Figure 15:
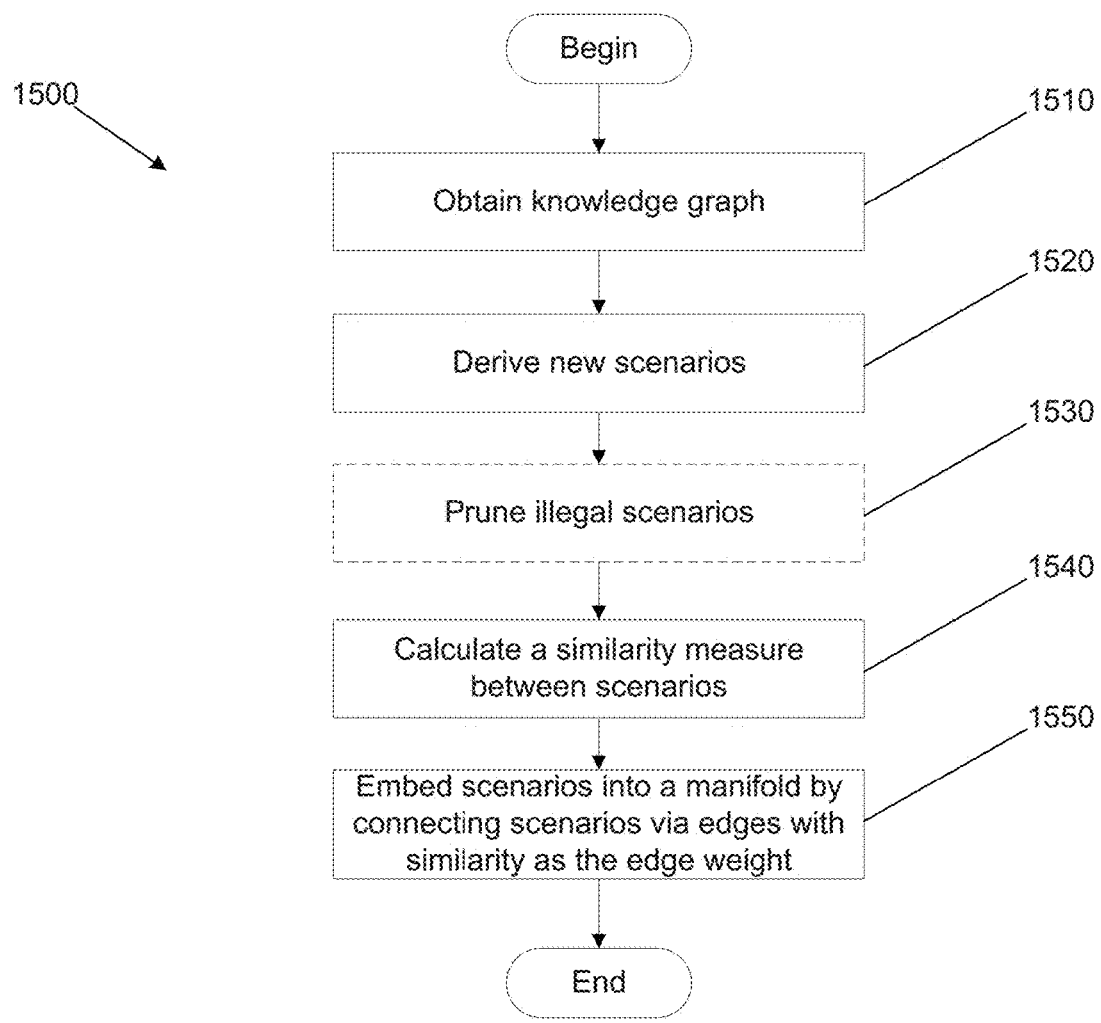
FIG. 15 is a flow chart illustrating a process for generating a manifold from a knowledge graph in accordance with an embodiment of the invention.

Turning now to FIG. 15, a process for generating a manifold from a knowledge graph in accordance with an embodiment of the invention is illustrated. Process 1500 includes obtaining (1510) a knowledge graph that encodes scenarios. New scenarios are derived (1520) from the knowledge graph. In numerous embodiments new scenarios are derived by creating nodes representing scenarios constructed from permutations of features within the knowledge graph that have not yet been encoded as scenarios. However, in many embodiments, new scenarios can be added by hand (which in turn can trigger more new scenarios), addition by running simulations, and/or any other method of generating new scenarios as appropriate to the requirements of specific applications of embodiments of the invention. In numerous embodiments, illegal scenarios are pruned (1530). In a variety of embodiments, scenarios are marked for pruning by running scenarios against a rule set. In some embodiments, the rule set includes verification that the scenario obeys physical laws. In a number of embodiments, scenarios are marked for pruning by a human auditing process. However, any number of different methods or combinations of methods can be used to prune scenarios as appropriate to the requirements of specific applications of embodiments of the invention.

Similarity measures are calculated (1540) between scenarios in the knowledge graph, and the scenarios are embedded (1550) into a manifold by connecting scenarios via edges where the edge weight is the similarity measure. As discussed further herein, the manifold and knowledge graph can exist within the same overarching graph structure. In a variety of embodiments, the embedding process involves representing multiple similar scenarios with a single node. Which scenarios are grouped to a single node can be based on the having similar and/or identical features, and/or any other grouping mechanism as appropriate to the requirements of specific applications of embodiments of the invention. When the features attributable to any two scenarios can be encoded as simple lists, the similarity measure between the scenarios can be any similarity measure, such as, but not limited to, the L1 norm across the two lists, the L2 norm across the two lists, or nonparametric measures such as the mutual information between the lists.

In a variety of embodiments, the underlying events making up a scenario will be linked to those scenarios via edges in the larger knowledge graph, and can be used for determining the feature set used to calculate similarity between scenarios. In situations where a knowledge graph contains both the features of scenarios and the manifold connecting all scenarios, the features used to calculate the similarity between scenarios can be established by integrating first order nodes connected to the scenarios, first order weights of those connections, and higher order nodes and weights branching out from there. In various embodiments, traversing the manifold can provide access to the underlying data, by traversing into first and higher-order weights branching out from in the manifold, while also maintaining the efficient traversal of the training data set provided by the manifold.

While specific processes are discussed above with particular respect to AV data for illustrative purposes, it is to be understood that processes similar to those described can be applied to any number of fields without departing from the scope and spirit of the invention. Graph interface systems can further be used to enable better interfacing between human users and AI systems, which traditionally can be complex and opaque.

Graph interface systems can be used for numerous applications aside from AI training and risk assessment. In numerous embodiments, graph interface systems can provide tools for human interaction with AI systems. Further, graph interface systems can provide data structures and tools for efficient graph processes such as, but not limited to, querying, extracting insights from data, visualizing graphs, and any of a number of other tools, many of which are discussed herein.

Human-AI Interfacing

An advantage of AI systems is that they are able to process many types of data with much higher speed than is possible by the human brain. However, many people are reluctant, with good reason, to abandon complete control over critical systems to AIs. Failure of a brittle or inadequately designed automation processes can be catastrophic depending on what the AI is controlling, e.g. heavy machinery, the stock market, medical diagnostics, etc. Presently, AIs are rarely trained with the kind of domain-specific expertise for which humans are employed. For a concrete example, machine translation is presently considered to be one of the most advanced use cases for AI and can be useful in casual settings, but a professional translator would not be likely to rely on machine translation to execute the functions of his/her job. As another example, the core functions of many office works are not offloaded to AIs.

Figure 16A:
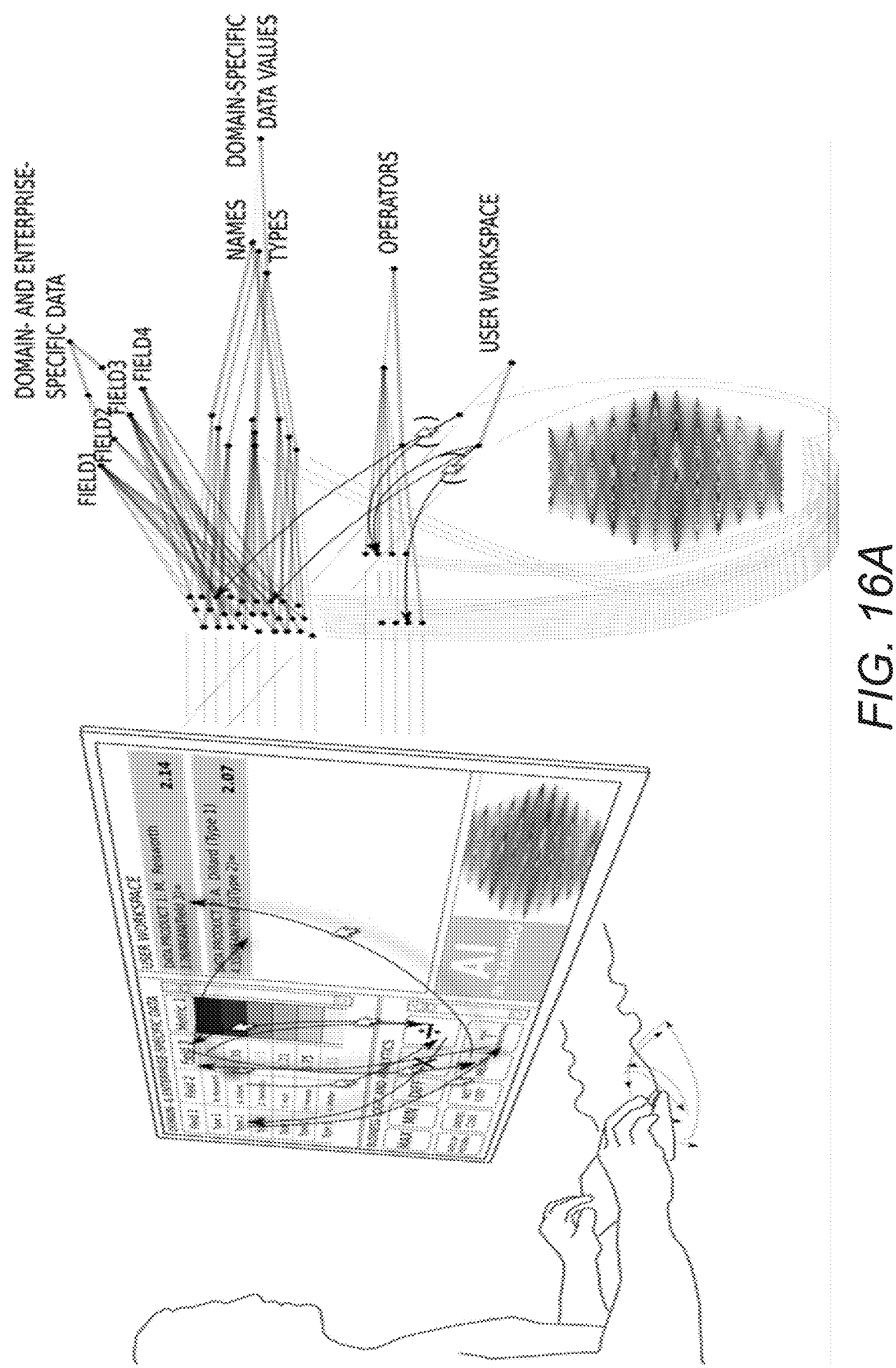
FIG. 16A conceptually illustrates a human-AI collaboration scenario where the AI is observing a human user interacting with an application using a graph interface system in accordance with an embodiment of the invention.
Figure 16B:
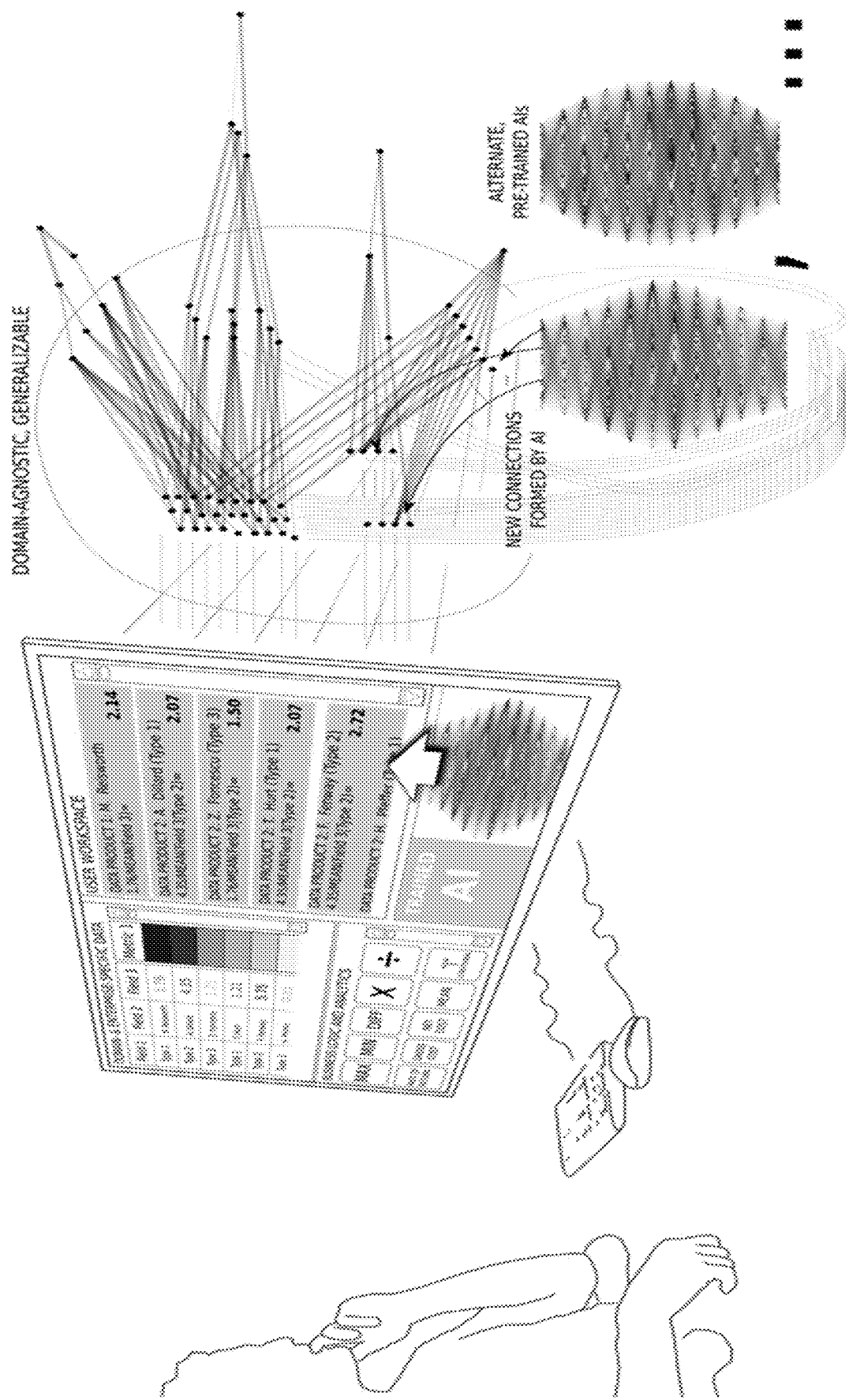
FIG. 16B conceptually illustrates a human-AI collaboration scenario where the AI is assisting a user with tasks in an application via a graph interface system in accordance with an embodiment of the invention.

In order to address these concerns, systems and methods described herein can enable a human user and an AI to work collaboratively in achieving a task. Graphs can be used as a medium for AIs to "see" what a human user is doing at a deeper level than traditional tables. In numerous embodiments, graphs are used to encode not only data that a user is manipulating, but also the contextual information defined by the user's interaction with an application. Turning now to FIGS. 16A and 16B, a human-AI collaborative scenario utilizing a graph-based interface in accordance with an embodiment of the invention is illustrated.

FIG. 16A illustrates the human user interacting with an application that the AI is being trained to use. The data that the user is manipulating can be encoded into a graph structure, as well as, but not limited to, contextual information. In numerous embodiments, contextual information can include, but is not limited to, cursor movements, orders and/or types of operators used, and/or any other information describing a user's interaction with a platform as appropriate to the requirements of specific applications of embodiments of the invention. While the user does work specific to their expertise, the graph-based interface can enable a 1-to-1 mapping from the workspace and/or work product onto a schema-free graph structure. In numerous embodiments, data are encoded in a way that natively abstracts work operations away from domain-specific details. Domain agnostic data can be used to train general purpose AIs. Further, by including contextual information and relevant data in a single format, the setup of the machine learning model can be automated. In numerous embodiments, an AI can be trained exclusively from the user's own behavior, and/or selected from elsewhere if sufficiently numerous training data are not available.

FIG. 16B illustrates a trained AI assisting a user with tasks in accordance with an embodiment of the invention. In numerous embodiments, the trained AI has domain specific knowledge that enables the AI to act on specialized data sets. However, in a variety of embodiments, AIs trained in another context can introduce new and valuable operations the human hadn't thought to implement. In a similar way, the AI so selected can be used not just to complete a tasks, but to identify new and unknown signals that could be useful to the user. Regardless of the domain expertise contained within the training data, by better understanding human user patterns through graph structures, AI systems can be made to act with higher competency. Data structures that can support such graphs are discussed in further detail below.

Data Structures Underlying Human-AI Interactions

Most databases are much faster at discrete queries than dimensional ones. Modern graph databases in particular can tell whether any two arbitrarily-chosen nodes are connected in constant (O(1)) time, but finding whether a given numeric value (e.g. a weight) exists can take linear time (O(N)). Other common examples of dimensional queries are maximum or minimum values, finding data within some range of a numeric value and finding the nearest entry to a given numeric value. These kinds of dimensional queries are highly useful, but are too slow on modern databases that solve them by iterating through all values for each such query.

A related failure point is the difficulty with which modern databases produce dimensional summaries of data. That is, to provide a means of presenting all of the data in the database at once. Such dimensional summaries can be very helpful for human users, but can provide significant benefits for AI systems. Because AI systems are particularly adept at locating signals in data, a methodology for presenting AIs with dimensional summaries and the ability to make rapid dimensional queries can speed up and/or improve the training and operation of AI systems. By way of an example, an AI can utilize dimensional queries to preferentially sample data points near their own decision boundary projected onto the high-dimensional training data.

In general, structures that seek to provide dimensional support tend to be unsuitable for large data sets with high dimensionality. For example, common methods such as, but not limited to, trees and fixed-bin-size lookup-table methods have severe limitations. The former executes in O(D*log(N)) time, where D is the number of dimensions and N is the number of data points. The latter is not reversible, and is locked at a single pixel resolution, which provides either too little resolution for tightly packed data, or wastes memory by needless storage of repeats over large pixel ranges. A "dimensional data structure" described herein can be implemented in order to enable graph databases to provide dimensional query and dimensional summary support with significant efficiency gains. In many embodiments, dimensional data structures store and lookup data by numeric value in one or more dimensions in nearly constant O(1) time, and never more than O(log(N)) time. Dimensional data structures can be defined as follows.

A dimensional data structure contains any constant-time retrieval data structure as a base container C. In numerous embodiments, the base container is a vector, but can be any constant-time retrieval data structure as appropriate to the requirements of specific applications of embodiments of the invention. The index for the base container is a function $f$ run on the continuous values of the original dimensional coordinates. In one dimension:

$$C[f(x)]$$

$$f: x \in \mathbb{R} \to \mathbb{I}$$

Figure 18:
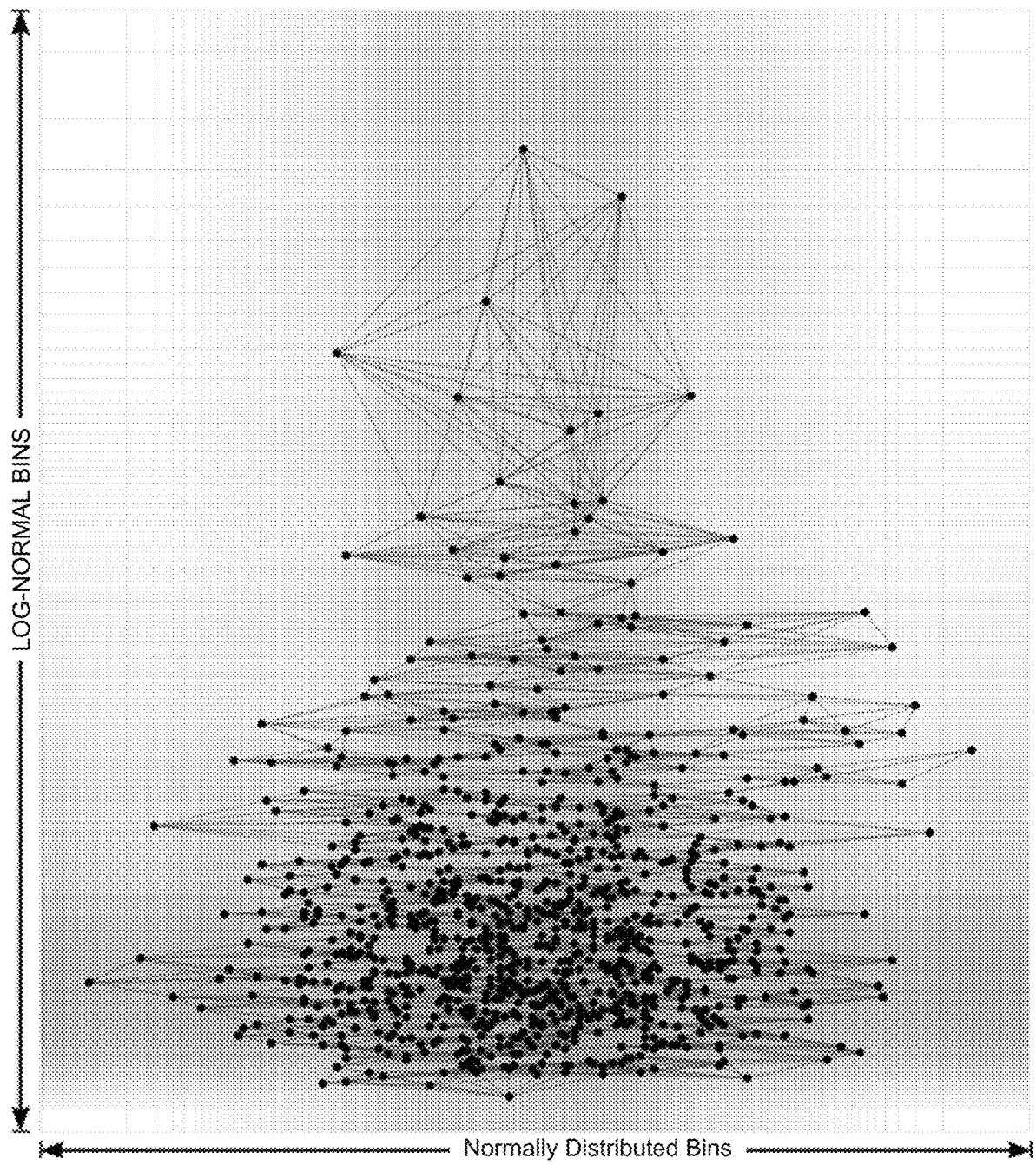
FIG. 18 an example of a normally and lognormally distributed dataset encoded using dimensional data structures in two separately mapped dimensions in accordance with an embodiment of the invention is illustrated.

The function $f$ is calculated so as to map onto bins in the x-dimension with widths inversely proportional to the expected density of the distribution data, formally:

$$f(x) = \text{round}\left(\frac{CDF(x) * N}{\max_x - \min_x}\right)$$

where CDF(x) is the expected cumulative distribution of the data in the x-dimension and N is the number of bins to create. In numerous embodiments, N is close to the expected number of data points. In numerous embodiments, this calculation ensures that multiple data points per bin happens infrequently. Turning now to FIG. 18, an example of a normally and lognormally distributed dataset encoded using dimensional data structures in two separately mapped dimensions in accordance with an embodiment of the invention is illustrated. In numerous embodiments, should the distribution of the data change such that the lookup time becomes worse than O(1), the function $f$ can be recalculated in a process analogous to a rehash.

In numerous embodiments, any function can be used for $f$ so long as it is increasing and differentiable. In a variety of embodiments, it is advantageous to select an $f$ such that it is faster to calculate than iterating through all data points. Example function $f$ candidates include, but are not limited to, the normal distribution (Gaussian), the lognormal distribution, and/or any function that can be transformed into a normal distribution using a power law. In some embodiments, linear combinations of these functions are $f$ candidates.

In numerous embodiments, a range of consecutive integers are used as indexes such that the size of the range is roughly equal to the number of data points. In this way, indexing up from one bin to the next yields a high likelihood that the next bin in the sequence will be filled with one data point. In many embodiments, when more than one data point is in a bin (formally, $N_{bin} > 1$), a structure can be created within the bin such that the worst-case time to insert and find the data point is limited to $O(\log(N_{f(x)}))$. In various embodiments, the structure is a binary tree, however any number of different structures can be used as appropriate to the requirements of specific applications of embodiments of the invention. In a variety of embodiments, if $N_{f(x)}$ exceeds a preset threshold, and/or the total sum of $(N_{f(x)}>1)$ exceeds a present threshold, a flag can be set to recalculate f according to the new distribution of x at the next available opportunity. This structure can double as a mechanism for reporting on deviations from expectations, which can be useful for a variety of dimensional queries. Updates to the data structure can then occur to maintain efficiency.

Figure 17:
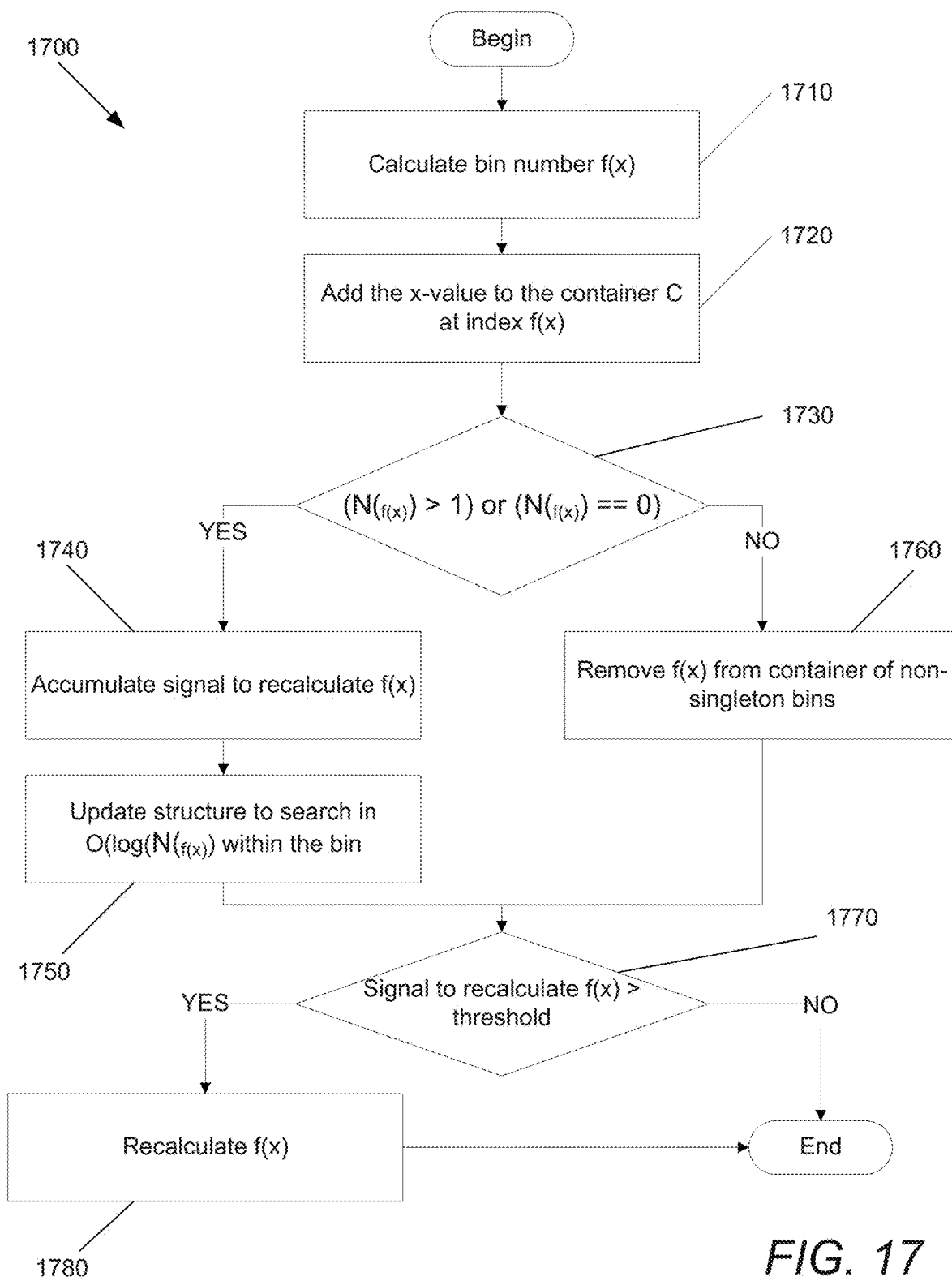
FIG. 17 is a flow chart illustrating a process for updating dimensional data structures in accordance with an embodiment of the invention.

Turning now to FIG. 17, a process for updating the dimensional data structure in accordance with an embodiment of the invention is illustrated. Process 1700 includes, given a new datum x, calculating (1710) bin number f(x), and adding (1720) the x-value to the container C at index f(x). If (1730) $N_{f(x)}$ is greater than 1 or equal to 0, then a signal to recalculate f(x) is accumulated (1740) and the dimensional data structure is updated (1750) to search in $O(\log(N_{f(x)}))$ within the bin. If not, then f(x) is removed (1760) from the container of non-singleton bins. If (1770) the signal to recalculate f(x) is greater than an arbitrary threshold value, then f(x) is recalculated (1780).

In many embodiments, recalculations to f(x) can be timed to optimally balance the time to recalculate against the time to insert/retrieve data if not recalculated. In a variety of embodiments, recalculating the distribution is achieved by doing a linear fit of uniformly sampled data points numbering between 20 and 50 times the number of parameters in the expected distribution, which can be multiplied again by the number of potential independent functional forms to be considered. In numerous embodiments, if the number of data points changes dramatically and a non-constant insertion time container is chosen for C, then the threshold to recalculate should incorporate the expected time to expand the container. Further, in numerous embodiments, the need to recalculate f is equivalent to the expectations of the distribution of x being violated. Therefore, the signal to recalculate f can be utilized as a low-level flag of an expectation violation which can be raised to any other connected system monitoring for unexpected events.

While FIG. 18 illustrated a multidimensional mapping constructed from multiple single-dimensional mappings, dimensional data structures can be used to map multiple data dimensions on to a single lookup table with similar performance. For lower dimensional data (approximately 5 or fewer dimensions), this can be achieved using a simple raster, interleaving single-dimensional mappings. For higher dimensional data, a multidimensional index can be utilized such that f itself becomes multidimensional (e.g. f(x,y,z,a, b,c, ... ). In a variety of embodiments, a neural network can be used to fit f. In many embodiments, a network which projects an implied distribution over the dimensions of the multidimensional index (e.g. x,y,z,a,b,c, ... ) for which the cumulative distribution is calculable by iterating only over the parameters in the network (e.g. via radial basis functions) satisfy the speed constraints discussed above to facilitate the dimensional data structure. An advantage of the above is that the index f(x) maps onto a dimensional value which can be compared to other dimensional values, regardless of distance.

While dimensional data structures can increase efficiency and/or functionality of graph interface systems. In many embodiments, utilization of dimensional data structures are not required. In a variety of embodiments, methods described herein can be performed without using dimensional data structures. However, in numerous embodiments, dimensional data structures can increase the overall computational efficiency of performing various methods described herein. For example, queries using dimensional data structures are discussed below.

Queries Using Dimensional Data Structures

Dimensional data structures, as discussed herein, can execute operations with high computational efficiency. In numerous embodiments, a large number of dimensional queries and/or other operations may complete in time proportional to the subset of data points sought in the query, rather than the total number of candidates. Due to the graph structure created using dimensional data structures, many common operations are highly optimized. For example, minimum and maximum values in the data set are stored in the first and final bins, respectively; the closest value to a given value (and the corresponding underlying address) can be found by looking up that value in the dimensional table, and then iterating up or down one index; the mean, standard deviation, kurtosis, and other statistics of the distribution of the data can be calculated on the first pass through the data and updated quickly on every insertion and removal of data; and all data points in a window or range in constant time can be collected, simply by aggregating all the bins corresponding to the beginning of that window up to the end. In many embodiments, distributional statistics that do not happen to be stored and updated alongside the structure can be closely approximated by the parameters of the stored function f chosen for the bin mapping. The parameters can be further refined by any stored deviations from this distribution as determined by bins with 0, or 2 or more data points. For example, the median can be well approximated by the center value of the list, and if the multiply-filled are kept track of (as they would be in advance of the update process), the median can be calculated exactly. However, this list is non-exhaustive, and many other queries can be found to operate quickly and efficiently using dimensional data structures.

Dimensional summaries can also be generated quickly and efficiently. An example dimensional summary includes an illustration of the underlying distribution in x implied by f, (df/dx). In some embodiments, as the system has time to process, and to the extent that f is not a perfectly accurate estimate of the underlying data, the picture can update first with the largest divergences from the expected distribution, which can be stored during the original stage while f is being chosen. While numerous different queries are discussed above with respect to dimensional data structures, any number of different queries can be performed using dimensional data structures as appropriate to the requirements of specific applications of embodiments of the invention.

In many circumstances, it can be advantageous to be able to answer dimensional questions beyond individual data points to hypersurfaces and/or hypershapes. For example, a user may want to quickly see or access high-dimensional that exist in certain spatial ranges, independent of the data points that define them at their limits. Alternatively, relative to the overarching structure of a graph, a user might want to select all edges that pass through the space between two or more nodes in one or more dimensions. Indeed, there are any number of dimensional questions that could be useful to a particular application of an embodiment of the invention.

To enable queries in high dimensions, nodes and/or edges in the graph may be drawn into a dimensional lookup structure such as those described above, with the identity and cardinal data points for the object stored in every bin that the object traverses (e.g. high-dimensional mean within the bin). Even when exhaustively drawing all shapes in this way, the dimensional lookup structure can make queries much faster. However, in numerous embodiments, it is not necessary to draw the shapes exhaustively.

As noted herein, dimensional data structures can be used to construct graphs and aid in the querying of data encoded in graphs. This can enable faster training of AI systems, and/or generally speed up actions involving the data set. However, the graph structures described herein are not limited to only speeding up querying. Graph structures can be used to help better understand data.

Automated Insight Derivation

A key goal in the field of data science and analytics is obtaining insights. Insights are valuable ideas that were either not previously known or not previously understood. When an insight is obtained through the course of observing data, the idea-generating data itself can be referred to as the insight, I. Presently, many systems attempt to deliver insights by offering queries that implicitly anticipate user's questions and interests. However, this regime tends to put the onus of building systems that can anticipate questions and interests on the architects, rather than the users of said systems. This tends to lead to generalist systems that are not effective at revealing insights for particular user's data.

Graphs can be utilized to address these defects by generating insights predictably. Because insights tend to be unexpected, they can be derived by understanding a user's expectations, which can be encoded in a graph. At a high level, an insight I can be derived as follows:

$$I = D \ominus E$$

where I is the insight, D is the data, E is the user's expectations, and $\ominus$ is a difference operator.

As can be inferred from the above equation, this method utilizes processes for storing expectations in the same format as other data so that they can be compared. In numerous embodiments, graphs provide the format. That is, if E or D are not natively in the same format, either can be converted into a graph format which permits a subtraction operator that generates an insight in the same format. In some embodiments, E and/or D are transformed in order to map one more closely to the other for the purposes of maximizing the impact of I by lowering its complexity.

Low-schema data structures can natively encode human knowledge, for example tree hierarchies or relationship diagrams, which are forms of graphs. These forms of graphs can contain some form of schema, which can be converted itself into graph form resulting in a very low or schema-free manner. However, implicit human beliefs can further be encoded into graphs. As discussed herein, human-AI interfaces can enable graphs to be generated that encode human contextual actions. The contextual information represent the implicit storage of the user's beliefs regarding the data because, over the course of using the interface, the user will arrange the data in a way that makes the most sense to the user. By way of example, in many embodiments, selecting a cluster of data and partitioning it or otherwise identifying it as a separate region of interest can be equivalent as adding a new structure to the graph itself. In another example, resizing windows in order to focus on a particular area of a graph can be equivalent to reweighting part of the graph to encode the user's focus. Indeed, any number of different user actions can be collected and encoded within a graph.

Figure 19A:
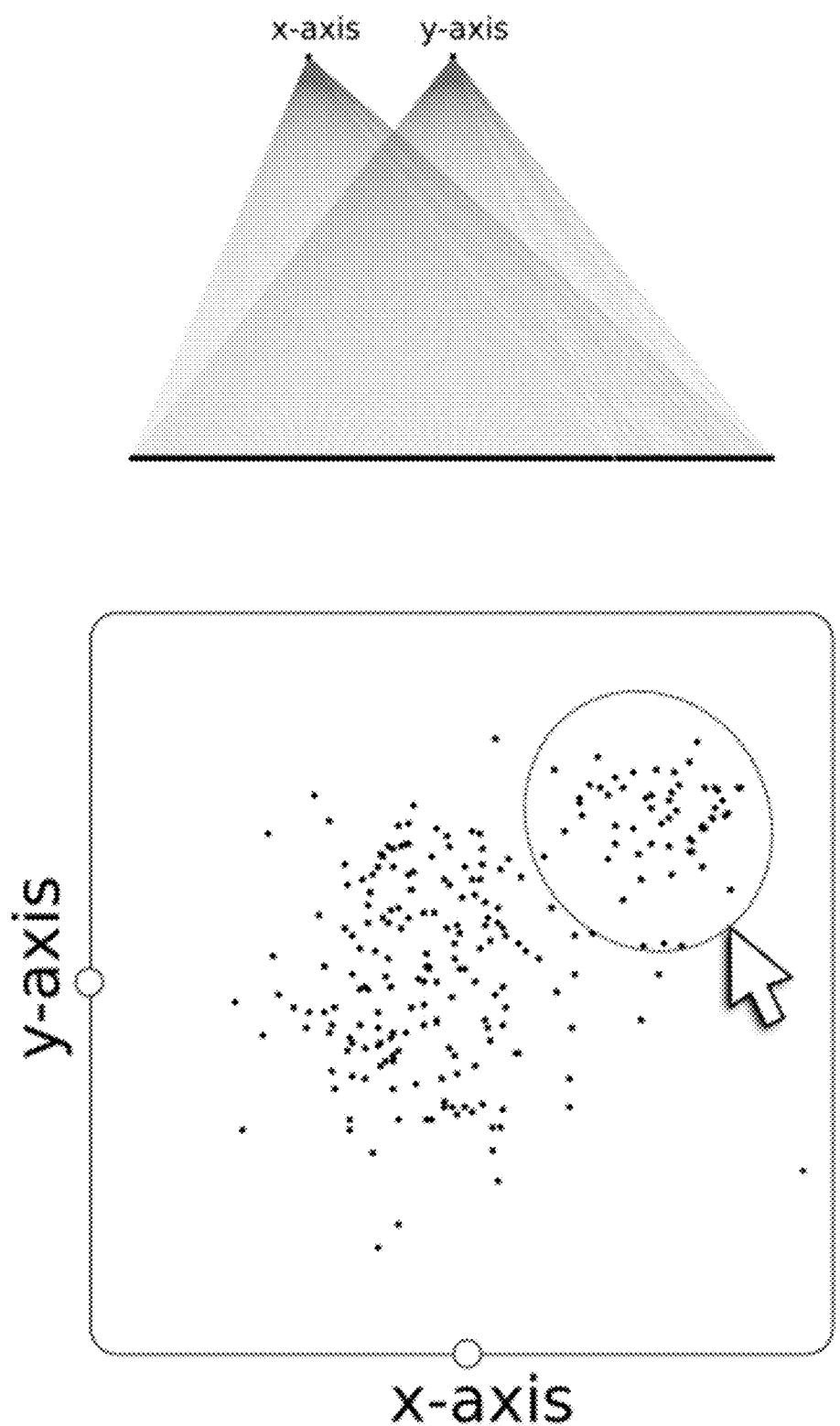
FIG. 19A illustrates a graph projected on a Cartesian plane and the underlying graph in accordance with an embodiment of the invention.
Figure 19B:
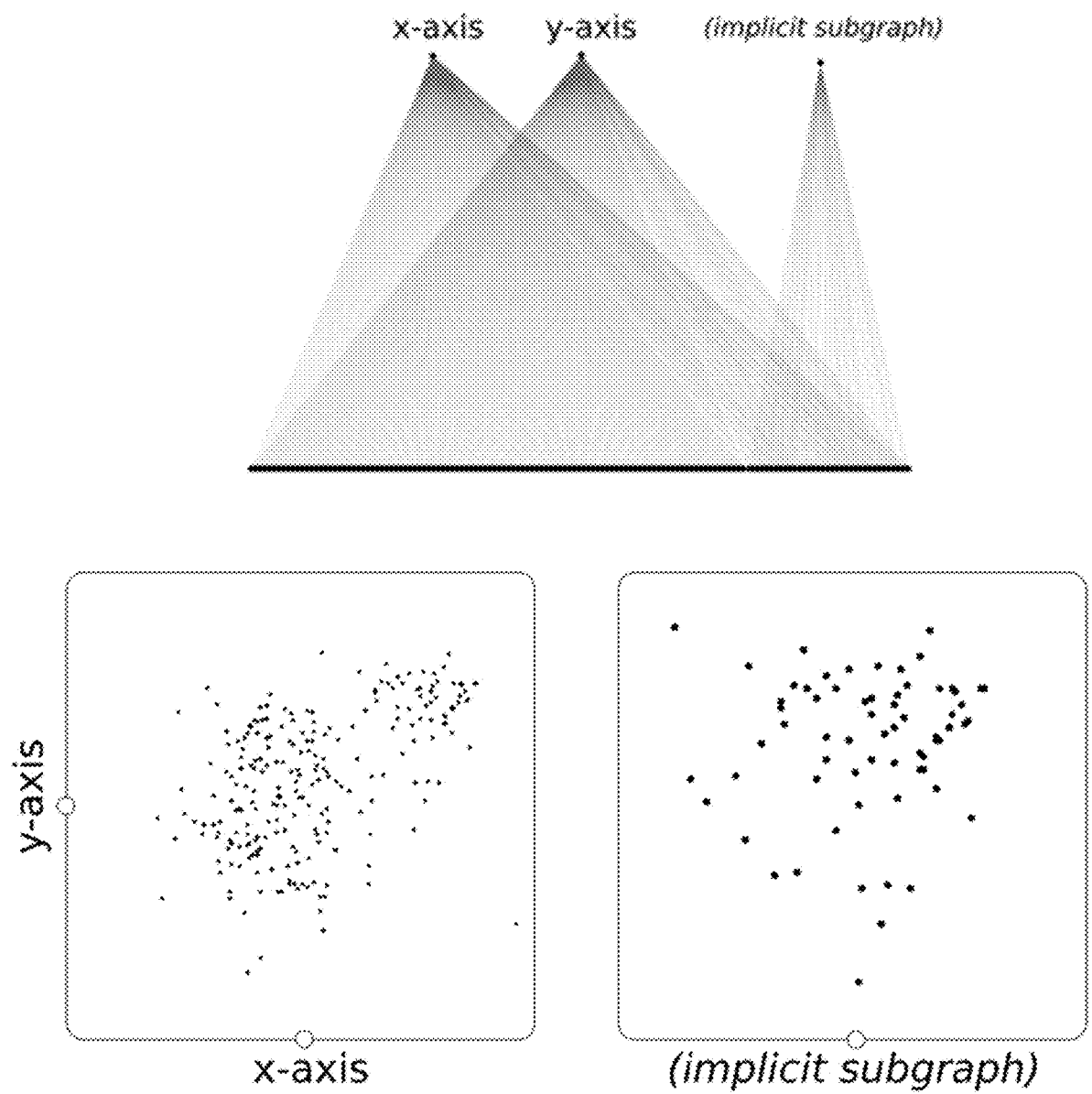
FIG. 19B illustrates a change in the underlying graph structure to encode user implicit belief and the resulting projections in accordance with an embodiment of the invention.

Turning now to FIGS. 19A and 19B, an example of implicit encoding of beliefs in accordance with an embodiment of the invention are illustrated. FIG. 19A demonstrates a graph projected on a Cartesian plane and the graph structure underlying the projection. A user has selected a subgraph in the Cartesian plane using a cursor with the intent to focus on that area. FIG. 19B represents the change in the underlying graph structure to encode the implicit belief of the user that the selected area is separate and/or differentiable.

In order to reveal insights using the encoded beliefs of a user, a subtraction (also called a "difference" or "cliff") operation can be used. In many embodiments, when the graph structure is an unweighted directed graph, the difference operation between a first graph and a second graph is defined as the set difference of the adjacency list of the first graph and the adjacency list of the second graph. If the second graph encodes edges that do not exist in the first graph but there is a need for the operation to be reversible, the output of the difference operation can be extended to include negative-weighted edges, and include the concept of a null graph. Similarly, there is a need to differentiate between the idea of a 0-weight and a missing edge, an "opposite of zero" edge weight can be added to the output of the subtraction operation.

In numerous embodiments, the difference between D and E is large, and can be difficult to interpret. A measure of I's effectiveness can be a complexity metric reflecting how concise I is. Example complexity metrics can include a metric proportional to the inverse of the number of nodes and/or edges in I, but any number of different metrics can be utilized that reflect the overall complexity of I, such as, but not limited to, a measure of the total convergence and divergence, the number of cycles present, a measure of divergence from known structures, and/or any other measure of complexity appropriate to the requirements of specific applications of embodiments of the invention. In the context of insights, the variable C refers to a complexity metric, with a low value reflecting low complexity. For example, in many embodiments, C is the Aikake information criterion. However, any number of different metrics can be used as appropriate to the requirements of specific applications of embodiments of the invention.

In a variety of embodiments, transformations performed on E can minimize the size and complexity of I without meaningfully changing the information in E. For example, node addresses in E can be modified to be closer to addresses in D. In a variety of embodiments, if the connectivity in E is identical to the connectivity in D, but all of the node addresses are different, E and D can be considered identical under a re-addressing transformation. Other transformations can include, but are not limited to, removing and/or adding nodes and/or edges in E in order to maximize homology with D. In numerous embodiments, singleton nodes and/or edges can be added and/or removed to simplify the output of the difference calculation without significantly modifying the content or complexity of D. However, depending on the scenario, non-singleton nodes and/or edges can be added and/or removed.

An optimization metric can be defined which can promote a reduction in the complexity of I while demoting a reduction in complexity of E. For example, in numerous embodiments, the optimization metric can be calculated as:

$$C(E \ominus H(E)) + C(I \ominus I')$$

where H is a transformation selected as to minimize the complexity metric.

Figure 20:
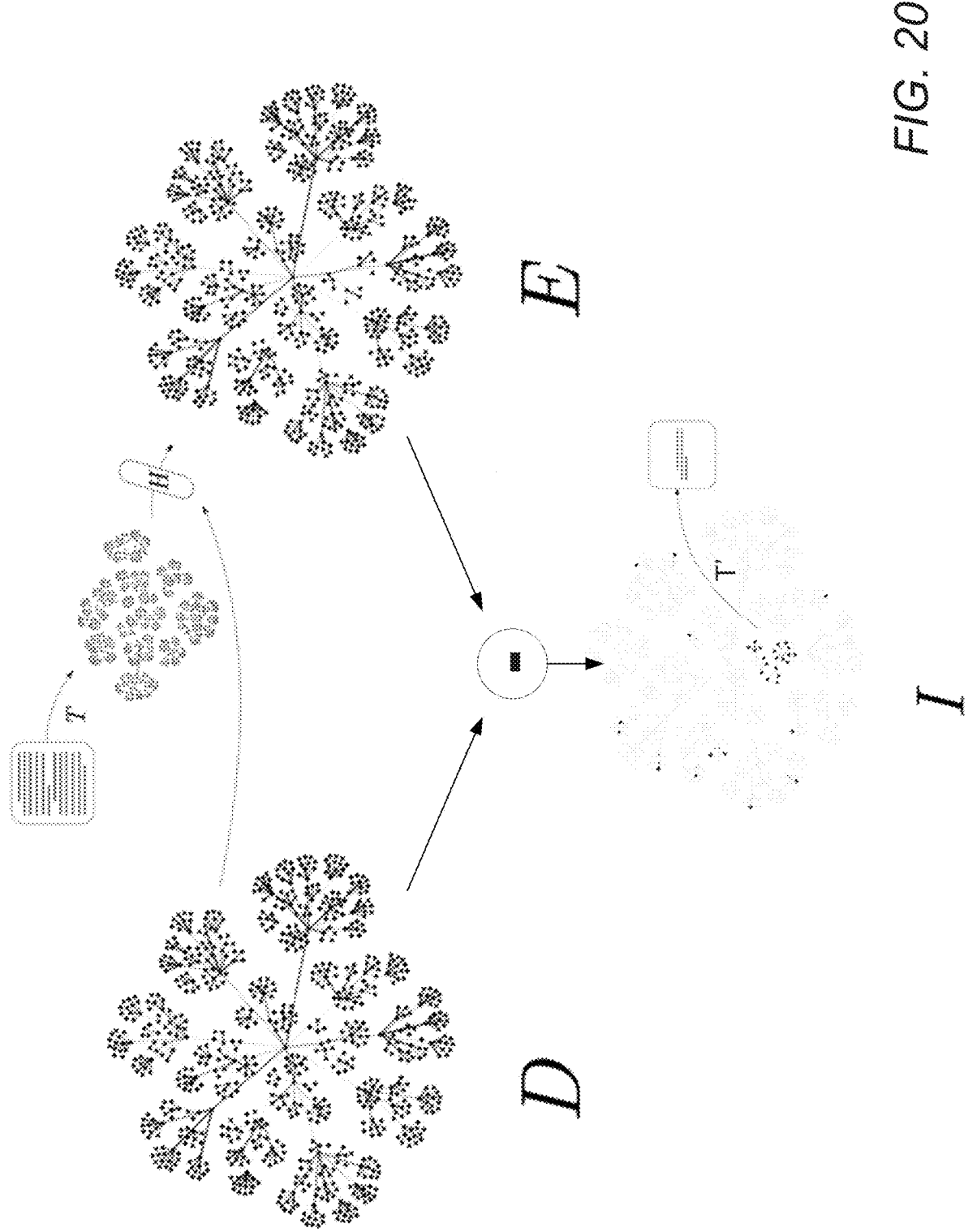
FIG. 20 graphically illustrates a process for automatically extracting insight subgraphs in accordance with an embodiment of the invention.

An example of an automatic extraction of I in accordance with an embodiment of the invention is illustrated in FIG. 20. The example illustrated in FIG. 20 graphically demonstrates the concept of data minus expectations equals insight. As can be seen, data (D) is compared with human expectations, E. The latter can be transformed from a different human-interpretable data type (e.g. natural language) via a transformation T, and an additional transformation H may be performed in order to bring E closer in structure to D. However, in numerous embodiments, human expectations can be obtained directly as a graph encoding as discussed herein. Then, E can be subtracted from D, with the resulting insight appearing in I. I, or any clusters within I, may then be transformed back to the source format via an inverse transformation T' if desired. As FIG. 20 is illustrative of a single example, one of ordinary skill in the art can understand that insights can be obtained in any of a variety of different ways, including, but not limited to those that utilize no, or different transformation steps, that still conform with I=D⊖E. The resulting I structure can be understood in a number of different ways. A paradigm for understanding and interpreting I is discussed below.

Known and Unknown Unknowns

As I can be represented as a graph, different insights can be gained from a single structure I from various portions of the graph structure itself. The concept of "known unknowns" refers to insights that are known to exist, but the insight itself is yet unknown. An "unknown unknown" refers to an insight that is not yet known to exist. This lexicography can be extended. For example, an "unknown unknown unknown" can refer to a higher-order undiscovered insights that can explain unknown unknowns. This concept can be reflected in the structure of a graph, and therefore the structure of I can provide multiple different types of insights.

By way of example, if I is a tree or directed acyclic graph (DAG), then the class of insight can be encoded in the header nodes, and the supporting data of the insight can be encoded in the leaf or child nodes. In numerous embodiments, a known unknown would only be encoded in nodes at one level of hierarchy, whereas an unknown unknown would contain additional levels of hierarchy, where the number of levels would determine the extent of the unknown-ness. In some embodiments, if a directed acyclic graph were being used, a situation can arise in which the user found an "unknown known." That is, a 2nd-order result which might have otherwise been an unknown unknown, but which is also part of a knowledge graph that the user already had command of, such that the user realizes that he/she already knew the answer.

Various types of unknowns can be used to provide users with directions on what portion of their data they should focus on. In many embodiments, a visualization of I can help users understand which portion of their data they should focus on. However, in numerous embodiments, I can be further processed to provide additional clarity. For example, to the extent that I is large and/or contains noise, I can be displayed in such as away as to focus the user's attention on more relevant portions of the graph. Focusing the user's attention can be achieved by, but is not limited to, subselecting a portion of I for display. Further, I can be passed through a utility function that encodes expectations about insight value. However, a potential risk of such a method is that the expectations of value are not in fact where the value in the data lies. Indeed, in numerous embodiments, points at which data diverges from expectation may in fact reveal the most value. In order to hedge against this risk, multiple different possibilities can be presented to the user which in turn can be validated by the user. The user's validations can then be encoded into the graph to add robustness to the stored notion of expectations E.

In some embodiments, calculating human expectations explicitly may be too restrictive as a means for directing user focus for a given application. For example, if a user has limited prior knowledge such that there is little or no expectation, the entire dataset can be provided in a digestible manner. Because graph databases can be so large, a dimensional reduction can be applied to the graph. Dimensionality reductions can be achieved in any of a number of ways, including, but not limited to, linear reductions such as those similar to principal component analysis, nonlinear reductions such as those similar to independent component analysis, deep learning autoencoders, projection onto a low-dimensional manifold (discussed in more detail below), and/or any other dimensionality reduction as appropriate to the requirements of specific applications of embodiments of the invention.

In cases where focus should be directed to large outliers, measures for outlying data can include, but are not limited to: the Mahalonobis distance, defined over graph localities; the distance normalized by standard deviation exceeding a predefined threshold; and/or any other outliner and/or anomaly detection algorithm as appropriate to the requirements of specific applications of embodiments of the invention. In numerous embodiments, the largest outliers can be actively surfaced and presented for the user. In cases where the graph database is not tractable on a single computing stack, graph crawlers can be provided with local rule sets to navigate the network and surface topics of interest.

While many of the above examples are provided in the context of encoding expectations explicitly using hierarchical, tree-like graph structures, one of ordinary skill in the art can appreciate that there are many ways to use a graph to encode expectations. For example, expectations could further be encoded in a top-down fashion not just in the form of descriptors, but as decision rules as well. Further, expectations can be encoded bottom-up, specified through edges/nonedges which can be extrapolated across desired nodes. Indeed, any number of different methodologies for encoding expectations into a graph can be utilized as appropriate to the requirements of specific applications of embodiments of the invention. While gaining insights from data are a useful application, in many situations, users can benefit from understanding the best way to interface with their data beyond extracting interfaces. Recommendation engines for data analysis are described in further detail below.

Recommendation Engines for Data Processing

In many instances, users have access to data that they themselves are not familiar with, and may be unsure what data analytics processes to apply to the data in order to maximize value. To address this, methods for matching data and analytics processes can be enabled by the ability of graph interface devices to encode storing both data and analytics processes in graph structures between which similarities can be established. The ability to connect processes and data can serve as a medium by which different processes can be recommended for and performed on any arbitrary data.

Figure 21A:
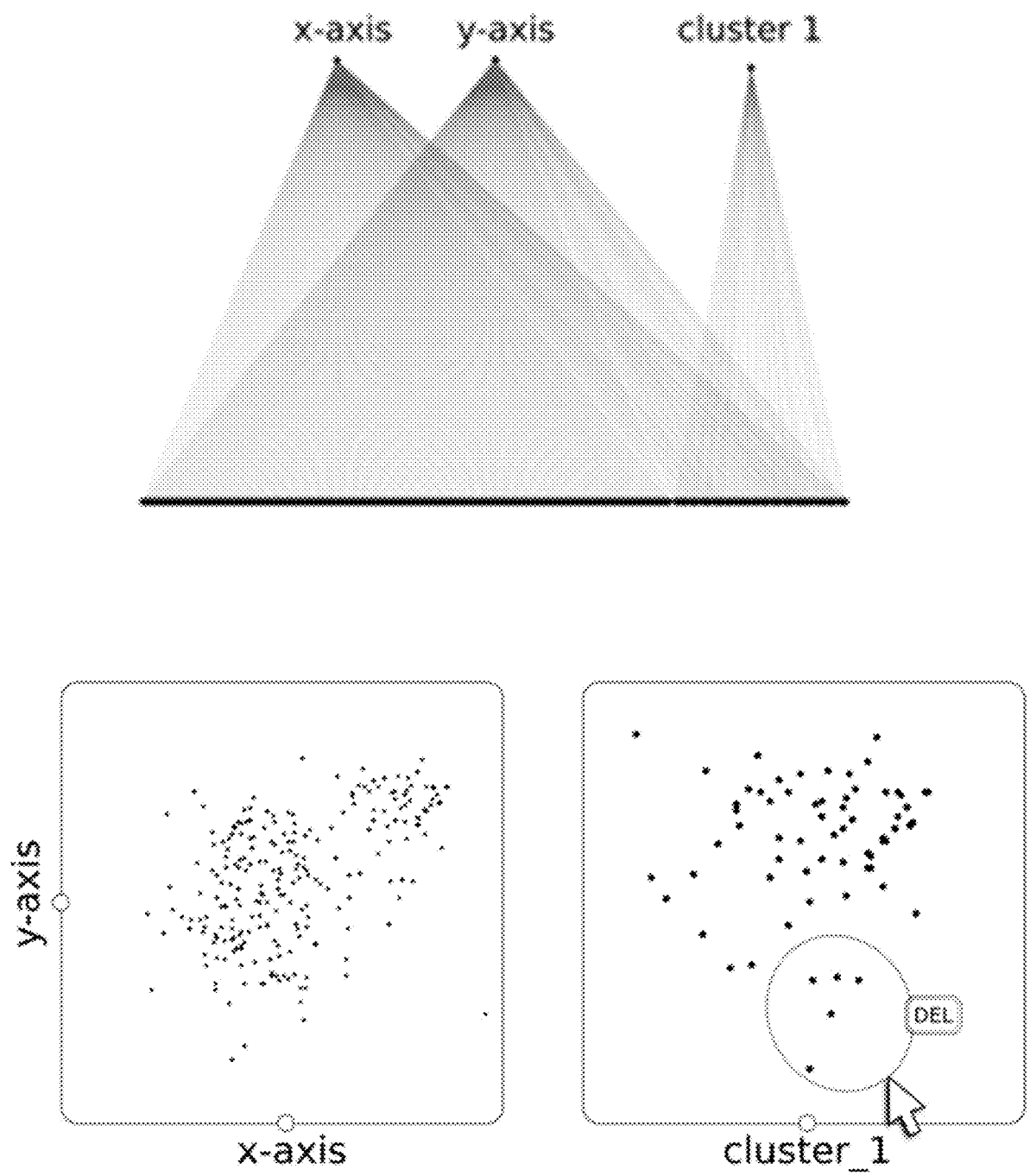
FIG. 21A illustrates a graph projected onto a 2-D Cartesian grid and zoomed view of a region of the graph on a separate 2-D Cartesian grid, and the graph structure underlying the two projections in accordance with an embodiment of the invention.
Figure 21B:
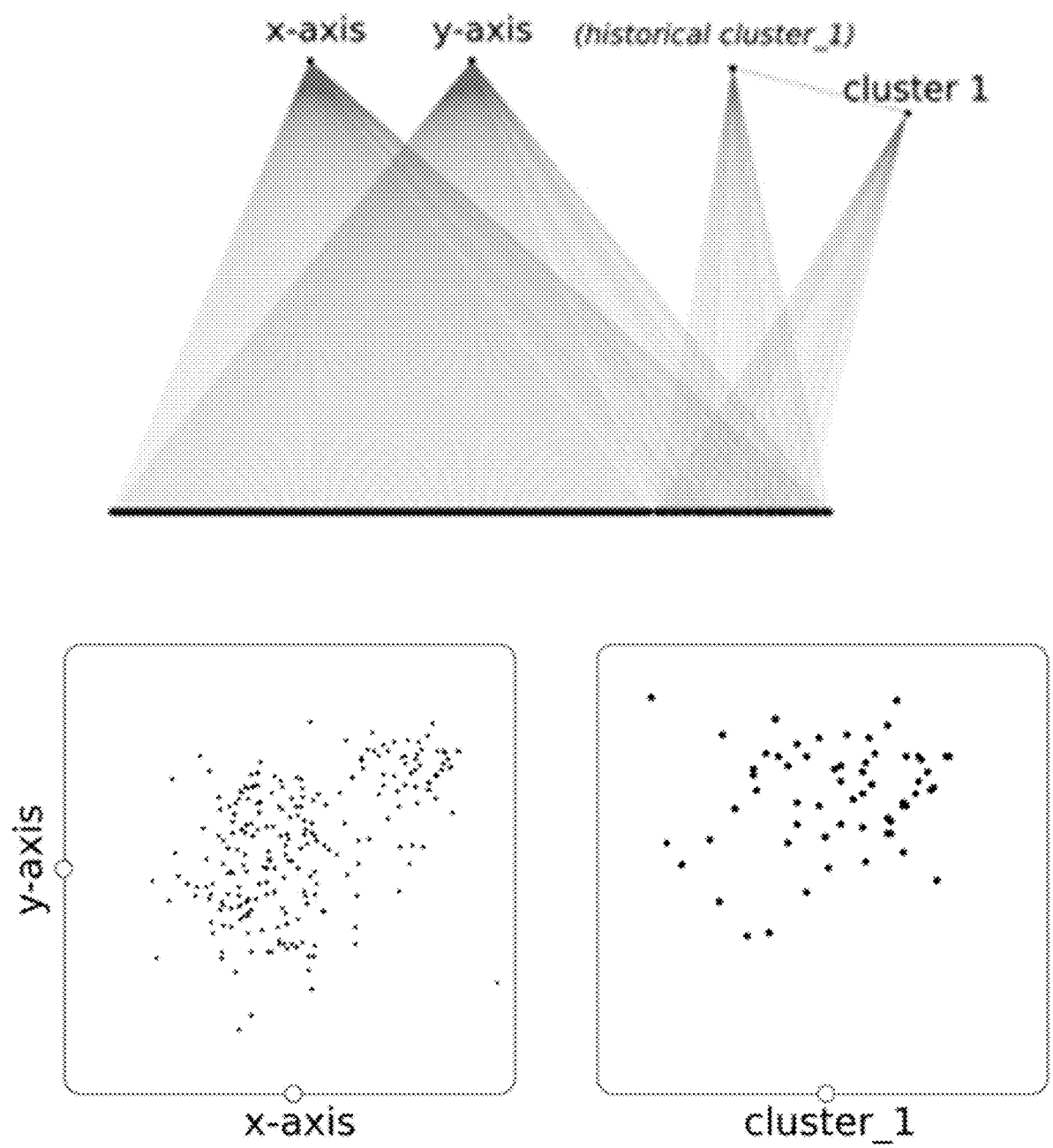
FIG. 21B illustrates the results of a deletion operation in the zoomed in region of the graph, and the changes to the underlying data structure in accordance with an embodiment of the invention.

In many situations, it may be desirable to perform analytics process that manipulate the structure of a graph without eliminating the historical state of the data. In many embodiments, this is enabled by storing the history of graph manipulations inside of the graph itself. In a variety of embodiments, a shell node and/or a 1st order separated node which point to core data values of interest within the graph can be generated which can indicate historical values for those data. For example, a user may reweight and/or reconnect graph elements in the course of modifying a graph, which actions can be stored within the graph as nodes with edges that point to the modified graph elements. Turning now to FIGS. 21A and 21B, an example of storing historical manipulations in the same graph as the data being manipulated in accordance with an embodiment of the invention is illustrated. FIG. 21A illustrates a graph projected onto a 2-D Cartesian grid and a zoomed view of a particular cluster, which itself is encoded within the graph structure. As illustrated, a user can select a set of points for deletion from the cluster. While deletions are typically thought as destructive and in many situations are not easily reversible, as can be seen in FIG. 21B, a new cluster labeling can be generated within the graph to reflect the modified cluster, while the original cluster (referred to as the historical cluster) can be preserved within the graph structure.

Figure 22A:
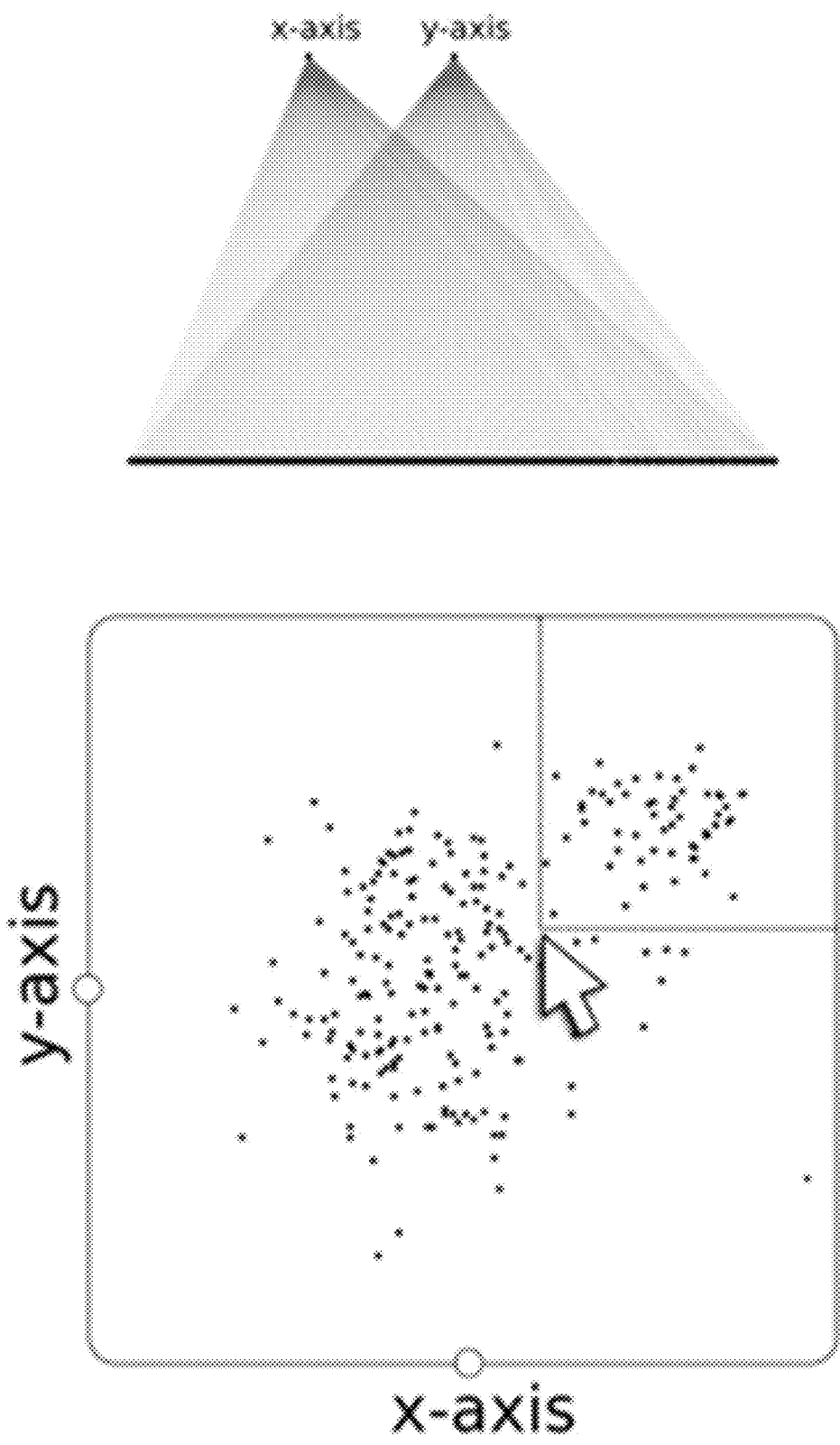
FIG. 22A illustrates a graph projected onto a 2-D Cartesian grid and the underlying graph structure, and a user performing selection operation in accordance with an embodiment of the invention.
Figure 22B:
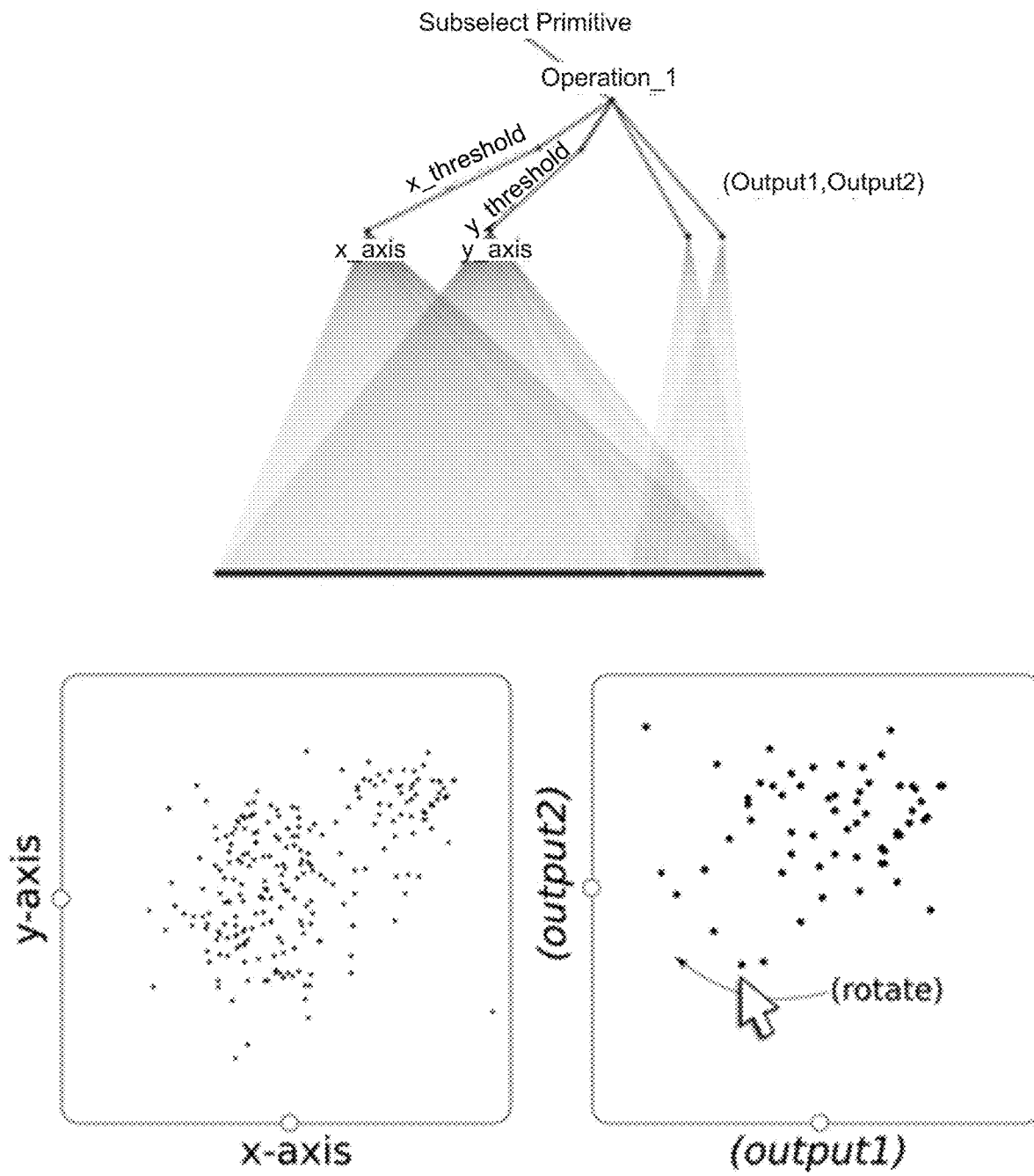
FIG. 22B illustrates the results of the selection operation as well as the changes to the underlying graph structure in order to perform the operation, as well as a user performing a rotation operation in accordance with an embodiment of the invention.
Figure 22C:
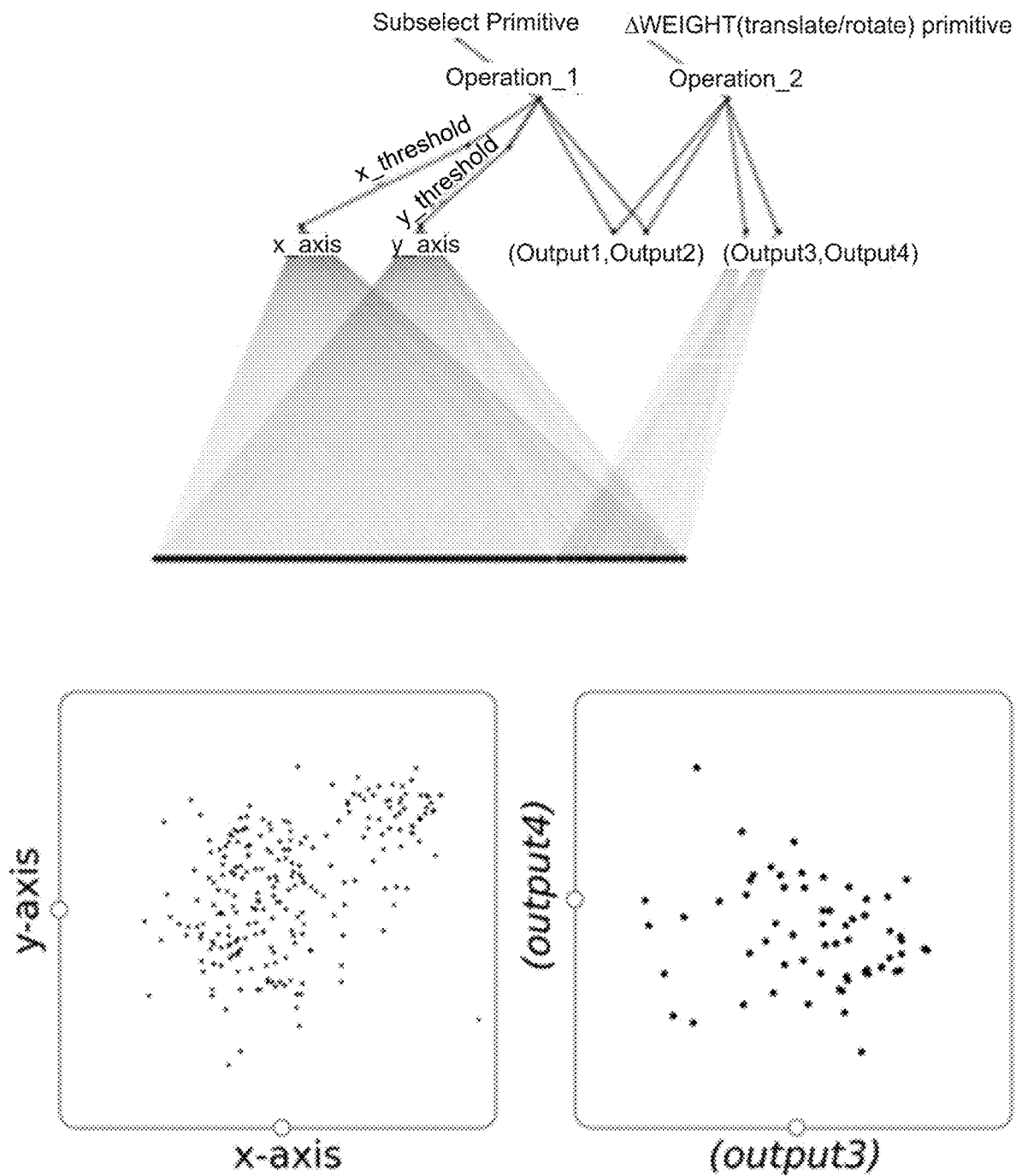
FIG. 22C illustrates the results of the rotation operation as well as the changes to the underlying graph structure in order to perform the operation in accordance with an embodiment of the invention.

However, the graph structures described herein can store more than just the results of operations. As noted herein, nodes and/or edges can encode computational processes. In many embodiments, a modified cluster can be encoded as one or more nodes reflecting the set of operations required to modify the original cluster to yield the desired modified cluster. Turning now to FIGS. 22A, 22B, and 22C, an example of encoding operations for making abstract changes in a graph in accordance with an embodiment of the invention is illustrated. FIG. 22A illustrates a graph projected onto a 2D Cartesian plane. A user selects a portion of the graph for further investigation using the cursor. As seen in FIG. 22B, this operation gets reflected by the addition of an operation node (operation_1) linked to a node encoding a primitive for the subselect operation. Performing the operation yields nodes encoding the desired outputs of the operation, in this case reflecting the new x and y axes. The next operation shown is a rotation of the selected region. As seen in FIG. 22C, a new node can be generated connected to the output of the previous operation which in turn is connected to another primitive for changing weights via rotation/translation, and the requested outputs. Of course, any number of different primitives can be used, depending on the number of different operations supported.

In numerous embodiments, the nodes themselves perform their encoded operations when traversed. In many embodiments, nodes merely reflect that a particular operation has occurred. Unlike various visual programming languages, nodes are not required to be specialized. Operations performed by nodes can exist at network addresses, and communicate changes throughout the graph and/or outside of the graph via messages. An advantage of this is that nodes can trigger operations in third party systems via messages. Further, nodes containing operations can be attributed to operate on the graph in order to satisfy user requests or mirror/encode user actions. In numerous embodiments, additional functionality can be provided to a system by adding in primitive nodes which contain instructions for how to perform a particular operation.

As graphs can encode operations, in a variety of embodiments, some graphs may be "computational flow graphs" which reflect any computational process, including, but not limited to, data analytics processes. As discussed herein, graphs can also encode any arbitrary set of data. Following this, measures can be generated on subgraphs that correspond to a given set of data and/or a computational flow graph, and/or measures to connect the subgraphs. In numerous embodiments, this enables the construction of graphs that can be added to other graphs to perform data analytics.

By way of example, a similarity metric between any two kinds of arbitrary data can be generated by virtual of their conversion to a graph using the following formalism:

T': $Domain_1 \rightarrow D_G$
T": $Domain_2 \rightarrow D_G$
G'=T'($DATA_1$)
G"=T"($DATA_2$)
M($DATA_1$,$DATA_2$)=M(G',G")

In English, given some transformation T which maps data from $Domain_1$ (for example, text and tables) onto a graphs, and another transformation T' which maps data from a completely different domain $Domain_1$ (for example, video and motion capture) onto a graph, the similarity measure between two kinds of data in each domain, $DATA_1$ and $DATA_2$, becomes just the similarity between the two graph types (G' and G"), no matter the form of the original data. One of ordinary skill in the art can appreciate that the example domain types are merely illustrative, and can be any arbitrary type of data as appropriate to the requirements of specific applications of embodiments of the invention.

In numerous embodiments, useful measures for M include, but are not limited to: edit distance between subgraphs; maximum common subgraph; and/or any other measure that define similarity based on the structure in the immediate subgraph neighborhood interest as appropriate to the requirements of specific applications of embodiments of the invention. In a variety of embodiments, M is selected to allow for the flexibility of readdressing, as two graphs with different node addresses but identical connectivity are identical. In numerous embodiments, graphs that are the same up to a transformation can be considered similar as well. Using a process similar to the above, a similarity measure between any two graphs representing analytics processes can be generated.

Using the above, a recommendation engine can be constructed whereby an analytics process can be recommended for a given set of data. An example recommendation engine based on overlapping similarity can be constructed using the following formalism:

$$P(A|D)=P(D|A)*P(A)/P(D)$$

where $P(D|A)$ is defined:

$$\Sigma P(D|D')*P(D'|A).$$

and where P is the probability that a given analysis A is appropriate for a given dataset D; and D', in the sum, is one of all of the possible Ds that A would ever be applied to.

In many embodiments, a similar rule can be used to calculate P(D|A), whereby we can identify the right data subgraph for a given supplied analysis. In numerous embodiments, multiple different similarity measures can be used. In a variety of embodiments, different similarity measures can be merged. In many embodiments, graph weights generally can be merged. In cases where there is homology between subgraphs, the subgraphs can be merged. This can provide a basis for combining complimentary data sets. Weights between complimentary graphs can be merged in any of a variety of ways, including, but not limited to, renormalizing weights so as to match scales, averaging along homologous subgraphs, and/or concatenating on non-homologous subgraphs.

With measures of comparing and calculating similarity between subgraphs corresponding to data and analytics, graphs can be constructed containing multiple analytics processes and multiple data processes. The analytics processes and data sets can then be matched, including combinations that have not yet been tried but where the similarity scores indicate that the analytics processes are a good fit for the data. Matched analytics processes and data and then be suggested to a user as a starting point for their own analysis.

While particular exemplary analytics processes have been discussed above, analytics processes can include, but are not limited to, computed functions, programs, hypothetical clusters, summaries, metadata generation, and/or any other process that manipulates data as appropriate to the requirements of specific applications of embodiments of the invention. In this way, computing and data can take on intertwined identities. For example, data and metadata can be hidden in the graph via embedded computations that simulate it when needed. In numerous embodiments, querying on depth can allow intrinsic/implicit schema to be revealed. Consequently, the boundary between computing and data can be blurred, conferring additional functionality to graph based systems described herein. While tools for analyzing data have been discussed herein, efficient methods for data intake can improve usability as well.

Merging External Data

A rule of thumb for training data is that the most desirable training data sets have a large number of samples with a low degree of noise. In many instances, noise is in the form of mislabeled or ill-defined samples. However, the definition of noise is highly dependent on the training data in question, and is generally any extraneous signal in the data. By way of example, games such as Chess and Go exemplify games in which a training data set containing legal moves would have zero noise, and machine learning systems have generally excelled at mastering these types of games. Unfortunately, many scenarios in which machine learning could provide a benefit are ripe with noise.

An example of a noisy scenario is healthcare data which can have tens of thousands of dimensions for an individual diagnosis or procedure, but the data set may only contain tens of thousands of samples in its entirety. In this example, the number of features (dimensions) may exceed the number of samples, which is generally thought to be intractable for a machine learning system. Indeed, there are any number of different scenarios and fields in which the data sets are highly dimensional, have unfavorable feature to sample size ratios, and/or have considerable amounts of noise. In order to address this type of issue, graph structures can be used to encode both data sets and external knowledge structures in order to reduce the dimensionality of the data. With respect to the healthcare example above, healthcare code databases can be encoded as a graph and similarities between the published registry of code meanings can be used to reduce the dimensionality of raw healthcare data. As explained above, any kind of data can be converted into a low-schema graph format, and so one of ordinary skill in the art can appreciate that this concept is extensible beyond healthcare data. Indeed, examples of merging different data sets into a knowledge graph with respect to different types of AV data are discussed herein.

In many embodiments, using a metric of potential homology between a data source of interest for learning and other data available in the wider universe, complimentary data sets can be found which would effectively reduce the dimensionality of the first data set and/or improve the signal-to-noise ratio available to the learning process. However, externally sourced data (and indeed, internal data) may not be 100% accurate. In numerous embodiments, a certainty metrics can be encoded in graphs to reflect expected accuracy of data. In numerous embodiments, a certainty metric can be encoded in a node in a directed weighted graph by adding a certainty node that points to another node with a weight encoding the certainty. A similar technique can be applied to edges by allowing a node to point to a shell node for each edge, with the shell node pointing to the edge's predecessor and successor. The certainty for the edge may then be stored on any of the three corresponding shell edges. Any number of different methods for encoding certainty metrics depending on the graph structure as appropriate to the requirements of specific applications of embodiments of the invention. In numerous embodiments, processes described herein can provide additional transparency to machine learning techniques. For example, one-shot learning methods could be made more transparent by providing a view into the assumptions behind the one-shot learning.

Further, the incorporation of new data which is applicable to domain of already stored data can effectively bootstrap a low-data environment with many more data examples. In many embodiments, determining which new data apply can be achieved by searching across a graph similarity metric as described above, which can provide benefits for transfer learning.

Figure 23:
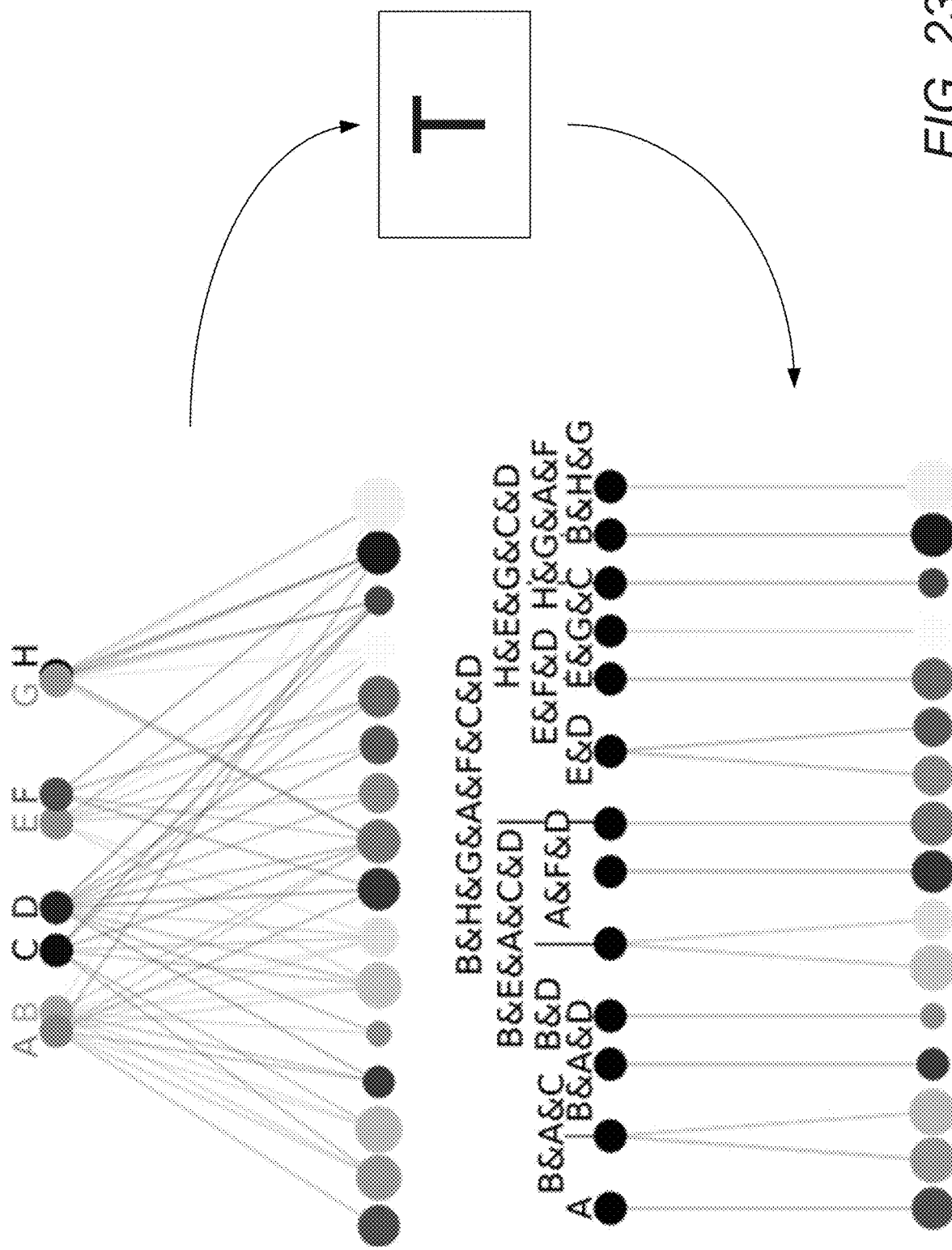
FIG. 23 graphically illustrates a process for converting a directed acyclic graph into a tree structure via a transformation T in accordance with an embodiment of the invention.

Additionally, the flexibility of graph structures and their ability to encode any arbitrary type of data means that the same information can be encoded in multiple ways. In many embodiments, different agents that operate on a graph may not have the flexibility to transform one type of encoding into another when computing their desired result. Graph transformations (T), can convert a first arbitrary type of graph (G) into a second arbitrary type of graph (G'). Example graph transformations include, but are not limited to, transforming directed acyclic graphs (DAGs) into trees, transforming graphs that include cycles to DAGs, re-encoding a graph such that a single node encodes a unique time point that connects every other datum at that time point, and/or any other transformation as appropriate to the requirements of specific applications of embodiments of the invention. As an example, a graph transformation T that converts a DAG into a tree in accordance with an embodiment of the invention is illustrated in FIG. 23. Consequently, newly obtained data can be transformed to match the graph structure currently being utilized, and/or any other structure different from the currently utilized graph structure as desired.

While techniques described herein for incorporating new data can provide benefits for training machine learning methods, understanding how exactly a machine learning model has implemented the learning remains a difficult problem. Methods for utilizing graph interface systems to understand how a machine learning system is operating is discussed below.

Whiteboxing AI

AI systems, and particularly neural networks, are often considered "black boxes." This refers to the highly complex signal processing that occurs within the AI that, in learning systems, is often not restricted to any logic that would be comprehensible to a human without an excessive amount of time, let alone intuitive to a user. Indeed, as the dimensionality of the input signal to an AI increases, often the internal complexity of the system increases. In keeping with this phraseology, to "whitebox" an AI system is to present the system in a way that its operation can be more easily understood by a user. Beyond using interactive methods to understand the kernel of the AI, which is a form of high dimensional data, there are many other kinds of high dimensional data that can also benefit from this kind of interactive nonlinear dimensional reduction.

Figure 24:
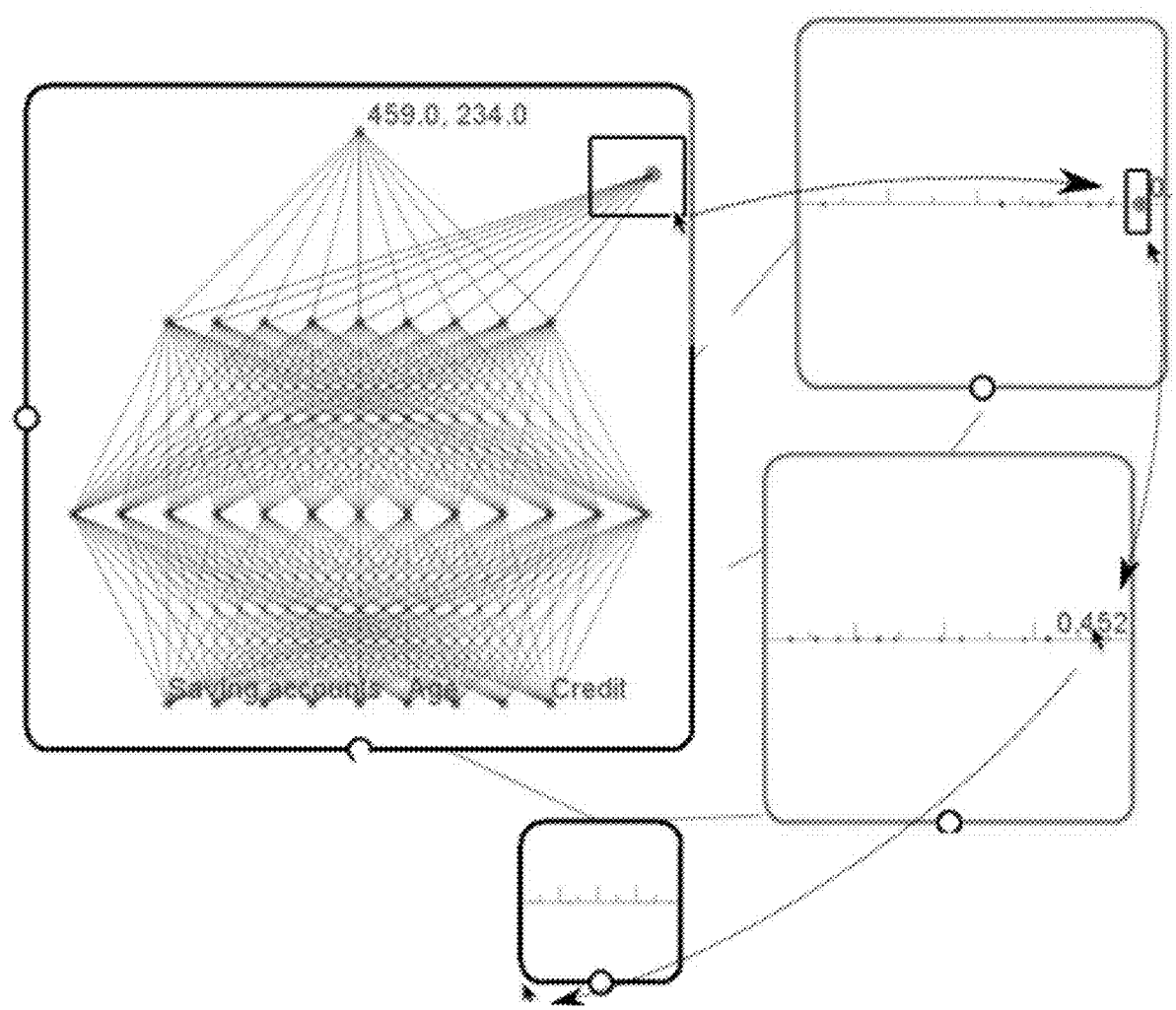
FIG. 24 is an example visualization of a whiteboxed neural network based AI system in accordance with an embodiment of the invention.

Turning now to FIG. 24, an example visualization of a neural network being whiteboxed in accordance with an embodiment of the invention is illustrated. As shown, consecutive layers of a neural network (left) can be interactively "dived into" by selecting and pulling out nodes at each layer, to understand their backward projections. In this example, each node "sees" the weights of the previous layer of nodes onto it, and the user pulls out the highest-weight node at each stage to look at the next stage down. While only 1-dimensional number lines are illustrated for clarity, any number of high-dimensional interaction techniques can be utilized to provide the user with a more complete view of the network.

This visualization tool can be enhanced using any of a variety of different methods. For example, a common theme in understanding neural networks is to project the space of two of the input units of the data, and color that space by the magnitude of activity expected in a hidden unit from stimulation of the network at any one of those points. In numerous embodiments, this technique can be extended to higher-dimensional interactions discussed herein. In a variety of embodiments, any one viewpoint can represent numerous dimensions, for example 7 dimensions or more on its own (x, y, z, r, g, b, time/sequence; discussed further below), and with the addition of interactive means such as mixing and matching axes, the dimensionality becomes effectively infinite.

Beyond merely visualization the inner workings of an AI system, systems and methods described herein can be used to probe AI behavior. When AIs and other actors within them misbehave, it can be useful to have a method for uncovering the source of the unexpected behavior. In numerous embodiments, unexpected behavior is caused by undersampled points in training data, or issues with edge cases. However, there can be any number of reasons for misbehavior including, but not limited to, poor model choice/structure, poor training data, inadequate training time, and/or any of a number of other reasons.

Oftentimes, to expose misbehaviors, AIs are run in a simulated environment. However, the complexity of the simulated environment is often such that the parameters of a subset of simulation runs which have off-nominal properties may be difficult to disambiguate from nominal scenarios due to the complexity of the parameter space. The nature of simulations is that, unlike real data, the number of available independent data points can be very large, limited only by computing resources. This large amount of data means that high-dimensional and complex systems can be understood, but it may take significant amounts of time and resources. To reduce the computational load, systems and methods described herein can utilize graph architecture to reduce the complexity of a simulation parameter space.

Figure 25A:
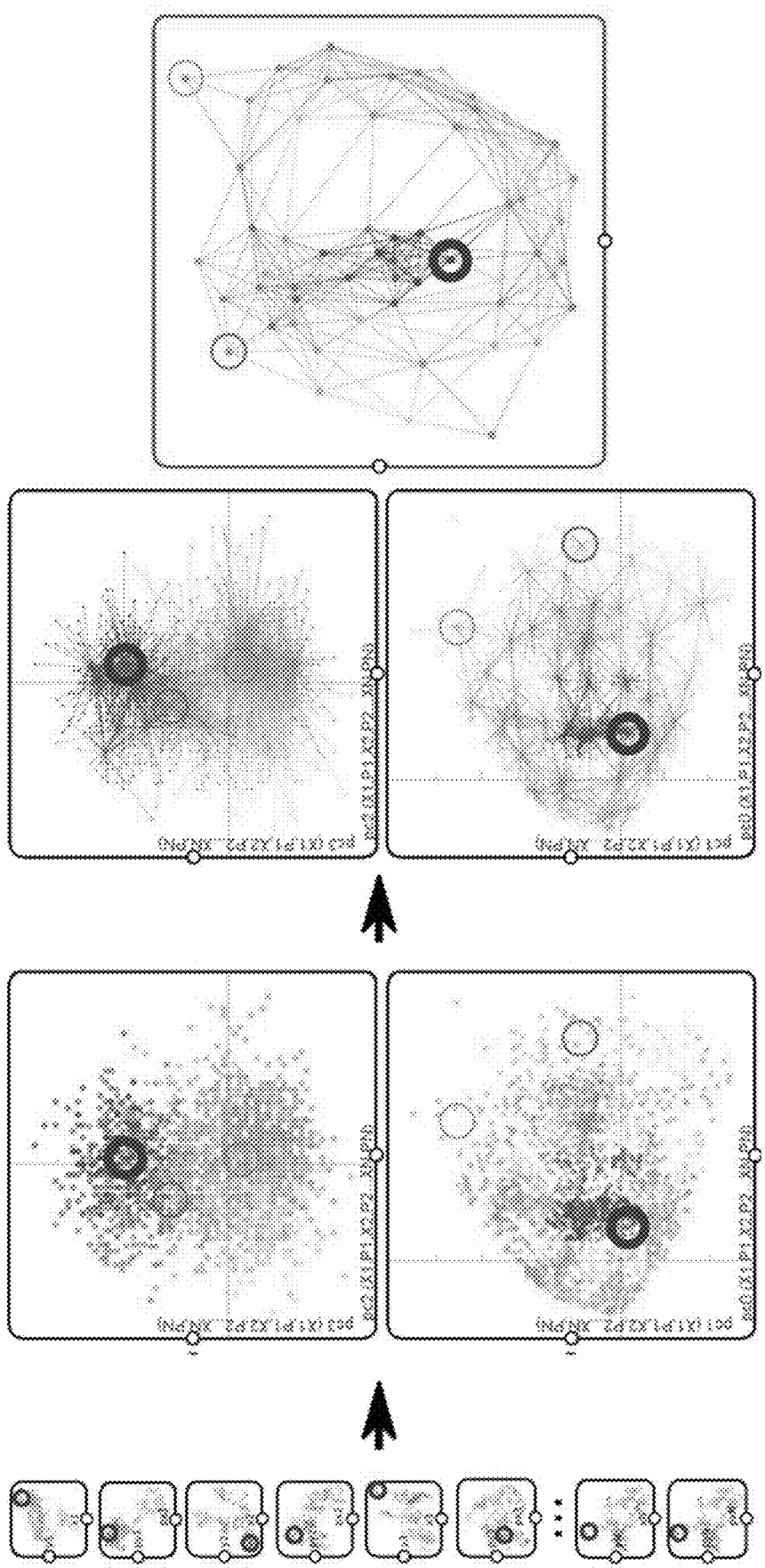
FIG. 25A graphically illustrates a complexity reduction process for high dimensional data colored so as to maximize the difference in color between clusters in accordance with an embodiment of the invention.
Figure 25B:
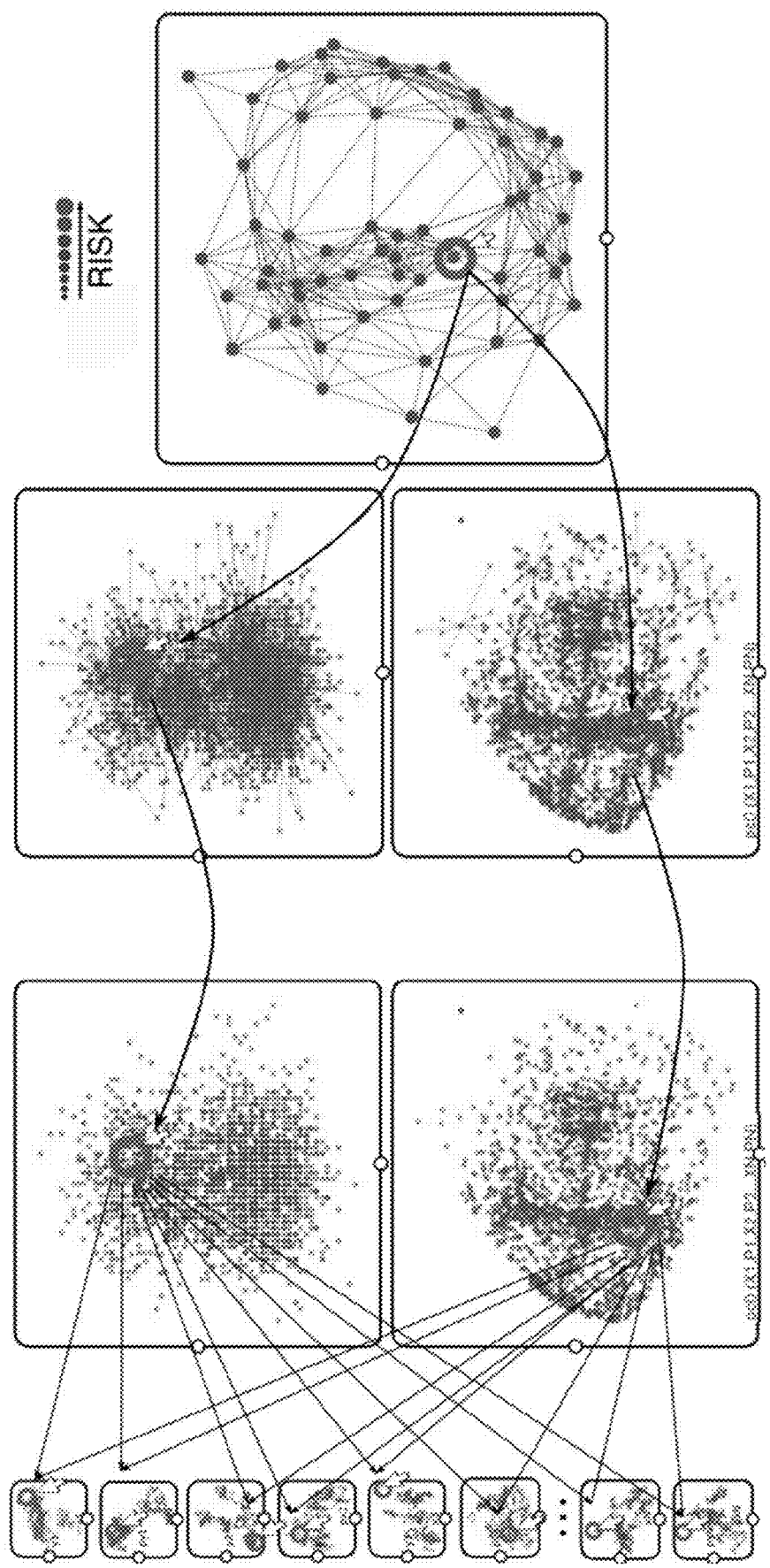
FIG. 25B graphically illustrates a complexity reduction process for high dimensional data colored by risk in accordance with an embodiment of the invention.

In many embodiments, high-dimensional data (simulated, and/or real) can be clustered and projected onto an interactive representation in two dimensions. Because of the fundamental interconnectedness of the data and the ability to represent single nodes in multiple projections, edge cases of interest can easily be backtracked to their original high-dimensional source, and ultimately back to the underlying data. An example of this complexity reduction in accordance with an embodiment of the invention is illustrated in FIGS. 25A and 25B. FIG. 25A depicts events defined by position and velocity in multiple dimensions (left) which are then projected according to their first 4 principal component axes (pc0 vs. pc1 in bottom-center-left figure, pc2 vs. pc3 just above). These events can be clustered (center-right frames), and the clusters connected by distance from each other. The resulting graph can then be laid out in a 2-D space via force-direction. The figures show the homology between nodes in the low-dimensional projection (circles at right figure) and the high-dimensional space (circled regions in each frame). FIG. 25B depicts the same graph as FIG. 25A, except colored by risk. The connectedness of the graph allows high-risk edge cases to be back-tracked to their sources in the data. In many embodiments, due to the due to the structure of the graph as provided by the graph interface device, each level of projection can be modified by the user as desired. In numerous embodiments, once simulated events are composed into a single graph, unexpected behavior may be surfaced using methods including those described herein.

As discussed herein, graph interface systems provide numerous different tools for performing a variety of tasks using graphs. However, graph interface systems can further provide UI organizations and visualization tools to aid in human understanding of graphs as a whole. These visualization systems are discussed below.

Visualization Tools and User Interfaces

Previous publications have discussed graph visualizations and user interfaces (UIs) utilizing an interactive series of windows. These "mixed hierarchy" interfaces can allow humans to use the structure of the graph itself as a means of exploring the data stored in the graph, restructuring it, creating and manipulating the scope of queries and computations and finally performing those computations on the data. Indeed, mixed hierarchies can work at multiple levels of hierarchy, recursively displaying subgraphs down to an arbitrary depth and allowing navigation at multiple levels simultaneously. However, this can present an overwhelming amount of data and complexity all at once to many users. A "flat" interface as discussed below can provide the same functionality of a mixed hierarchy interface while ensuring that no more than one level of recursion is ever displayed at a time.

Figure 27:
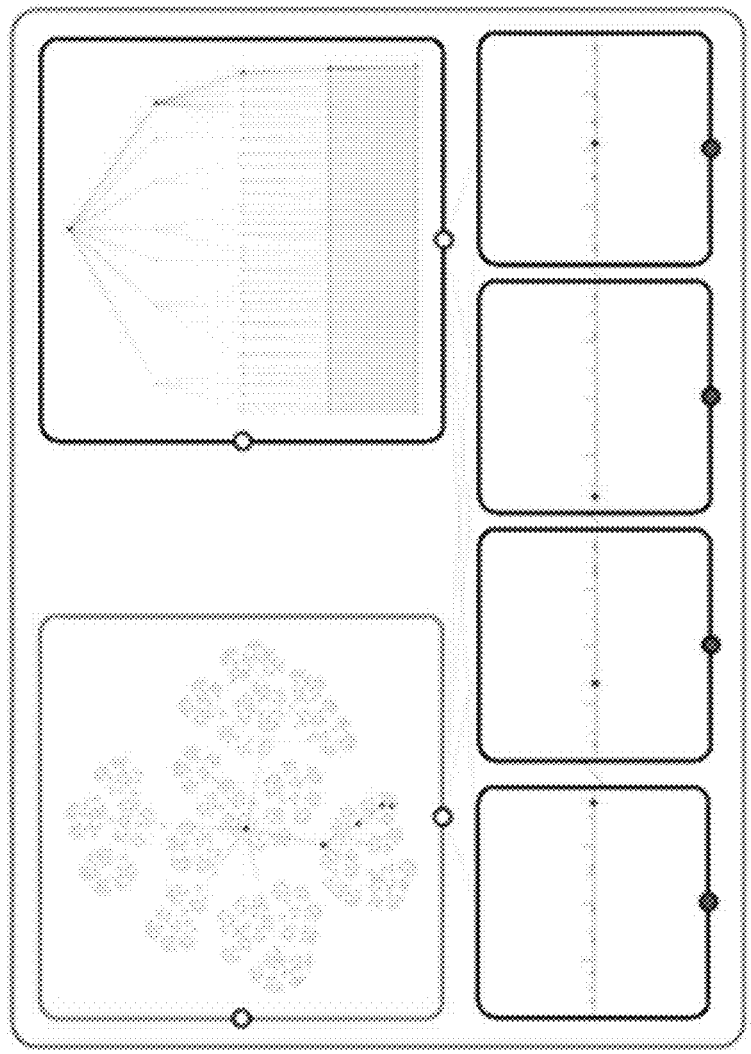
FIG. 27 is a flat interface in accordance with an embodiment of the invention.
Figure 26:
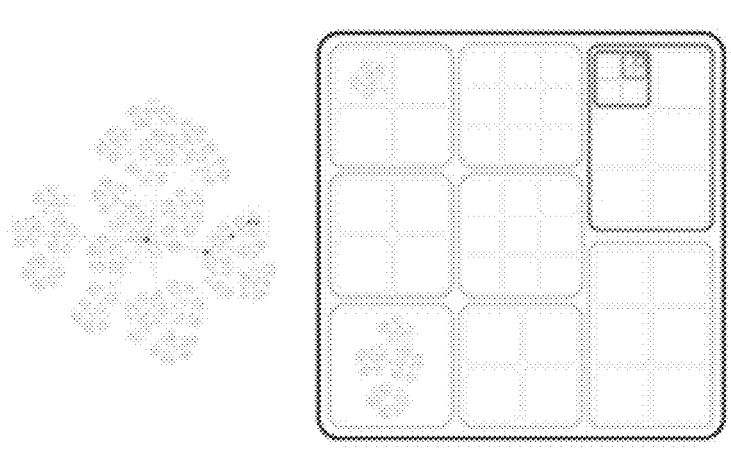
FIG. 26 is a mixed-hierarchy interface in accordance with an embodiment of the invention.

Turning now to FIGS. 26 and 27, an example mixed-hierarchy interface (prior art) and an example flat interface in accordance with an embodiment of the invention are illustrated, respectively. Within a flat interface, nodes in a graph can interactively be "pulled out" from a given view into the top-level view which begins to act like a "desktop" in a conventional operating system environment. In numerous embodiments, on this top-level view each can be displayed according to the further nodes that they point to in the graph, but without the option for seeing recursively deeper. In order to see further, nodes may then repeatedly be pulled out and dropped on the top-level view. In many embodiments, "dropping" or "deleting" nodes onto/from the top-level view is equivalent to modifying the where the ideas they correspond to appear in a hierarchical taxonomy, doing the equivalent of connecting them to or removing connections from a high-level or central position or node in the taxonomy corresponding to the top-level view. In this way, all nodes that the user hopes to interact with are brought in direct or 1-degree away contact with the top level view. Subgraphs can be modified, computations enabled, insights gained, and then subgraphs can be "stored" back into parts of the graph by having their connection from the top-level view deleted while retaining other extant connections.

Weights projecting from a given node onto its successors can be represented in the visualization in any of a variety of ways. In many embodiments, the weights can be represented in the area of a nested window and/or the position of a dot along an axis. In a variety of embodiments, a predecessor node connected to a set of successor nodes with certain weights can be represented as a window within the top-level view which displays those successor nodes on an axis line at positions corresponding to their weights. An additional axis line can be used to represent weights from a second predecessor node. Indeed, additional axes can be used to represent additional predecessor nodes. In numerous embodiments, 3D projections can be used to facilitate understanding of higher dimensional representations for human users. Further, in numerous embodiments, the top-level view of the graph can in fact be a node in graph which acts like a "desktop" where all things the user is actively working on are connected to it.

In a variety of embodiments, interfaces (irrespective of being a mixed-hierarchy or flat) can contain different windows to provide different visualizations of a graph and/or subgraph. In a variety of embodiments, the visualization provided in each window is linked to the desktop node. Any number of visualizations can be provided via windows. In many embodiments, multiple windows can be linked. For example, if two or more windows display data that shares an axis, modifications in one window can affect the displayed graph in other windows along the common axis. Further, highlighting nodes in one window can highlight the same nodes that are present in other open windows.

Figure 28:
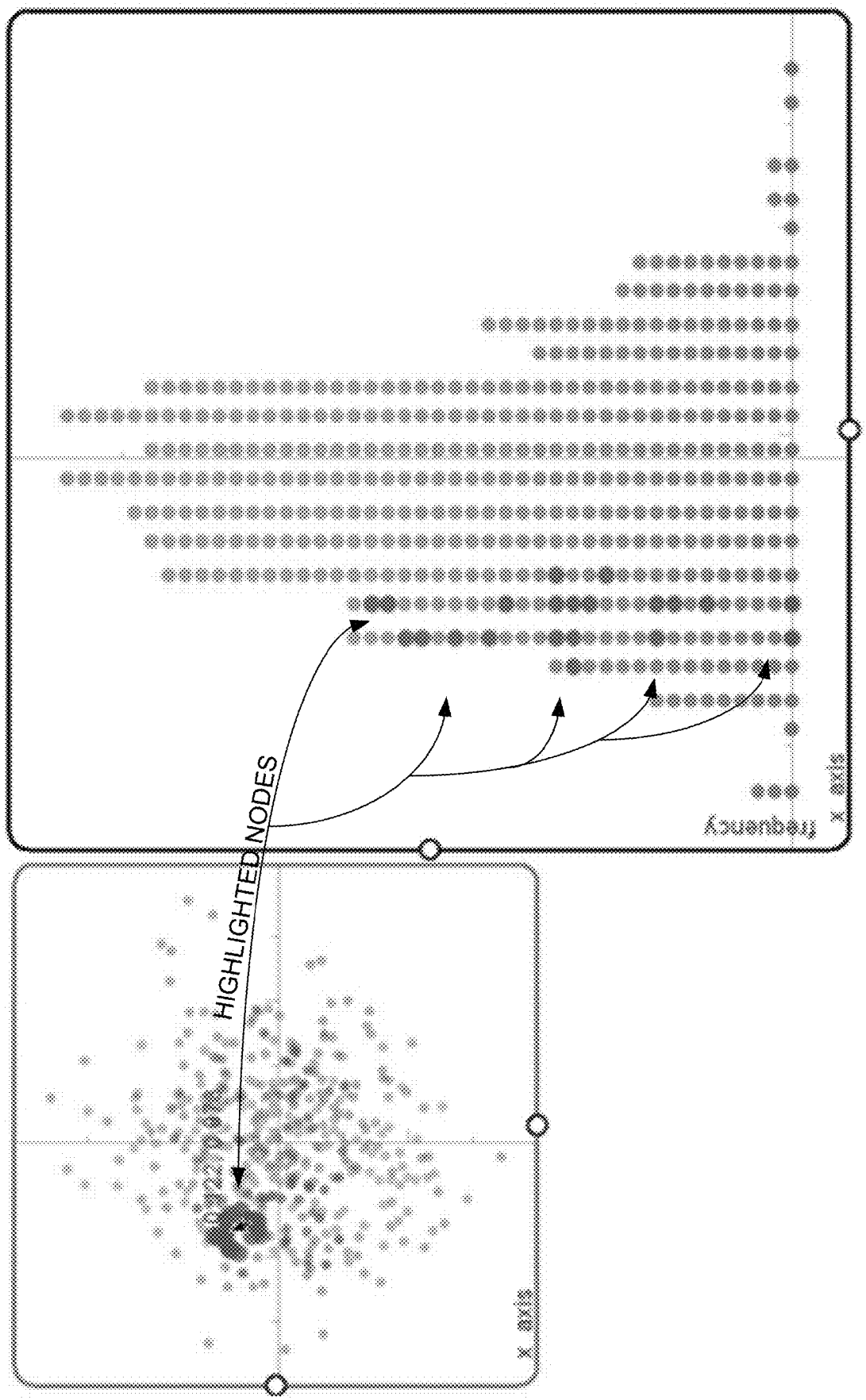
FIG. 28 illustrates a 2-D projection of a graph along two arbitrary dimensions and an accompanying histogram, showing highlighted nodes across the 2-D projection and the histogram in accordance with an embodiment of the invention.

Windows are not restricted to graph visualizations that show the graph structure as linked nodes and edges. In numerous embodiments, other charts and/or other types of visualizations can be generated from the underlying graph. For example, turning now to FIG. 28, a 2-D projection of a graph along two arbitrary dimensions and an accompanying histogram showing the frequency of nodes at particular x-axis values in accordance with an embodiment of the invention is illustrated. Further, nodes highlighted (red) in the left graph can be shown as being highlighted (red) in the histogram (right) as discussed herein. In a variety of embodiments, an advantage of graph interface systems is that the underlying data can be directly linked in alternative visualizations. In the illustrated histogram, for example, the nodes themselves are stacked to represent frequency, rather than using a static summary bar, thereby keeping the user closer to the data.

Figure 29:
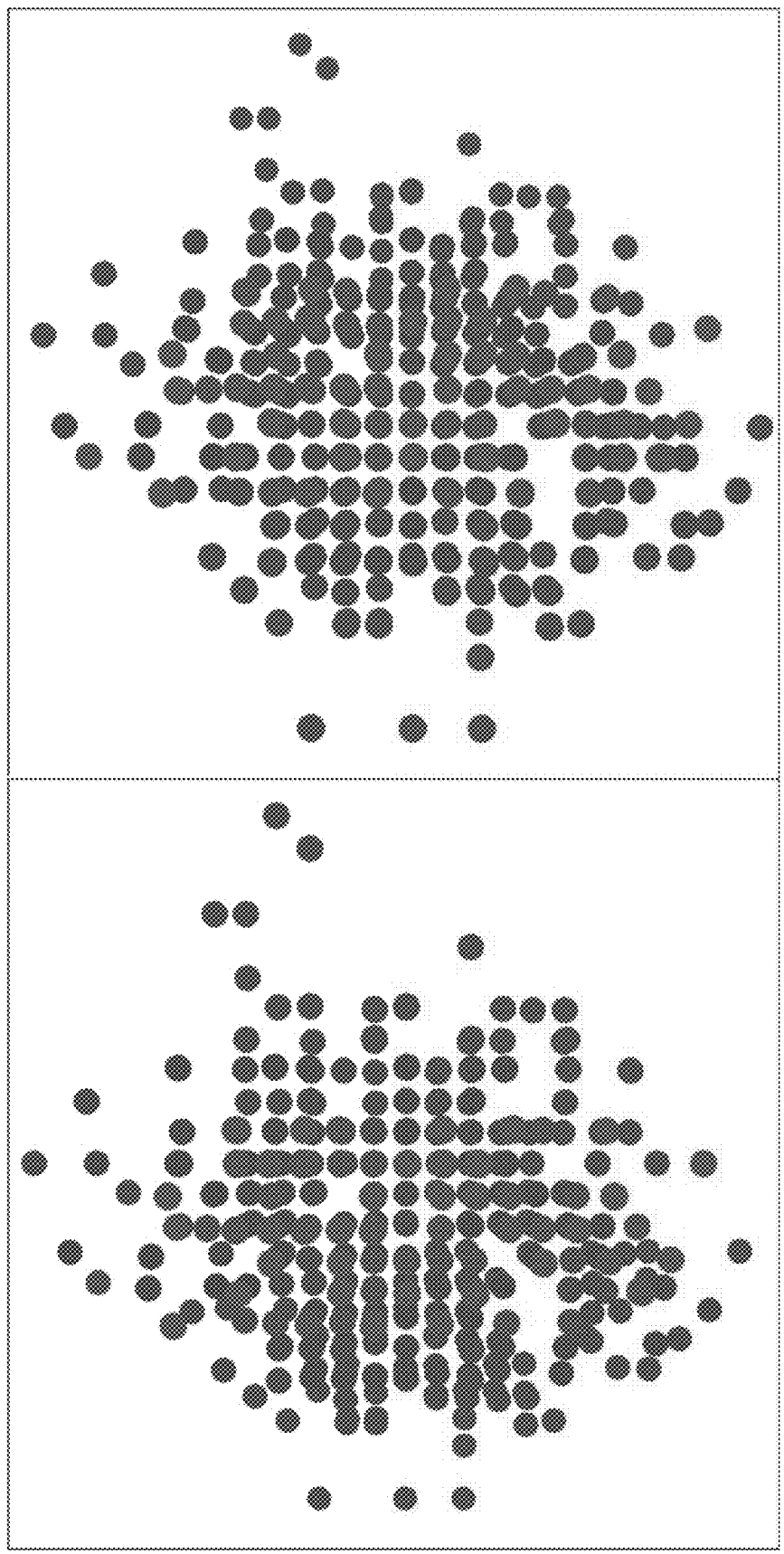
FIG. 29 is a stereoscopic 3-D histogram in accordance with an embodiment of the invention.

Similarly, windows are not limited to 2-D projections. By way of example, turning now to FIG. 29, a 3-D histogram (shown as a stereogram) in accordance with an embodiment of the invention is illustrated. However, stereograms are not required, and many different 3-D rendering technologies can be used to show 3-D visualizations including, but not limited to, other 3-D representation methods for 2-D displays, virtual reality methods, augmented reality methods, and/or any other 3-D visualization technique as appropriate to the requirements of specific applications of embodiments of the invention.

In numerous embodiments, the UI environment can be augmented via adaptive cursors. Adaptive cursors are cursors which can automatically "jump" to an inferred intended location. In a variety of embodiments, intention of a user to navigate to a particular location is based on the current location of the cursor and the velocity of the cursor, and the probability of intention towards a target object in the UI is a function of the intention of the user to navigate to the target and the intention towards other targets on the screen. In a variety of embodiments, machine learning and/or expectations encoded into a graph can be used to determine intention.

While flat interfaces can assist users by selectively representing data, a flat interfaces are not required by graph interface devices. Indeed, in many applications, a graphical user interface is not utilized at all. Regardless, flat interfaces are not the only type of interface that can be utilized, and indeed specialized interfaces can be used as appropriate to the requirements of specific applications of embodiments of the invention. Furthermore, different visualizations and/or augmentations such as, but not limited to, adaptive cursors, are not required, and indeed any number of different visualizations and augmentations can be integrated as appropriate to the requirements of specific applications of embodiments of the invention. An example of specialized interfaces are discussed below with reference to risk modeling applications.

Although specific methods of training AIs using graph interface systems and performing other graph interface processes are discussed above, many different methods can be implemented in accordance with many different embodiments of the invention. It is therefore to be understood that the present invention may be practiced in ways other than specifically described, without departing from the scope and spirit of the present invention, for example, by performing steps in different orders, by adding steps, removing steps, and/or incorporating various features of different embodiments. Thus, embodiments of the present invention should be considered in all respects as illustrative and not restrictive. Accordingly, the scope of the invention should be determined not by the embodiments illustrated, but by the appended claims and their equivalents.

What is claimed is:

1. A graph interface system comprising:
a processor; and
a memory configured to store a graph interface application, where the graph interface application directs the processor to:
obtain a set of training data, where the set of training data describes a plurality of scenarios;
encode the set of training data into a first knowledge graph;
generate a manifold based on the first knowledge graph, the manifold data structure comprising:
a plurality of nodes; and
a plurality of edges;
where each node in the plurality of nodes encodes a class of one or more related scenarios within the plurality of scenarios;
where each node in the plurality of nodes is associated with a risk metric reflecting the risk of the class encoded by the respective node; and
where each edge between two nodes in the manifold encodes the similarity between the classes encoded by the two nodes; and
train an artificial intelligence (AI) model by traversing the manifold data structure such that a representative scenario of the class encoded by each visited node is provided to the AI model.

2. The graph interface system of claim 1, wherein to encode the set of training data into the knowledge graph, the graph interface application directs the processor to:
identify objects within each scenario in the plurality of scenarios;
store the identified objects within the first knowledge graph;
determine spatiotemporal features for each object;
store the spatiotemporal features within the first knowledge graph; and
generate spatiotemporal scenarios by clustering the first knowledge graph based on the spatiotemporal features.

3. The graph interface system of claim 2, wherein the graph interface application further directs the processor to add semantic meaning to spatiotemporal features.

4. The graph interface system of claim 3, wherein to add semantic meaning to spatiotemporal features, the graph interface application further directs the processor to:

obtain a second knowledge graph from a kernel set of annotated spatiotemporal scenarios;
merge the first knowledge graph and the second knowledge graph;
assign annotations from scenarios in the second knowledge subgraph to identical scenarios in the first knowledge subgraph;
obtain a third knowledge subgraph encoding only descriptions of spatiotemporal scenarios;
merge the third knowledge subgraph into the first knowledge subgraph;
assign spatiotemporal scenarios in the first knowledge graph to descriptions from the third knowledge subgraph using annotations from the second knowledge subgraph; and
assign still-unconnected descriptions from the third graph to still-unannotated scenarios in the first knowledge graph via an inference method.

5. The graph interface system of claim 4, wherein the inference method is a Bayesian inference method.

6. The graph interface system of claim 1, wherein to generate a manifold based on the first knowledge graph, the graph interface application further directs the processor to:
derive new spatiotemporal scenarios within the first knowledge graph;
calculate a similarity measure between each spatiotemporal scenario in the first knowledge graph; and
embed the spatiotemporal scenarios into a manifold by connecting spatiotemporal scenarios via edges with an edge weight equal to the similarity measure between a first spatiotemporal scenario and a second spatiotemporal scenario connected by their respective edge.

7. The graph interface system of claim 6, wherein to generate a manifold based on the first knowledge graph, the graph interface application further directs the processor to prune illegal spatiotemporal scenarios.

8. The graph interface system of claim 1, wherein to traverse the manifold, the graph interface application directs the processor to:
begin at a centermost node in the manifold; and
successively navigate to a new node that is the greatest total distance from all previously visited nodes.

9. The graph interface system of claim 1, wherein the AI model is used in an autonomous vehicle control system.

10. The graph interface system of claim 1, wherein the training data comprises forward-mounted monocular camera footage and textual accident reports.

11. The graph interface system of claim 1, wherein the first knowledge graph is constructed using dimensional data structures.

12. The graph interface system of claim 1, wherein the graph interface application further directs the processor to audit at least one scenario in the manifold.

13. The graph interface system of claim 1, wherein the graph interface application further directs the processor to provide a projection of the first knowledge graph using a hybrid interface.

14. A method for training an artificial intelligence (AI) using a graph interface system, comprising:
obtaining a set of training data, where the set of training data describes a plurality of scenarios;
encoding the set of training data into a first knowledge graph;
generating a manifold data structure based on the first knowledge graph, the manifold data structure comprising:
a plurality of nodes; and
a plurality of edges;
where each node in the plurality of nodes encodes a class of one or more related scenarios within the plurality of scenarios;
where each node in the plurality of nodes is associated with a risk metric reflecting the risk of the class encoded by the respective node; and
where each edge between two nodes in the manifold encodes the similarity between the classes encoded by the two nodes; and
training an AI model by traversing the manifold data structure such that a representative scenario of the class encoded by each visited node is provided to the AI model.

15. The method of claim 14, wherein encoding the set of training data into the knowledge graph comprises:
identifying objects within each scenario in the plurality of scenarios;
storing the identified objects within the first knowledge graph;
determining spatiotemporal features for each object;
storing the spatiotemporal features within the first knowledge graph; and
generating spatiotemporal scenarios by clustering the first knowledge graph based on the spatiotemporal features.

16. The method of claim 15, further comprising adding semantic meaning to spatiotemporal features.

17. The method of claim 16, adding semantic meaning to spatiotemporal features comprises:
obtaining a second knowledge graph from a kernel set of annotated spatiotemporal scenarios;
merging the first knowledge graph and the second knowledge graph;
assigning annotations from scenarios in the second knowledge subgraph to identical scenarios in the first knowledge subgraph;
obtaining a third knowledge subgraph encoding only descriptions of spatiotemporal scenarios;
merging the third knowledge subgraph into the first knowledge subgraph;
assign spatiotemporal scenarios in the first knowledge graph to descriptions from the third knowledge subgraph using annotations from the second knowledge subgraph; and
assigning still-unconnected descriptions from the third graph to still-unannotated scenarios in the first knowledge graph via an inference method.

18. The method of claim 17, wherein the inference method is a Bayesian inference method.

19. The method of claim 14, generating a manifold based on the first knowledge graph comprises:
deriving new spatiotemporal scenarios within the first knowledge graph;
calculating a similarity measure between each spatiotemporal scenario in the first knowledge graph; and
embedding the spatiotemporal scenarios into a manifold by connecting spatiotemporal scenarios via edges with an edge weight equal to the similarity measure between a first spatiotemporal scenario and a second spatiotemporal scenario connected by their respective edge.

20. The method of claim 19, generating a manifold based on the first knowledge graph comprises pruning illegal spatiotemporal scenarios.

21. The method of claim 14, wherein traversing the manifold comprises:
beginning at a centermost node in the manifold; and successively navigating to a new node that is the greatest total distance from all previously visited nodes.

22. The method of claim 14, wherein the AI model is used in an autonomous vehicle control system.

23. The method of claim 14, wherein the training data comprises forward-mounted monocular camera footage and textual accident reports.

24. The method of claim 14, wherein the first knowledge graph is constructed using dimensional data structures.

25. The method of claim 14, further comprising auditing at least one scenario in the manifold.

26. The method of claim 14, wherein further comprising providing a projection of the first knowledge graph using a hybrid interface.

27. A graph interface system comprising:
a processor; and
a memory configured to store a graph interface application, where the graph interface application directs the processor to:
  obtain a set of training data, where the set of training data describes a plurality of scenarios;
  encode the set of training data into a first knowledge graph, by:
    identifying objects within each scenario in the plurality of scenarios;
    storing the identified objects within the first knowledge graph;
    determining spatiotemporal features for each object;
    storing the spatiotemporal features within the first knowledge graph; and
    generating spatiotemporal scenarios by clustering the first knowledge graph based on the spatiotemporal features;
  generate a manifold data structure based on the first knowledge graph, by:
    deriving new spatiotemporal scenarios within the first knowledge graph;
    calculating a similarity measure between each spatiotemporal scenario in the first knowledge graph; and
    embedding the spatiotemporal scenarios into the manifold data structure by connecting spatiotemporal scenarios as nodes via edges with an edge weight equal to the similarity measure between a first spatiotemporal scenario and a second spatiotemporal scenario connected by their respective edge; and
  train an artificial intelligence (AI) model by traversing the manifold data structure such that the spatiotemporal scenario encoded by each visited node is provided to the AI model.

\* \* \* \* \*